United States Patent
Kojima et al.

(10) Patent No.: US 9,961,248 B2
(45) Date of Patent: May 1, 2018

(54) IMAGING SYSTEM, ILLUMINATION DEVICE, AND CONTROL METHOD

(71) Applicant: CANON KABUSHIKI KAISHA, Tokyo (JP)

(72) Inventors: Teruyuki Kojima, Tokyo (JP); Yoshiro Ichihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/848,174

(22) Filed: Sep. 8, 2015

(65) Prior Publication Data

US 2016/0072995 A1    Mar. 10, 2016

(30) Foreign Application Priority Data

Sep. 10, 2014  (JP) ................. 2014-184404
Sep. 10, 2014  (JP) ................. 2014-184405
Sep. 10, 2014  (JP) ................. 2014-184406

(51) Int. Cl.
*H04N 5/225*     (2006.01)
*H04N 5/235*     (2006.01)
*G03B 7/17*      (2014.01)
*G03B 15/05*     (2006.01)
*G03B 13/36*     (2006.01)
(Continued)

(52) U.S. Cl.
CPC ............. *H04N 5/2256* (2013.01); *G03B 7/17* (2015.01); *G03B 13/36* (2013.01); *G03B 15/05* (2013.01); *H04N 5/2354* (2013.01); *H04N 5/23209* (2013.01); *G03B 2206/00* (2013.01); *G03B 2215/0521* (2013.01); *H04N 2101/00* (2013.01)

(58) Field of Classification Search
CPC ............ H04N 5/2256; H04N 5/23209; H04N 5/2354; H04N 2101/00; G03B 13/36; G03B 7/17; G03B 15/05; G03B 2215/0521; G03B 2206/00
USPC ........................................................ 348/371
See application file for complete search history.

(56) References Cited

U.S. PATENT DOCUMENTS 4,512,644 A * 4/1985 Yoshida ................. G03B 15/05
                                                           396/174
5,194,885 A * 3/1993 Spencer ................. G03B 15/05
                                                           396/182
(Continued)

FOREIGN PATENT DOCUMENTS

CN       1525234 A      9/2004
CN     101581868 A     11/2009
(Continued)

*Primary Examiner* — Lin Ye
*Assistant Examiner* — Chan Nguyen
(74) *Attorney, Agent, or Firm* — Canon U.S.A., Inc. IP Division

(57) ABSTRACT

To enable light emission shooting according to the condition of an imaging apparatus, an imaging system, which includes an illumination device capable of automatically driving a movable portion including a light emission unit to change a radiation direction of the light emission unit and an imaging apparatus, includes an acquisition unit configured to acquire information classifying a lens unit attached to the imaging apparatus, and a control unit configured to control the radiation direction of the light emission unit based on the information classifying the lens unit acquired by the acquisition unit.

26 Claims, 48 Drawing Sheets

(51) Int. Cl.
  *H04N 5/232* (2006.01)
  *H04N 101/00* (2006.01)

(56) References Cited

U.S. PATENT DOCUMENTS

| | | | | |
|---|---|---|---|---|
| 8,233,080 B2 * | 7/2012 | Yanai | ................ | G03B 15/05 |
| | | | | 348/240.99 |
| 2012/0294600 A1 | 11/2012 | Osawa | | |
| 2013/0176482 A1 * | 7/2013 | Hirasawa | ............. | G03B 7/16 |
| | | | | 348/370 |

FOREIGN PATENT DOCUMENTS

| | | | |
|---|---|---|---|
| CN | 101604110 A | 12/2009 |
| JP | 4-340527 A | 11/1992 |
| JP | 2009-163179 A | 7/2009 |
| JP | 2010-8717 A | 1/2010 |

* cited by examiner

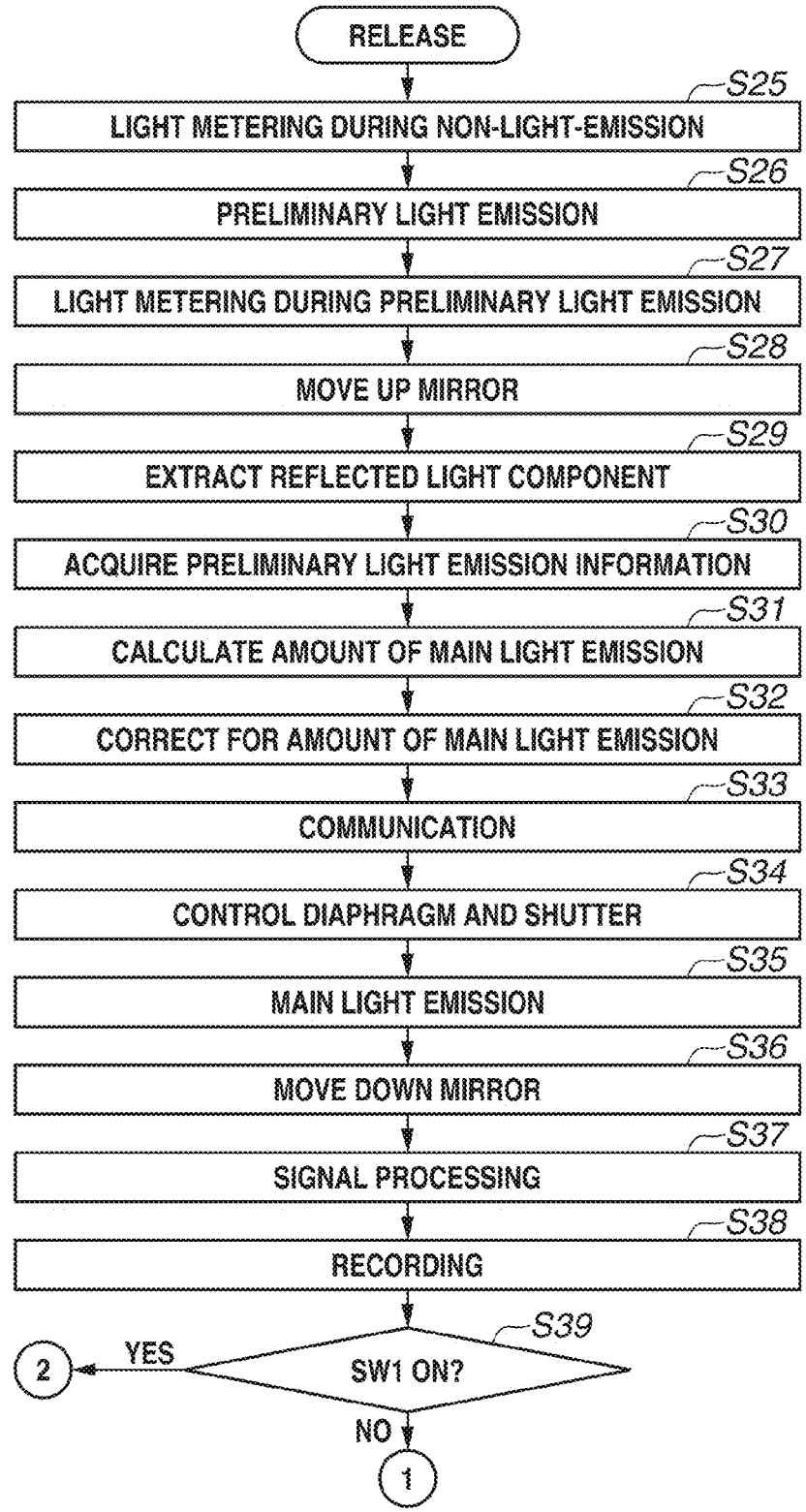

FIG.5

| LENS NUMBER | ID | FOCAL LENGTH | FULL-APERTURE F-NUMBER | CLASSIFICATION | COMPATIBILITY WITH AUTOMATIC BOUNCE LIGHT EMISSION SHOOTING |
|---|---|---|---|---|---|
| #01 | L01 | 50 mm | 1.8 | STANDARD | COMPATIBLE |
| #02 | L02 | 28 mm - 105 mm | 4 | STANDARD ZOOM | COMPATIBLE |
| #03 | L03 | 24 mm | 1.4 | WIDE-ANGLE | COMPATIBLE |
| #04 | L04 | 14 mm | 2.8 | SUPER-WIDE-ANGLE (FISH-EYE) | INCOMPATIBLE |
| #05 | L05 | 105 mm | 2.8 | TELEPHOTO | COMPATIBLE |
| #06 | L06 | 400 mm | 2.8 | SUPER-TELEPHOTO | INCOMPATIBLE |
| #07 | L07 | 24 mm | 3.5 | SHIFT-TILT | COMPATIBLE (INCOMPATIBLE) |
| #N/A | N/A | 50 mm | 1.8 | NO ID | INCOMPATIBLE |

FIG.8A

UP AND DOWN

| ANGLES | D0 | D1 | D2 | D3 |
|---|---|---|---|---|
| 0 | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |

FIG.8B

RIGHT AND LEFT

| ANGLES | D0 | D1 | D2 | D3 |
|---|---|---|---|---|
| 0 | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |
| 225 | 1 | 1 | 0 | 1 |
| 240 | 1 | 1 | 1 | 1 |
| 255 | 1 | 1 | 1 | 0 |
| 270 | 1 | 0 | 1 | 0 |
| 285 | 1 | 0 | 1 | 1 |
| 300 | 1 | 0 | 0 | 1 |
| 315 | 1 | 0 | 0 | 0 |

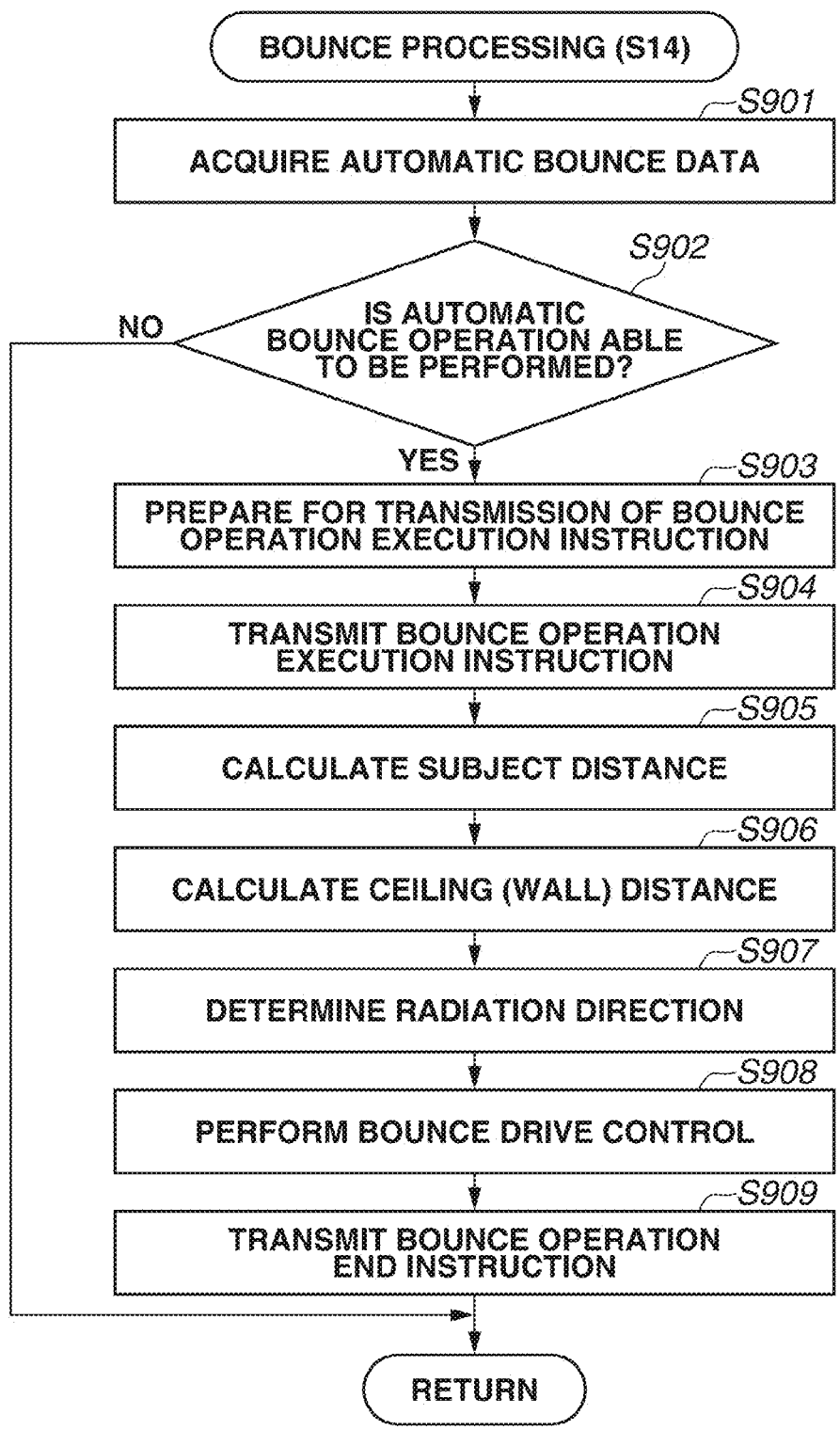

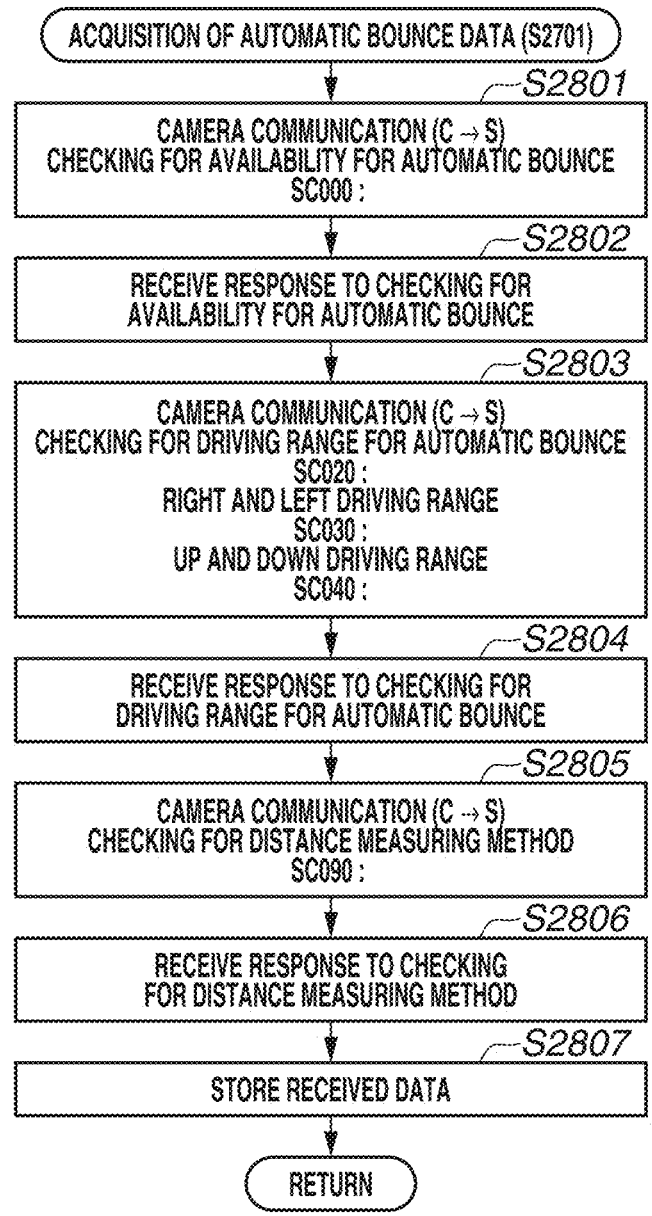

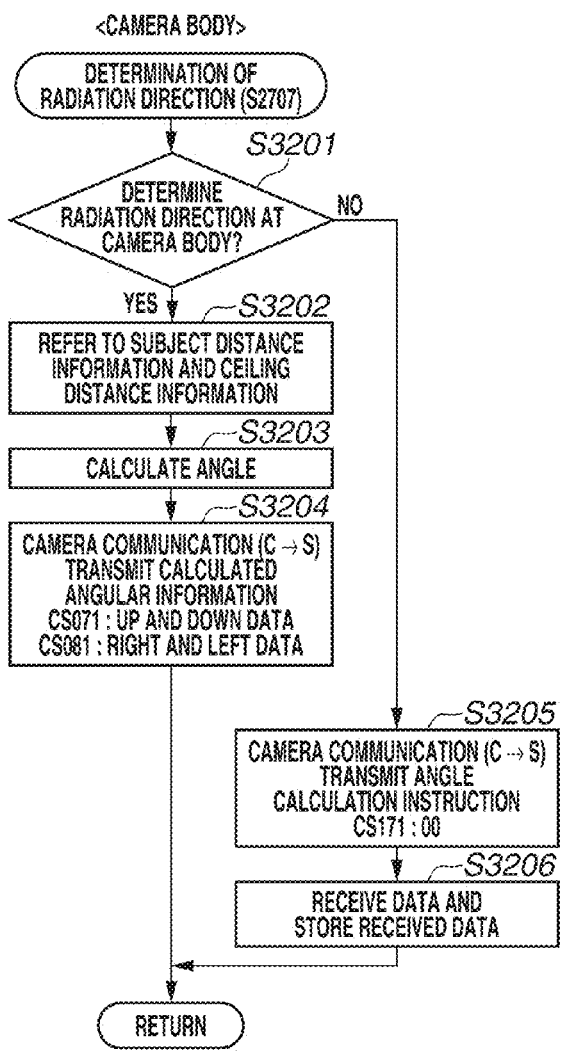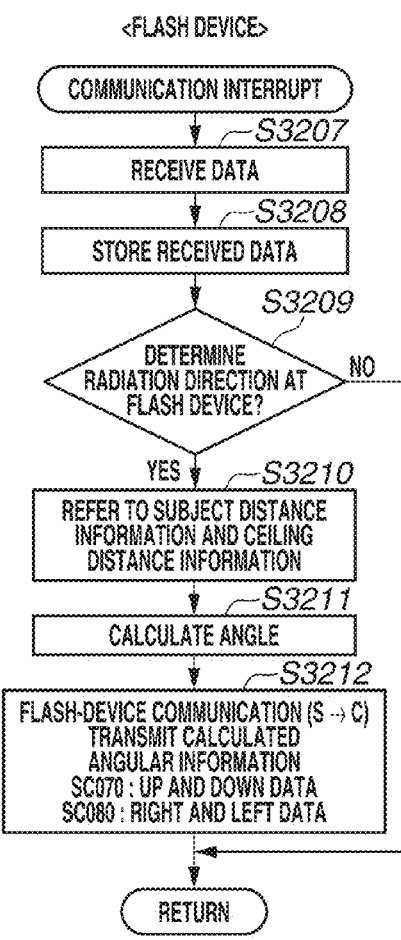
FIG.22A
FIG.22B

FIG.23B
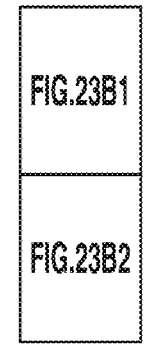
FIG.23B1
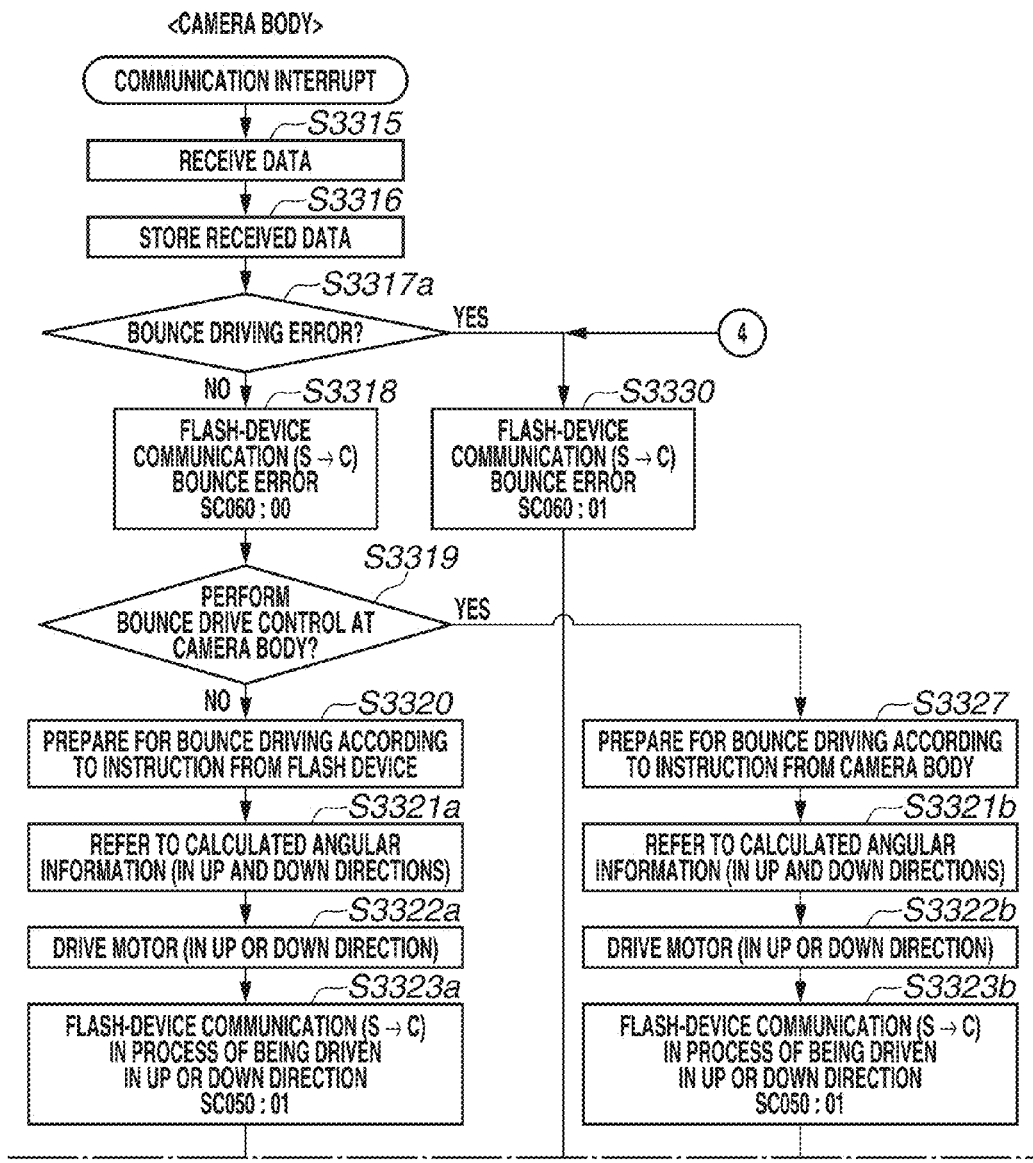

FIG.23B2
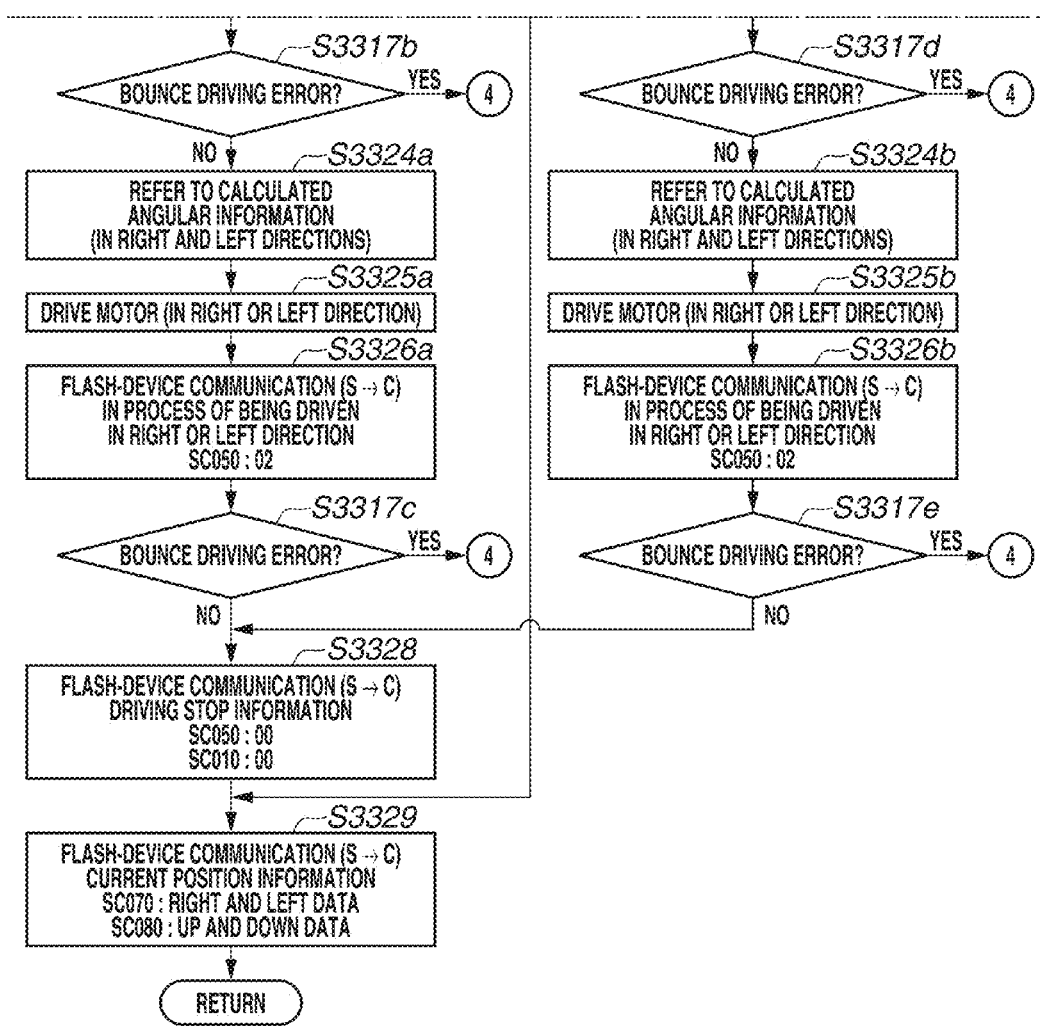

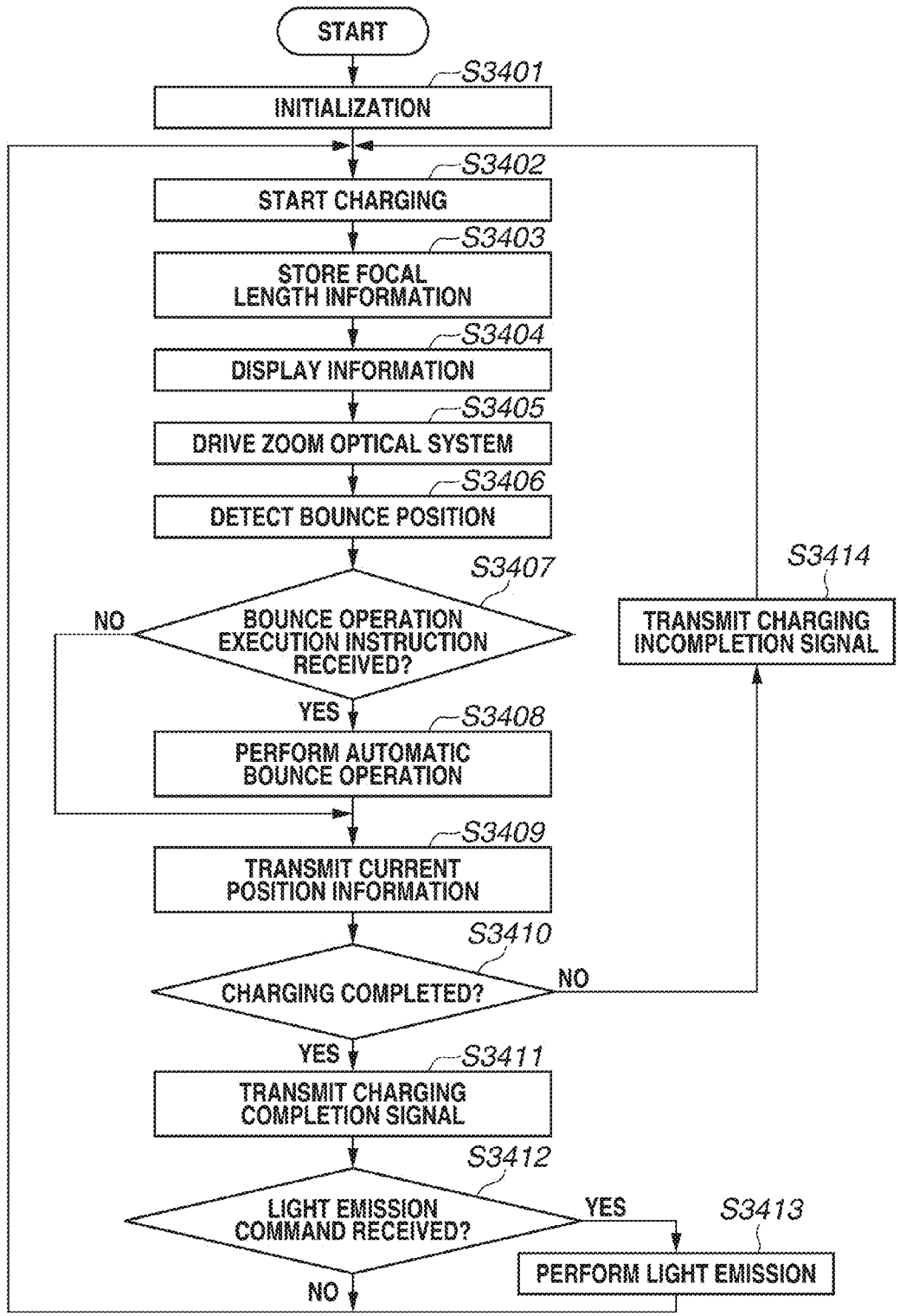

FIG.26A

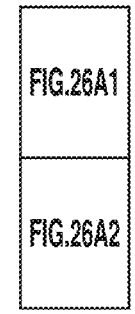

FIG.26A1

| COMMAND | COMMAND NUMBER | CONTENT | DATA ITEM |
|---|---|---|---|
| SC | 000 | AUTOMATIC BOUNCE FUNCTION | |
| HEX: 01 | HEX: 00 | | 0: ABSENT |
| | | | 1: PRESENT |
| | | | |
| SC | 010 | AUTOMATIC BOUNCE SETTING/CANCELLATION | |
| HEX: 01 | HEX: A | | 0: CANCELLATION |
| | | | 1: SETTING |
| | | | |
| SC | 020 | AUTOMATIC BOUNCE DRIVING RANGE | |
| HEX: 01 | HEX: 14 | | 0: ALL DIRECTIONS AVAILABLE |
| | | | 1: HORIZONTAL DIRECTIONS AVAILABLE |
| | | | 2: VERTICAL DIRECTIONS AVAILABLE |
| | | | |
| SC | 030 | AUTOMATIC BOUNCE HORIZONTAL DRIVING RANGE | START - END |
| HEX: 01 | HEX: 1E | | |
| SC | 040 | AUTOMATIC BOUNCE VERTICAL DRIVING RANGE | START - END |
| HEX: 01 | HEX: 28 | | |
| SC | 050 | IN PROCESS OF AUTOMATIC BOUNCE DRIVING (MOTOR) | |
| HEX: 01 | HEX: 32 | | 0: STOP |
| | | | 1: IN PROCESS OF UP OR DOWN OPERATION |
| | | | 2: IN PROCESS OF RIGHT OR LEFT OPERATION |
| | | | |

FIG.26A2

| SC | 060 | AUTOMATIC BOUNCE ERROR | |
|---|---|---|---|
| HEX: 01 | HEX: 3C | | 0: NORMAL |
| | | | 1: ERROR |
| | | | |
| SC | 070 | CURRENT POSITION BOUNCE ANGULAR INFORMATION IN UP AND DOWN DIRECTIONS | |
| HEX: 01 | HEX: 46 | | 000H ~ 168H |
| | | | |
| SC | 080 | CURRENT POSITION BOUNCE ANGULAR INFORMATION IN RIGHT AND LEFT DIRECTIONS | |
| HEX: 01 | HEX: 50 | | 000H ~ 168H |
| | | | |
| SC | 090 | AUTOMATIC BOUNCE DISTANCE MEASURING METHOD | 0x: SUBJECT |
| HEX: 01 | HEX: 5A | | 1x: CEILING (WALL) |
| | | | x0: PRELIMINARY LIGHT EMISSION |
| | | | x1: FLASH-DEVICE BUILT-IN AF |
| | | | x2: CAMERA AF |
| SC | 100 | CEILING DISTANCE INFORMATION | |
| HEX: 01 | HEX: 64 | | DATA |
| | | | |
| SC | 110 | SUBJECT DISTANCE INFORMATION | |
| HEX: 01 | HEX: 6e | | DATA |
| | | | |
| SC | 120 | FLASH-DEVICE ORIENTATION DIFFERENCE INFORMATION | |
| HEX: 01 | HEX: 78 | | HORIZONTAL DATA |
| | | | VERTICAL DATA |
| | | | ANTERIOR-POSTERIOR DATA |
| SC | 130 | IN PROCESS OF AUTOMATIC BOUNCE PRELIMINARY LIGHT EMISSION | |
| HEX: 01 | HEX: 82 | | 0: IN PROCESS OF WAITING |
| | | | 1: IN PROCESS OF LIGHT EMISSION |

FIG.26B

FIG.26B1

| COMMAND | COMMAND NUMBER | CONTENT | DATA ITEM |
|---|---|---|---|
| CS | 001 | AUTOMATIC BOUNCE COMPATIBLE CAMERA | |
| HEX: 08 | HEX: 01 | | 0: INCOMPATIBLE |
| | | | 1: COMPATIBLE |
| | | | |
| CS | 011 | AUTOMATIC BOUNCE SETTING/CANCELLATION | |
| HEX: 08 | HEX: 0B | | 0: CANCELLATION |
| | | | 1: SETTING |
| | | | |
| CS | 021 | AUTOMATIC BOUNCE DRIVING CONDITION INSTRUCTION | |
| HEX: 08 | HEX: 15 | | 0: ALL DIRECTIONS AVAILABLE |
| | | | 1: HORIZONTAL DIRECTIONS |
| | | | 2: VERTICAL DIRECTIONS |
| | | | |
| CS | 031 | AUTOMATIC BOUNCE HORIZONTAL DRIVING RANGE INSTRUCTION | START - END |
| HEX: 08 | HEX: 1F | | |
| CS | 041 | AUTOMATIC BOUNCE VERTICAL DRIVING RANGE INSTRUCTION | START - END |
| HEX: 08 | HEX: 29 | | |

FIG.26B2

| CS | 051 | AUTOMATIC BOUNCE DRIVING INSTRUCTION (MOTOR) | |
|---|---|---|---|
| HEX: 08 | HEX: 33 | | 0: STOP |
| | | | 1: UP OR DOWN OPERATION |
| | | | 2: RIGHT OR LEFT OPERATION |
| | | | |
| CS | 071 | POSITION BOUNCE ANGLE IN UP AND DOWN DIRECTIONS | |
| HEX: 08 | HEX: 47 | | 000H ~ 168H |
| | | | |
| CS | 081 | POSITION BOUNCE ANGLE IN RIGHT AND LEFT DIRECTIONS | |
| HEX: 08 | HEX: 51 | | 000H ~ 168H |
| | | | |
| CS | 091 | AUTOMATIC BOUNCE DISTANCE MEASURING METHOD INSTRUCTION | 0x: SUBJECT |
| HEX: 08 | HEX: 5B | | 1x: CEILING (WALL) |
| | | | x0: PRELIMINARY LIGHT EMISSION |
| | | | x1: FLASH-DEVICE BUILT-IN AF |
| | | | x2: CAMERA AF |
| CS | 101 | CEILING DISTANCE INFORMATION | |
| HEX: 08 | HEX: 65 | | DATA |
| | | | |
| CS | 111 | SUBJECT DISTANCE INFORMATION | |
| HEX: 08 | HEX: 6F | | DATA |
| | | | |
| CS | 121 | CAMERA ORIENTATION DIFFERENCE INFORMATION | |
| HEX: 08 | HEX: 79 | | HORIZONTAL DATA |
| | | | VERTICAL DATA |
| | | | ANTERIOR-POSTERIOR DATA |
| CS | 131 | PRELIMINARY LIGHT EMISSION INHIBITION | |
| HEX: 08 | HEX: 83 | | 0: PERMIT |
| | | | 1: INHIBIT |
| CS | 141 | LIGHT METERING TIMER IN OPERATION | |
| HEX: 08 | HEX: 8D | | 0: NON-OPERATING |
| | | | 1: OPERATING |

FIG.26B3

| CS | 151 | STATE OF RELEASE SWITCH | |
|---|---|---|---|
| HEX: 08 | HEX: 97 | | 0: SWITCHES OFF |
| | | | 1: SW1 ON |
| | | | 2: SW2 ON |
| CS | 161 | CHANGE OF OPERATION SPEED | |
| HEX: 08 | HEX: A1 | | 0: NORMAL |
| | | | 1: LOW SPEED (SILENT) |
| | | | 2: HIGH SPEED |
| CS | 171 | CALCULATION OF BOUNCE ANGLE | |
| HEX: 08 | HEX: AB | | 0: FLASH DEVICE |
| | | | 1: CAMERA BODY |
| | | | |
| CS | 181 | SELECTION OF BOUNCE DRIVING INSTRUCTION | |
| HEX: 08 | HEX: B5 | | 0: FLASH DEVICE |
| | | | 1: CAMERA BODY |
| | | | |
| CS | 191 | DISTANCE MEASURING POINT INFORMATION | |
| HEX: 08 | HEX: BF | | DATA XX, XX |
| | | | |
| | | | |

FIG.34A

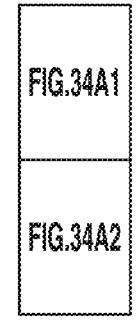

FIG.34A1

| COMMAND | COMMAND NUMBER | CONTENT | DATA ITEM |
|---|---|---|---|
| SC | 000 | AUTOMATIC BOUNCE FUNCTION | |
| HEX: 01 | HEX: 00 | | 0: ABSENT |
| | | | 1: PRESENT |
| | | | |
| SC | 010 | AUTOMATIC BOUNCE SETTING/CANCELLATION | |
| HEX: 01 | HEX: A | | 0: CANCELLATION |
| | | | 1: SETTING |
| | | | |
| SC | 020 | AUTOMATIC BOUNCE DRIVING RANGE | |
| HEX: 01 | HEX: 14 | | 0: ALL DIRECTIONS AVAILABLE |
| | | | 1: HORIZONTAL DIRECTIONS AVAILABLE |
| | | | 2: VERTICAL DIRECTIONS AVAILABLE |
| | | | |
| SC | 030 | AUTOMATIC BOUNCE HORIZONTAL DRIVING RANGE | START - END |
| HEX: 01 | HEX: 1E | | |
| SC | 040 | AUTOMATIC BOUNCE VERTICAL DRIVING RANGE | START - END |
| HEX: 01 | HEX: 28 | | |
| SC | 050 | IN PROCESS OF AUTOMATIC BOUNCE DRIVING (MOTOR) | |
| HEX: 01 | HEX: 32 | | 0: STOP |
| | | | 1: IN PROCESS OF UP OR DOWN OPERATION |
| | | | 2: IN PROCESS OF RIGHT OR LEFT OPERATION |
| | | | |

FIG.34A2

| SC | 060 | AUTOMATIC BOUNCE ERROR | |
|---|---|---|---|
| HEX: 01 | HEX: 3C | | 0: NORMAL |
| | | | 1: ERROR |
| | | | |
| SC | 070 | CURRENT POSITION BOUNCE ANGULAR INFORMATION IN UP AND DOWN DIRECTIONS | |
| HEX: 01 | HEX: 46 | | 000H ~ 168H |
| | | | |
| SC | 080 | CURRENT POSITION BOUNCE ANGULAR INFORMATION IN RIGHT AND LEFT DIRECTIONS | |
| HEX: 01 | HEX: 50 | | 000H ~ 168H |
| | | | |
| SC | 090 | AUTOMATIC BOUNCE DISTANCE MEASURING METHOD | 0x: SUBJECT |
| HEX: 01 | HEX: 5A | | 1x: CEILING (WALL) |
| | | | x0: PRELIMINARY LIGHT EMISSION |
| | | | x1: FLASH-DEVICE BUILT-IN AF |
| | | | x2: CAMERA AF |
| SC | 100 | CEILING DISTANCE INFORMATION | |
| HEX: 01 | HEX: 64 | | DATA |
| | | | |
| SC | 110 | SUBJECT DISTANCE INFORMATION | |
| HEX: 01 | HEX: 6e | | DATA |
| | | | |
| SC | 120 | FLASH-DEVICE ORIENTATION DIFFERENCE INFORMATION | |
| HEX: 01 | HEX: 78 | | HORIZONTAL DATA |
| | | | VERTICAL DATA |
| | | | ANTERIOR-POSTERIOR DATA |
| SC | 130 | IN PROCESS OF AUTOMATIC BOUNCE PRELIMINARY LIGHT EMISSION | |
| HEX: 01 | HEX: 82 | | 0: IN PROCESS OF WAITING |
| | | | 1: IN PROCESS OF LIGHT EMISSION |

FIG.34B

FIG.34B1

| COMMAND | COMMAND NUMBER | CONTENT | DATA ITEM |
|---|---|---|---|
| CS | 001 | AUTOMATIC BOUNCE COMPATIBLE CAMERA | |
| HEX: 08 | HEX: 01 | | 0: INCOMPATIBLE |
| | | | 1: COMPATIBLE |
| | | | |
| CS | 011 | AUTOMATIC BOUNCE SETTING/CANCELLATION | |
| HEX: 08 | HEX: 0B | | 0: CANCELLATION |
| | | | 1: SETTING |
| | | | |
| CS | 021 | AUTOMATIC BOUNCE DRIVING CONDITION INSTRUCTION | |
| HEX: 08 | HEX: 15 | | 0: ALL DIRECTIONS AVAILABLE |
| | | | 1: RIGHT AND LEFT DIRECTIONS |
| | | | 2: UP AND DOWN DIRECTIONS |
| | | | |
| CS | 031 | AUTOMATIC BOUNCE RIGHT AND LEFT DRIVING RANGE INSTRUCTION | START - END |
| HEX: 08 | HEX: 1F | | |
| CS | 041 | AUTOMATIC BOUNCE VERTICAL DRIVING RANGE INSTRUCTION | START - END |
| HEX: 08 | HEX: 29 | | |

FIG.34B2

| CS | 051 | AUTOMATIC BOUNCE DRIVING INSTRUCTION (MOTOR) | |
|---|---|---|---|
| HEX: 08 | HEX: 33 | | 0: STOP |
| | | | 1: UP OR DOWN OPERATION |
| | | | 2: RIGHT OR LEFT OPERATION |
| | | | |
| CS | 071 | POSITION BOUNCE ANGLE IN UP AND DOWN DIRECTIONS | |
| HEX: 08 | HEX: 47 | | 000H ~ 168H |
| | | | |
| CS | 081 | POSITION BOUNCE ANGLE IN RIGHT AND LEFT DIRECTIONS | |
| HEX: 08 | HEX: 51 | | 000H ~ 168H |
| | | | |
| CS | 091 | AUTOMATIC BOUNCE DISTANCE MEASURING METHOD INSTRUCTION | 0x: SUBJECT |
| HEX: 08 | HEX: 5B | | 1x: CEILING (WALL) |
| | | | x0: PRELIMINARY LIGHT EMISSION |
| | | | x1: FLASH-DEVICE BUILT-IN AF |
| | | | x2: CAMERA AF |
| CS | 101 | CEILING DISTANCE INFORMATION | |
| HEX: 08 | HEX: 65 | | DATA |
| | | | |
| CS | 111 | SUBJECT DISTANCE INFORMATION | |
| HEX: 08 | HEX: 6F | | DATA |
| | | | |
| CS | 121 | CAMERA ORIENTATION DIFFERENCE INFORMATION | |
| HEX: 08 | HEX: 79 | | HORIZONTAL DATA |
| | | | VERTICAL DATA |
| | | | ANTERIOR-POSTERIOR DATA |
| CS | 131 | PRELIMINARY LIGHT EMISSION INHIBITION | |
| HEX: 08 | HEX: 83 | | 0: PERMIT |
| | | | 1: INHIBIT |
| CS | 141 | LIGHT METERING TIMER IN OPERATION | |
| HEX: 08 | HEX: 8D | | 0: NON-OPERATING |
| | | | 1: OPERATING |

FIG.34B3

| CS | 151 | STATE OF RELEASE SWITCH | |
|---|---|---|---|
| HEX: 08 | HEX: 97 | | 0: SWITCHES OFF |
| | | | 1: SW1 ON |
| | | | 2: SW2 ON |
| CS | 161 | CHANGE OF OPERATION SPEED | |
| HEX: 08 | HEX: A1 | | 0: NORMAL |
| | | | 1: LOW SPEED (SILENT) |
| | | | 2: HIGH SPEED |
| CS | 171 | CALCULATION OF BOUNCE ANGLE | |
| HEX: 08 | HEX: AB | | 0: FLASH DEVICE |
| | | | 1: CAMERA BODY |
| | | | |
| CS | 181 | SELECTION OF BOUNCE DRIVING INSTRUCTION | |
| HEX: 08 | HEX: B5 | | 0: FLASH DEVICE |
| | | | 1: CAMERA BODY |
| | | | |
| CS | 201 | AF MODE INFORMATION | |
| HEX: 08 | HEX: C9 | | 0: SINGLE |
| | | | 1: SERVO |
| | | | |

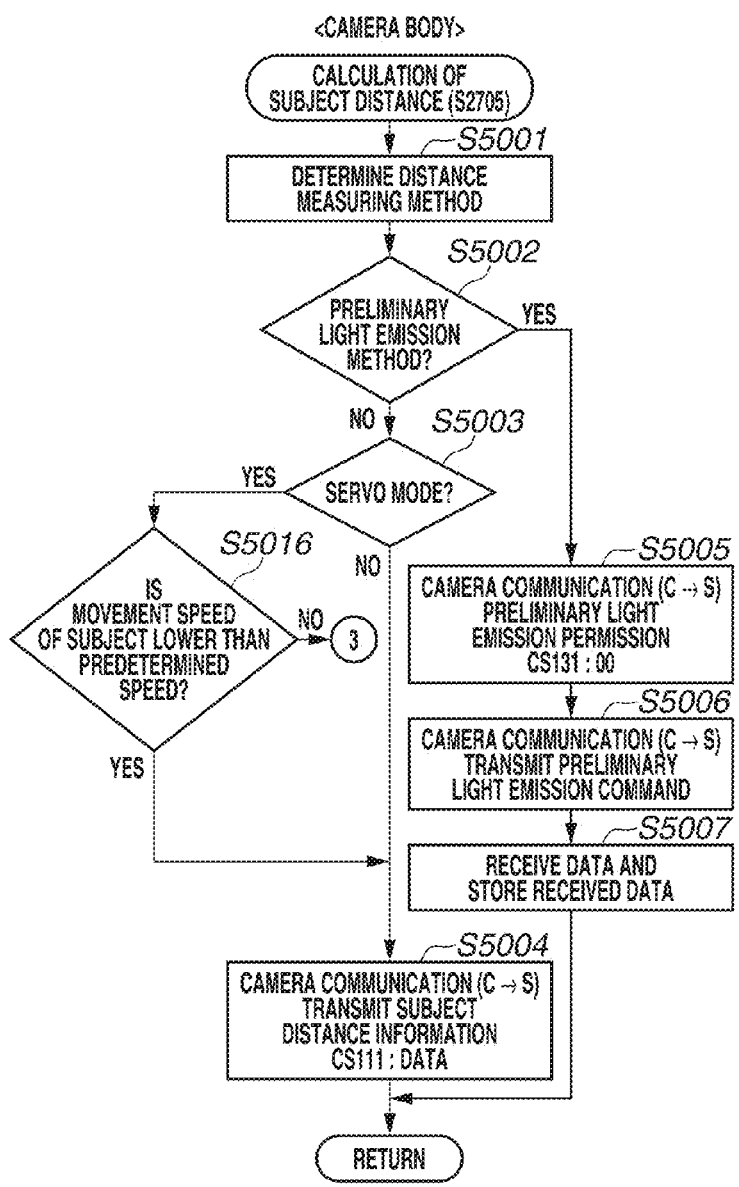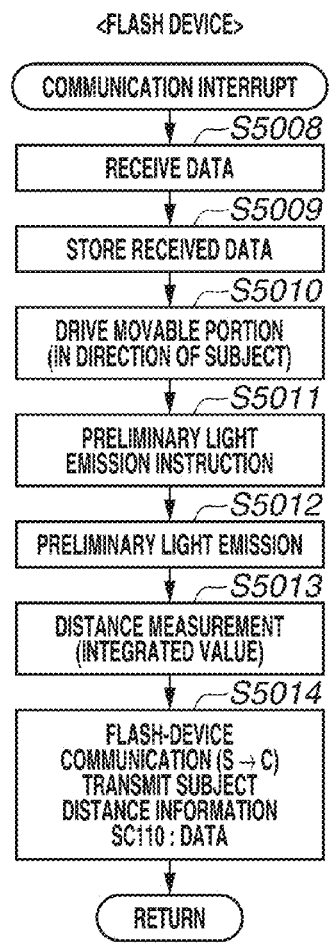

IMAGING SYSTEM, ILLUMINATION DEVICE, AND CONTROL METHOD

BACKGROUND OF THE INVENTION

Field of the Invention

Aspects of the present invention generally relate to control for an illumination device capable of automatically changing a radiation direction.

Description of the Related Art

There is conventionally known light emission shooting in which light from an illumination device is radiated toward a ceiling or the like to irradiate the subject with diffused light reflected from (bouncing off) the ceiling or the like (hereinafter referred to as "bounce light emission shooting"). According to bounce light emission shooting, since light from the illumination device can be radiated not directly but indirectly onto the subject, images shot with soft light can be captured.

Japanese Patent Application Laid-Open No. 2010-8717 discusses an imaging apparatus that finds a high reflective area from a difference in luminance between image signals acquired from an image sensor at the time of emission of light and at the time of non-emission of light from a flash device and, when the proportion of the largeness of the high reflective area is equal to or greater than a predetermined value, determines that a high reflective object is present in the field of view and performs bounce light emission shooting.

However, the imaging apparatus discussed in Japanese Patent Application Laid-Open No. 2010-8717 determines whether to perform bounce light emission shooting based on the proportion of a high reflective area to the field of view and, therefore, may determine to perform bounce light emission shooting even under a condition unsuitable for bounce light emission shooting.

For example, because the imaging apparatus discussed in Japanese Patent Application Laid-Open No. 2010-8717 does not take into consideration the type of an interchangeable lens that is attached to the imaging apparatus, the imaging apparatus may determine to perform bounce light emission shooting even under a condition in which a super-telephoto lens with the focal length of more than 300 mm is attached to the imaging apparatus and light from the illumination device does not reach the subject.

SUMMARY OF THE INVENTION

Aspects of the present invention are generally directed to enabling performing light emission shooting according to the condition of an imaging apparatus.

According to an aspect of the present invention, an imaging system, which includes an illumination device capable of automatically driving a movable portion including a light emission unit to change a radiation direction of the light emission unit and an imaging apparatus, includes an acquisition unit configured to acquire information classifying a lens unit attached to the imaging apparatus, and a control unit configured to control the radiation direction of the light emission unit based on the information classifying the lens unit acquired by the acquisition unit.

Further features of the present invention will become apparent from the following description of exemplary embodiments with reference to the attached drawings.

BRIEF DESCRIPTION OF THE DRAWINGS

FIG. 4 is a flowchart illustrate various processing operations performed by the camera body relating to the automatic bounce light emission shooting according to the first exemplary embodiment.

FIG. 5 illustrates a list indicating the relationships between pieces of lens identification (ID) information and various pieces of information corresponding to the respective pieces of lens ID information.

FIGS. 8A and 8B illustrate the allocation between gray codes and swiveling angles in the rotary encoder.

FIG. 9 is a flowchart illustrating bounce processing according to the first exemplary embodiment.

FIGS. 18A and 18B are flowcharts illustrating automatic bounce data acquisition processing according to the third exemplary embodiment.

FIGS. 22A and 22B are flowcharts illustrating radiation direction determination processing according to the third exemplary embodiment.

FIG. 23A and FIG. 23B, which is composed of FIGS. 23B1 and 23B2, are flowcharts illustrating bounce drive control processing according to the third exemplary embodiment.

FIG. 24 is a flowchart illustrating various processing operations accompanied by a light emitting operation of the flash device including a bounce operation according to the third exemplary embodiment.

FIG. 26A, which is composed of FIGS. 26A1 and 26A2, and FIG. 26B, which is composed of FIGS. 26B1, 26B2, and 26B3, illustrate examples of command lists for communication between the camera body and the flash device according to the third exemplary embodiment.

FIG. 34A, which is composed of FIGS. 34A1 and 34A2, and FIG. 34B, which is composed of FIGS. 34B1, 34B2, and 34B3, illustrate examples of command lists for communication between the camera body and the flash device according to the fourth exemplary embodiment.

FIGS. 36A and 36B are flowcharts illustrating subject distance calculation processing according to a sixth exemplary embodiment of the present invention.

DESCRIPTION OF THE EMBODIMENTS

Various exemplary embodiments, features, and aspects of the invention will be described in detail below with reference to the drawings.

Figure 1A:
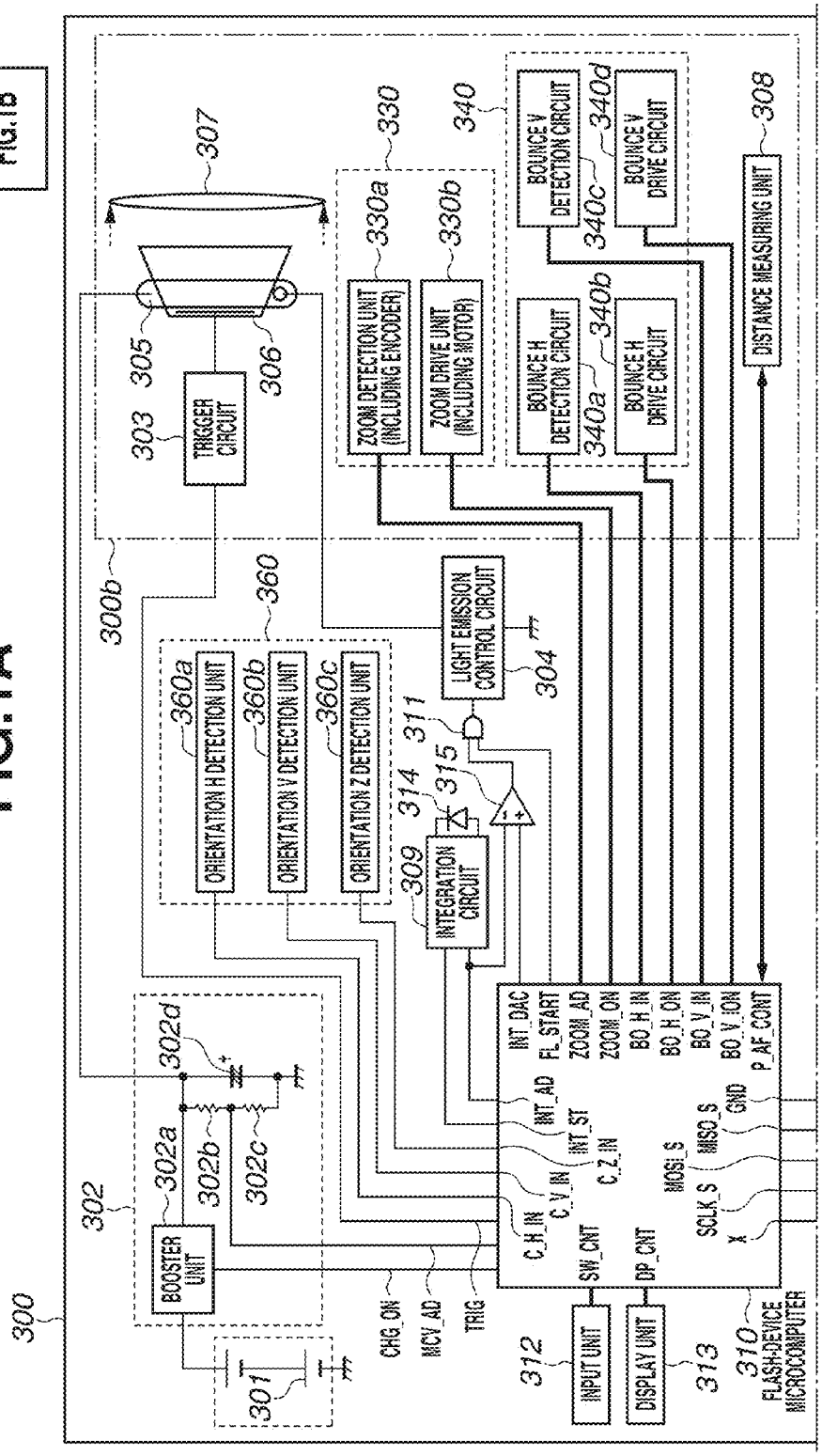
FIG. 1, which is composed of FIGS. 1A and 1B, is a block diagram illustrating a schematic configuration of an imaging system according to a first exemplary embodiment of the present invention.
Figure 1B:
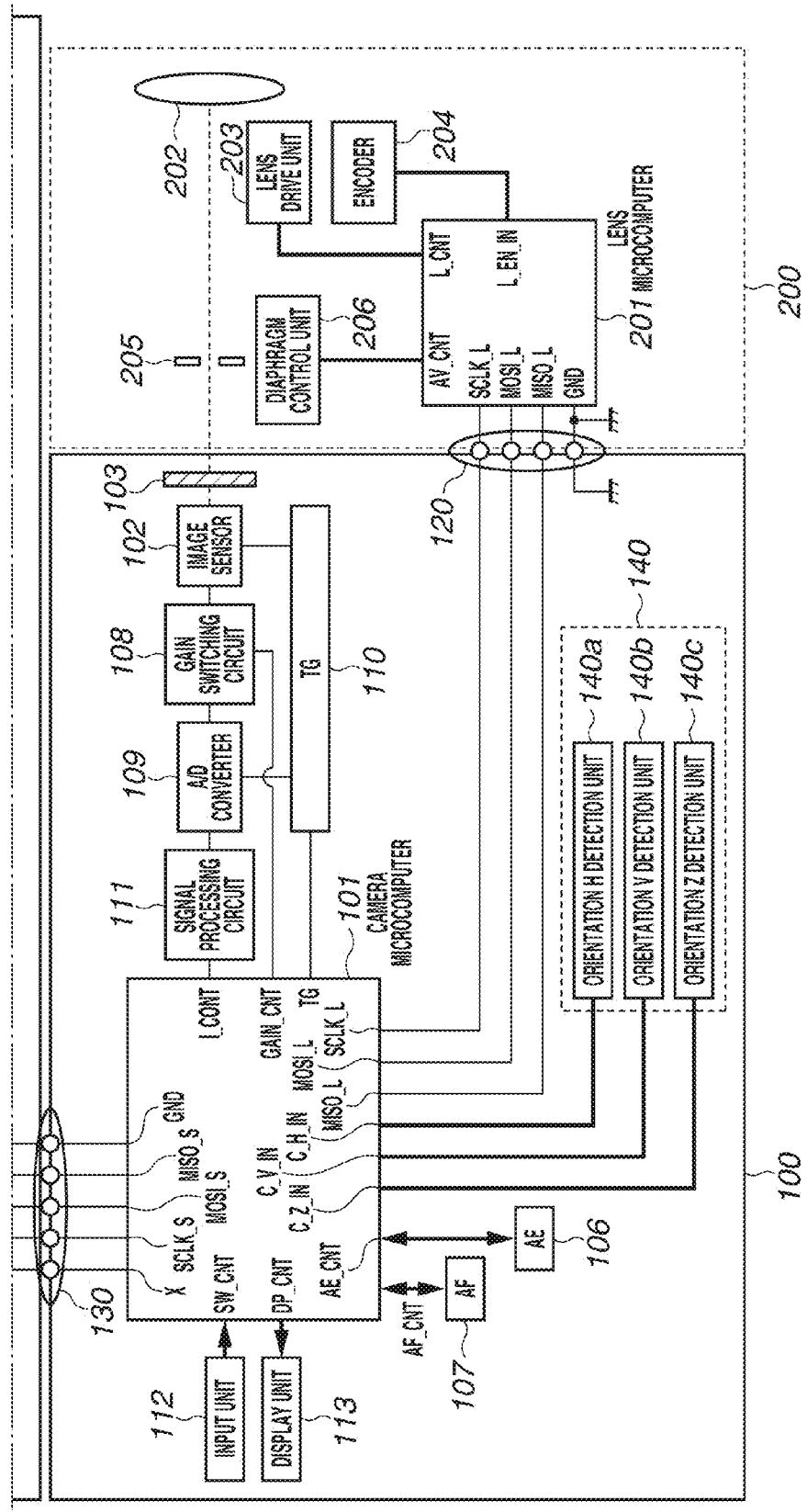
Figure 2:
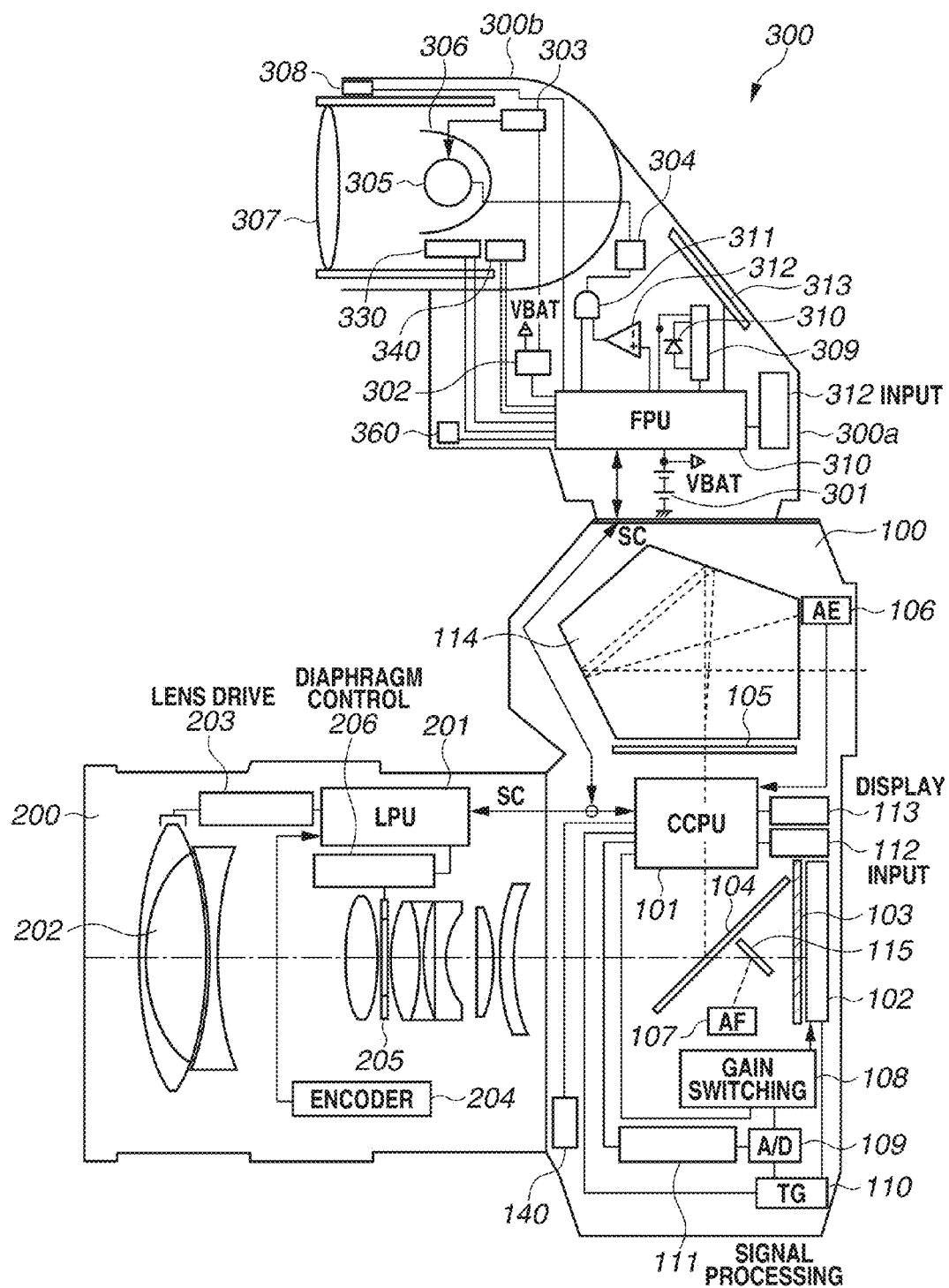
FIG. 2 is a sectional view illustrating the schematic configuration of the imaging system according to the first exemplary embodiment.

FIG. 1, which is composed of FIGS. 1A and 1B, and FIG. 2 are a block diagram and a sectional view, respectively, illustrating a schematic configuration of an imaging system, which includes a digital camera, a lens, and a flash device, according to a first exemplary embodiment of the present invention. The imaging system according to the present exemplary embodiment includes a camera body 100, which is an imaging apparatus, a lens unit 200 detachably attached to the camera body 100, and a flash device 300, which is an illumination device, detachably attached to the camera body 100. In FIGS. 1 and 2, the same components are assigned with the respective same reference numerals.

First, the configuration of the camera body 100 is described. A microcomputer camera central processing unit (CCPU) (hereinafter referred to as a "camera microcomputer") 101 controls each unit of the camera body 100. The camera microcomputer 101 has a one-chip integrated circuit (IC) configuration including, for example, a central processing unit (CPU), a read-only memory (ROM), a random access memory (RAM), an input-output (I/O) control circuit, a multiplexer, a timer circuit, an electrically erasable read-only memory (EEPROM), an analog-to-digital (A/D) converter, and a digital-to-analog (D/A) converter. The camera microcomputer 101 controls the imaging system using software and performs various conditional determinations.

An image sensor 102 is, for example, a charge-coupled device (CCD) sensor or a complementary metal-oxide semiconductor (CMOS) sensor containing a infrared cut filter and a low-pass filter, and a subject image can be formed on the image sensor 102 by a lens group 202, which is described below, during shooting. A shutter 103 is movable between a position to block the image sensor 102 from light and a position to expose the image sensor 102 to light.

A main mirror (half mirror) 104 is movable between a position to receive part of light entering from the lens group 202 to form an image on a focusing screen 105 and a position to withdraw from within an optical path of light entering from the lens group 202 to the image sensor 102 (a shooting optical path). A subject image formed on the focusing screen 105 can be viewed for confirmation by the user via an optical viewfinder (not illustrated).

A light metering circuit (automatic exposure (AE) circuit) 106, which contains a light metering sensor, divides a subject into a plurality of areas and performs light metering for each area. The light metering sensor contained in the light metering circuit 106 senses a subject image formed on the focusing screen 105 via a pentaprism 114, which is described below. A focus detection circuit (automatic distance measuring (AF) circuit) 107, which contains a distance measuring sensor having a plurality of distance measuring points, outputs focus information such as the defocus amount of each distance measuring point.

A gain switching circuit 108, which amplifies a signal output from the image sensor 102, switches the gain of the signal by being controlled by the camera microcomputer 101 according to a shooting condition or a user operation.

An A/D converter 109 converts the analog signal output from the image sensor 102 and amplified by the gain switching circuit 108 into a digital signal. A timing generator (TG) 110 synchronizes the input of the analog signal output from the image sensor 102 and amplified by the gain switching circuit 108 with the conversion timing of the A/D converter 109.

A signal processing circuit 111 performs signal processing on image data which is a digital signal output from the A/D converter 109.

A communication line SC is a signal line used for an interface between the camera body 100, the lens unit 200, and the flash device 300. For example, the camera microcomputer 101 serves as a host to mutually perform information communication, such as exchange of data and transmission of commands, with the lens unit 200 and the flash device 300. The communication line SC is used for serial communication of the three-terminal type using, for example, a terminal group 120 and a terminal group 130, illustrated in FIG. 1. The terminal group 120 includes an SCLK_L terminal used to perform communication synchronization between the camera body 100 and the lens unit 200, an MOSI_L terminal used to transmit data to the lens unit 200, and an MISO_L terminal used to receive data transmitted from the lens unit 200. The terminal group 120 further includes a ground (GND) terminal used to connect both of the camera body 100 and the lens unit 200.

The terminal group 130 includes an SCLK_S terminal used to perform communication synchronization between the camera body 100 and the flash device 300, an MOSI_S terminal used to transmit data from the camera body 100 to the flash device 300, and an MISO_S terminal used to receive data transmitted from the flash device 300. The terminal group 130 further includes a ground (GND) terminal used to connect both of the camera body 100 and the flash device 300.

An input unit 112 includes operation portions, such as a power switch, a release switch, and a setting button. The camera microcomputer 101 performs various processing operations according to the inputs to the input unit 112. When the release switch is operated one step (half pressed), an SW1 switch is turned on and the camera microcomputer 101 starts a shooting preparatory operation, such as focus adjustment and light metering. Furthermore, when the release switch is operated two steps (fully pressed), an SW2 switch is turned on and the camera microcomputer 101 starts a shooting operation, such as exposure and development processing. Moreover, the user can operate the setting button contained in the input unit 112 to perform various settings of the flash device 300 attached to the camera body 100. A display unit 113, which includes a liquid crystal device and a light emitting element, displays various set modes and other shooting information.

The pentaprism 114 leads a subject image formed on the focusing screen 105 to the light metering sensor contained in the light metering circuit 106 and to the optical viewfinder (not illustrated). A sub mirror 115 leads light entering from the lens group 202 and passing through the main mirror 104 to the distance measuring sensor contained in the focus detection circuit 107.

An orientation detection circuit 140 includes an orientation H detection unit 140a, which detects an orientation difference in the horizontal direction, an orientation V detection unit 140b, which detects an orientation difference in the vertical direction, and an orientation Z detection unit 140c, which detects an orientation difference in the anteroposterior direction. For example, an angular velocity sensor or a gyro sensor is used as the orientation detection circuit 140. Orientation information detected by the orientation detection circuit 140 about orientation differences in the respective directions is fed to the camera microcomputer 101.

Next, the configuration and operation of the lens unit 200 is described. A microcomputer lens processing unit (LPU) (hereinafter referred to as a "lens microcomputer") 201 controls each unit of the lens unit 200.

The lens microcomputer 201 has a one-chip integrated circuit (IC) configuration including, for example, a CPU, a ROM, a RAM, an I/O control circuit, a multiplexer, a timer circuit, an EEPROM, an A/D converter, and a D/A converter.

The lens group 202 includes a plurality of lenses, such as a focus lens and a zoom lens. However, the lens group 202 does not need to include a zoom lens. A lens drive unit 203 is a driving system for moving a lens included in the lens group 202. The amount of driving by which to drive the lens group 202 is calculated by the camera microcomputer 101 based on the output of the focus detection circuit 107, which is included in the camera body 100. The calculated amount of driving is transmitted from the camera microcomputer 101 to the lens microcomputer 201. An encoder 204 detects the position of the lens group 202 to output drive information. The lens drive unit 203 moves the lens group 202 by the amount of driving based on the drive information output from the encoder 204, thus performing focus adjustment. A diaphragm 205, which adjusts the amount of passing light, is controlled by the lens microcomputer 201 via a diaphragm control unit 206.

Next, the configuration of the flash device 300 is described. The flash device 300 includes a body portion 300a, which is detachably attachable to the camera body 100, and a movable portion 300b, which is held in such a way as to be able to be swiveled in the up and down directions and in the right and left directions relative to the body portion 300a. In the present exemplary embodiment, the swiveling direction of the movable portion 300b is defined assuming that the side of the body portion 300a coupled to the movable portion 300a is the upper side. Furthermore, the side of the imaging system facing the subject is set as the front side, and the radiation direction parallel to the shooting optical axis is set as the frontal direction.

A microcomputer flash-device processing unit (FPU) (hereinafter referred to as a "flash-device microcomputer") 310 controls each unit of the flash device 300. The flash-device microcomputer 310 has a one-chip integrated circuit (IC) configuration including, for example, a CPU, a ROM, a RAM, an I/O control circuit, a multiplexer, a timer circuit, an EEPROM, an A/D converter, and a D/A converter.

A battery 301 serves as the power source (VBAT) of the flash device 300. A booster circuit block 302 includes a booster unit 302a, resistors 302b and 302c used for voltage detection, and a main capacitor 302d. The booster circuit block 302 causes the booster unit 302a to increase the voltage of the battery 301 to several hundred volts and causes the main capacitor 302d to store electric energy to be used for light emission.

The charging voltage of the main capacitor 302d is divided by the resistors 302b and 302c, and the output of the divided voltage is input to an A/D conversion terminal of the flash-device microcomputer 310. A trigger circuit 303 applies, to a discharge tube 305, which is described below, a pulse voltage for exciting the discharge tube 305. A light emission control circuit 304 controls starting and stopping of light emission of the discharge tube 305. The discharge tube 305, having received a pulse voltage of several kV applied from the trigger circuit 303, is excited to emit light using electric energy stored in the main capacitor 302d.

A distance measuring unit 308 detects a distance therefrom to a target object using a known method. For example, the distance measuring unit 308, which contains a light receiving sensor, receives, via the light receiving sensor, light reflected from the target object situated in the radiation direction resulting from the light emitted from the discharge tube 305 and detects a distance therefrom to the target object based on the received light. Alternatively, the distance measuring unit 308, which further contains a light source for distance measurement, receives, via the light receiving sensor, light reflected from the target object situated in the radiation direction resulting from the light emitted from the light source for distance measurement and detects a distance therefrom to the target object based on the received light.

An integration circuit 309 integrates received light current generated by a photodiode 314, which is described below, and outputs a result of integration to the inverting input terminal of a comparator 315, which is described below, and to the A/D converter terminal of the flash-device microcomputer 310. The non-inverting input terminal of the comparator 315 is connected to the D/A converter terminal of the flash-device microcomputer 310, and the output of the comparator 315 is connected to one input terminal of an AND gate 311, which is described below. The other input terminal of the AND gate 311 is connected to the light emission control terminal of the flash-device microcomputer 310, and the output of the AND gate 311 is input to the light emission control circuit 304. The photodiode 314 is a sensor that directly receives light emitted from the discharge tube 305 or that receives light emitted from the discharge tube 305 via a glass fiber or the like.

A light reflector 306 reflects light emitted from the discharge tube 305 and guides the light in a predetermined direction. A zoom optical system 307, which contains an optical panel, etc., is held in such a way as to be able to change its position relative to the discharge tube 305. Changing the relative position between the discharge tube 305 and the zoom optical system 307 enables changing the guide number and radiation range of the flash device 300. The light emission unit of the flash device 300 is composed mainly of the discharge tube 305, the light reflector 306, and the zoom optical system 307. The radiation range of the light emission unit varies according to the movement of the zoom optical system 307, and the radiation direction of the light emission unit varies according to the swiveling of the movable portion 300b.

An input unit 312 includes operation portions, such as a power switch, a mode setting switch for setting the operation mode of the flash device 300, and a setting button for setting various parameters. The flash-device microcomputer 310 performs various processing operations according to inputs to the input unit 312.

A display unit 313, which includes a liquid crystal device and a light emitting element, displays each status of the flash device 300.

A zoom drive circuit 330 includes a zoom detection unit 330a, which detects, via an encoder, information about the relative position between the discharge tube 305 and the zoom optical system 307, and a zoom drive unit 330b, which includes a motor for moving the zoom optical system 307.

The amount of driving by which to drive the zoom optical system 307 is calculated by the flash-device microcomputer 310, having acquired focal length information output from the lens microcomputer 201 via the camera microcomputer 101, based on the focal length information.

A bounce circuit 340 includes bounce position detection circuits 340a and 340c, each of which detects the amount of driving of the movable portion 300b (the swiveling angle of the movable portion 300b relative to the body portion 300a), and bounce drive circuits 340b and 340d, each of which swivels the movable portion 300b.

The bounce position detection circuit (bounce H detection circuit) 340a detects the amount of driving in the right or left direction of the movable portion 300b and the bounce position detection circuit (bounce V detection circuit) 340c detects the amount of driving in the up or low direction of the movable portion 300b, via a rotary encoder or an absolute encoder.

The bounce drive circuit (bounce H drive circuit) 340b performs driving in the right and left directions of the movable portion 300b and the bounce drive circuit (bounce V drive circuit) 340d performs driving in the up and down directions of the movable portion 300b, using known motors.

Figure 6A:
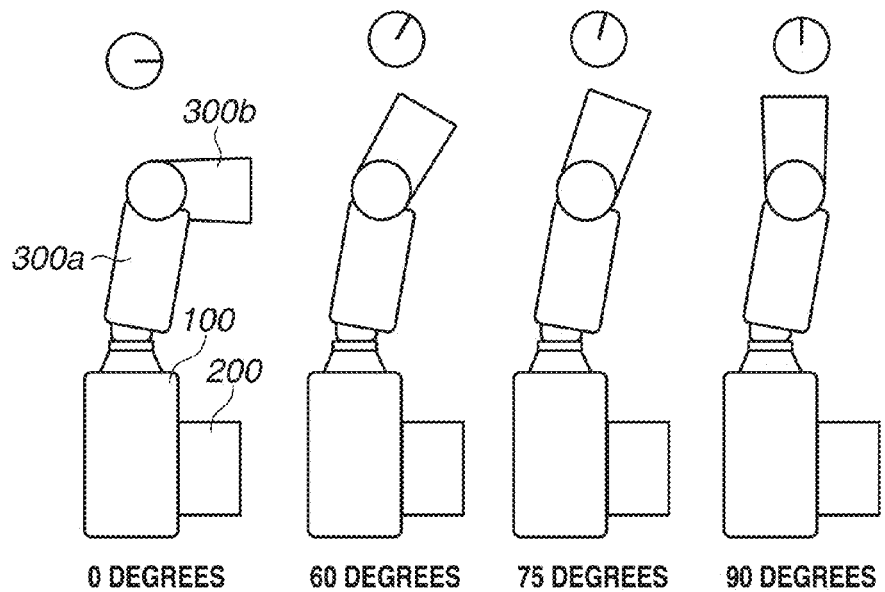
FIGS. 6A and 6B illustrate swiveling ranges in the up and down directions and in the right and left directions of a movable portion.
Figure 6B:
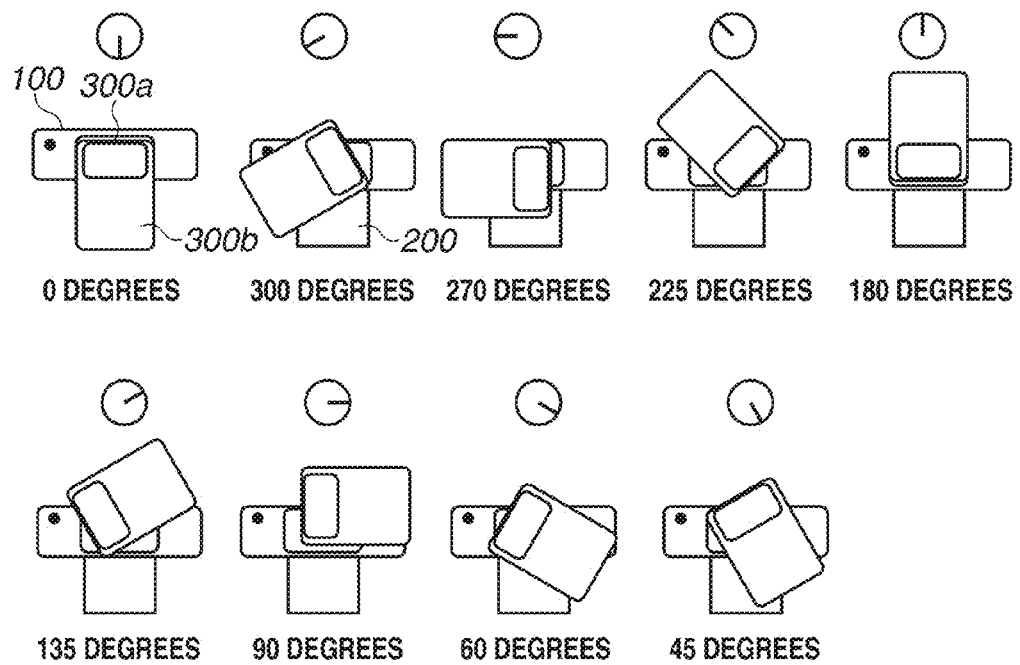
Figure 7A:
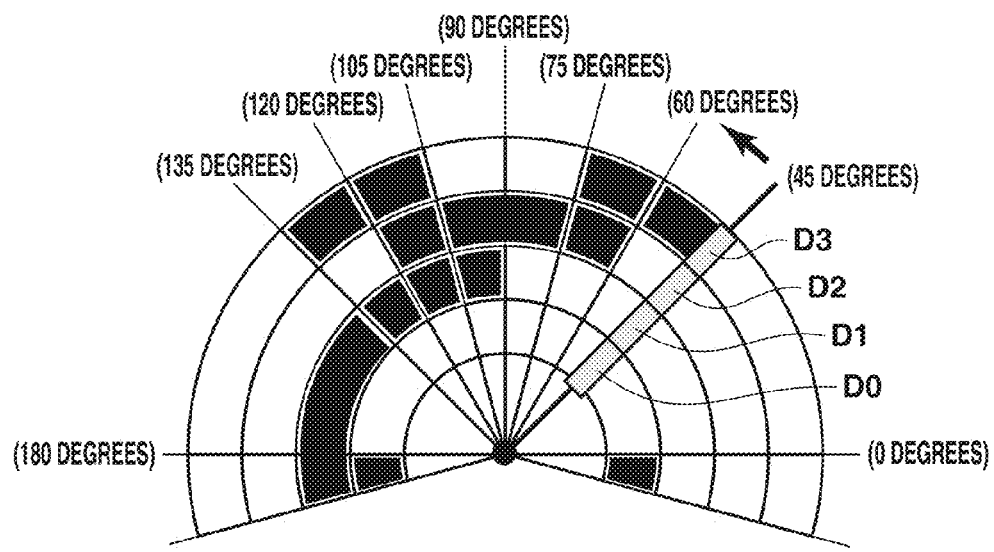
FIGS. 7A and 7B illustrate results of detection obtained by a rotary encoder in the up and down directions and in the right and left directions.
Figure 7B:
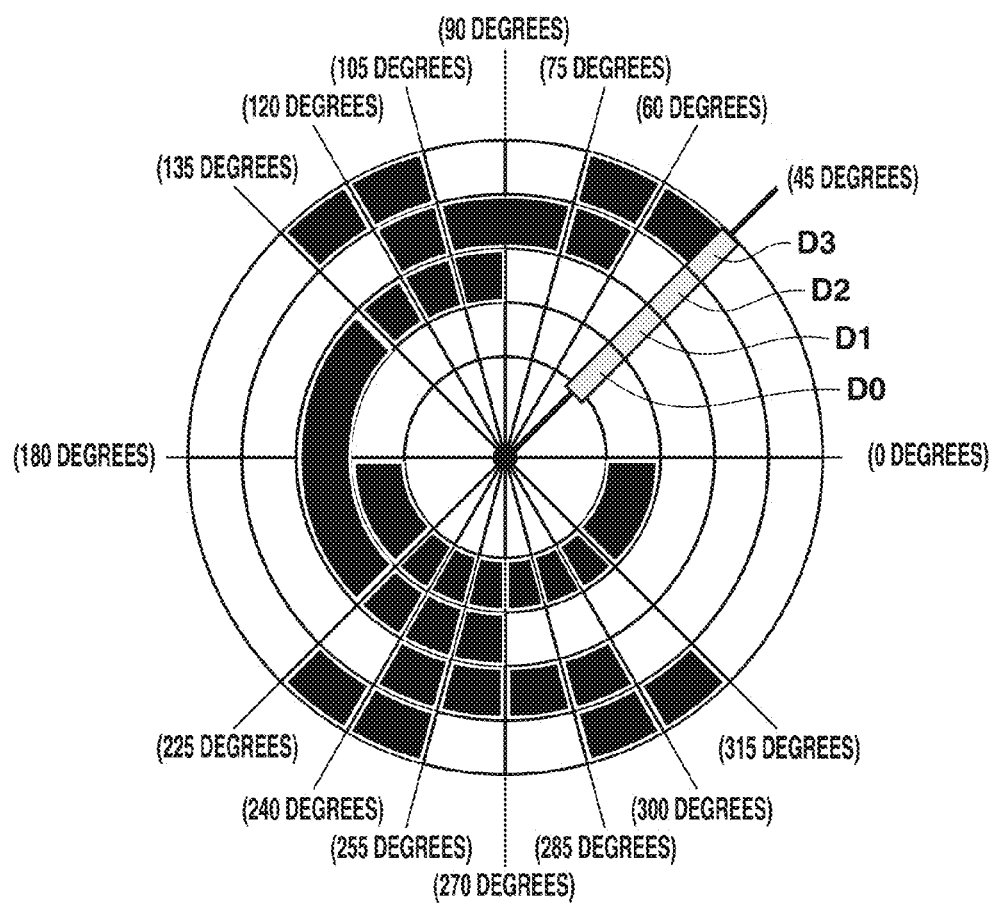

Now, examples of the swiveling range of and the detection method for the movable portion 300b of the flash device 300 are described with reference to FIGS. 6A and 6B, FIGS. 7A and 7B, and FIGS. 8A and 8B. FIGS. 6A and 6B illustrate the swiveling motions of the movable portion 300b in the up and down directions and in the right and left directions, respectively. FIGS. 7A and 7B illustrate outputs of the rotary encoders for up and down directions and for right and left directions, respectively. FIGS. 8A and 8B illustrate the allocation between gray codes and swiveling angles in the rotary encoder.

As illustrated in FIG. 6A, the movable portion 300b is held in such a way as to be able to swivel the in the up and down directions relative to the body portion 300a, and, as illustrated in FIG. 6B, the movable portion 300b is held in such a way as to be able to swivel in the right and left directions relative to the body portion 300a. Furthermore, the state in which the position in the up and down directions of the movable portion 300b is 0 degrees in FIG. 6A and the position in the right and left directions of the movable portion 300b is 0 degrees in FIG. 6B is defined as a reference position of the movable portion 300b. An index expressed by a combination of a circle and a radial line segment in each state illustrated in FIGS. 6A and 6B corresponds to a position on each of the rotary encoders illustrated in FIGS. 7A and 7B.

FIG. 7A illustrates a configuration for detecting the swiveling angle in the up and down directions via the rotary encoder using 4-bit gray codes, and FIG. 7B illustrates a configuration for detecting the swiveling angle in the right and left directions via the rotary encoder using 4-bit gray codes.

The detection portions of the rotary encoder for detecting the swiveling in the up and down directions and the rotary encoder for detecting the swiveling in the right and left directions are configured with a known structure using photo-reflectors and photo-interrupters. In the present exemplary embodiment, the rotary encoder outputs "0" and "1" at each white portion and black portion, respectively, illustrated in FIGS. 7A and 7B. Furthermore, the output of the rotary encoder is determined at the rise of bit changes during the swiveling motion, and the pattern data is read during the stop of the rotary encoder.

As illustrated in FIGS. 8A and 8B, the rotary encoders output different signals according to the swiveling angles, so that the bounce position detection circuits 340a and 340c can detect the respective amounts of driving of the movable portion 300b.

An orientation detection circuit 360, which detects orientation differences, includes an orientation H detection unit 360a, which detects an orientation difference in the horizontal direction, an orientation V detection unit 360b, which detects an orientation difference in the vertical direction, and an orientation Z detection unit 360c, which detects an orientation difference in the anteroposterior direction (z direction). For example, an angular velocity sensor or a gyro sensor is used as the orientation detection circuit 360.

Next, various processing operations of the camera body 100 relating to automatic bounce light emission shooting are described with reference to FIGS. 3 and 4. When the camera microcomputer 101 of the camera body 100 is activated in response to the power switch included in the input unit 112 being turned on, the camera microcomputer 101 starts the flowchart illustrated in FIG. 3.

In step S1, the camera microcomputer 101 performs initialization of its memories and ports. Furthermore, the camera microcomputer 101 reads the states of switches included in the input unit 112 and previously set pieces of input information, and performs setting of various shooting modes, such as the method of determining a shutter speed and the method of determining an aperture value.

In step S2, the camera microcomputer 101 determines whether the SW1 switch is turned on with the release switch included in the input unit 112 being operated. If the camera microcomputer 101 determines that the SW1 switch is turned on (YES in step S2), the processing proceeds to step S3. If the camera microcomputer 101 determines that the SW1 switch is off (NO in step S2), the processing repeats step S2.

In step S3, the camera microcomputer 101 performs communication with the lens microcomputer 201 included in the lens unit 200 via the communication line SC. Then, the camera microcomputer 101 acquires focal length information and optical information required for focus adjustment and light metering about the lens unit 200.

In step S4, the camera microcomputer 101 acquires lens ID information as information about the classification of the lens unit 200. Based on the lens ID information, the camera microcomputer 101 can discriminate which of a plurality of classifications of lenses, such as a standard lens (fixed focal length lens), a standard zoom lens, a wide-angle lens, a super-wide-angle lens (fisheye lens), a telephoto lens, and a super-telephoto lens, the lens unit 200 is. FIG. 5 illustrates a tabulated list showing the relationship between the lens ID information and the various pieces of information corresponding to the lens ID information. As illustrated in FIG. 5, the lens ID information is associated with the focal length, full-aperture F-number, classification (standard, wide-angle, telephoto, and others), and compatibility with automatic bounce light emission shooting. The list illustrated in FIG. 5 is stored in a memory included in the camera microcomputer 101. The camera microcomputer 101 can acquire individual lens ID information from the lens unit 200 attached to the camera body 100, thus grasping various pieces of information about the attached lens unit 200.

In step S5, the camera microcomputer 101 determines whether the flash device 300 is attached to the camera body 100. If the camera microcomputer 101 determines that the flash device 300 is attached to the camera body 100 (YES in step S5), the processing proceeds to step S6. If the camera microcomputer 101 determines that the flash device 300 is not attached to the camera body 100 (NO in step S5), the processing proceeds to step S9b.

In step S6, the camera microcomputer 101 performs communication with the flash-device microcomputer 310 included in the flash device 300 via the communication line SC and acquires flash device information, such as a flash device ID and charging information indicating the charging status of the main capacitor 302d, from the flash-device microcomputer 310. Furthermore, the camera microcomputer 101 performs communication with the flash-device microcomputer 310 via the communication line SC and transmits the focal length information acquired in step S3 to the flash-device microcomputer 310. Accordingly, the flash-device microcomputer 310 calculates the amount of driving of the zoom optical system 307 based on the received focal length information and moves the zoom optical system 307 based on the calculated amount of driving to change the radiation range of the flash device 300 to a range matched with the focal length.

In step S7, the camera microcomputer 101 makes preparations to transmit the information about the flash device 300 input via the input unit 112 to the flash-device microcomputer 310 included in the flash device 300. Here, the camera microcomputer 101 determines the information about the flash device 300 input via the input unit 112 and converts the information into commands to be transmitted.

In step S8, the camera microcomputer 101 transmits, to the flash device 300, the input information about the flash device 300 prepared for transmission in step S7.

In step S9a, the camera microcomputer 101 determines whether the focus adjustment mode currently set is an automatic focusing (AF) mode. If the camera microcomputer 101 determines that the focus adjustment mode currently set is the AF mode (YES in step S9a), the processing proceeds to step S10a. If the camera microcomputer 101 determines that the focus adjustment mode currently set is a manual focusing (MF) mode (NO in step S9a), the processing proceeds to step S12. In the flowchart of FIG. 3, steps for performing the same processing are assigned with the same numeral, such as step S9a and step S9b. In step S10a, the camera microcomputer 101 drives the focus detection circuit 107 to perform a focus detecting operation using a known phase-difference detection method.

Furthermore, in step S10a, the camera microcomputer 101 determines a distance measuring point, which is to be focused on, from among a plurality of distance measuring points during focus adjustment, according to a known automatic selection algorithm basically based on near-point priority or a user operation on the input unit 112.

In step S11a, the camera microcomputer 101 stores the distance measuring point determined in step S10a into a RAM included in the camera microcomputer 101. Furthermore, in step S11a, the camera microcomputer 101 calculates the amount of driving of the lens group 202 based on focus information output from the focus detection circuit 107. Then, the camera microcomputer 101 performs communication with the lens microcomputer 201 included in the lens unit 200 via the communication line SC and moves the lens group 202 based on the calculated amount of driving.

In step S12, the camera microcomputer 101 determines whether the lens unit 200 is compatible with automatic bounce light emission shooting, based on the lens ID information acquired in step S4. The camera microcomputer 101 performs such determination based on the item of "compatibility with automatic bounce light emission shooting" set forth in the list illustrated in FIG. 5. If the camera microcomputer 101 determines that the lens unit 200 is compatible with automatic bounce light emission shooting (YES in step S12), the processing proceeds to step S13. If the camera microcomputer 101 determines that the lens unit 200 is not compatible with automatic bounce light emission shooting (NO in step S12), the processing proceeds to step S18.

Referring to FIG. 5, in the case of the lens ID=L01, the camera microcomputer 101 determines that the focal length=50 mm, the full-aperture F-number=1.8, the classification=standard, and the compatibility with automatic bounce light emission shooting=compatible. In the case of the lens ID=L04, the camera microcomputer 101 determines that the focal length=14 mm, the full-aperture F-number=2.8, the classification=super-wide-angle, and the compatibility with automatic bounce light emission shooting=incompatible. In the case of a lens unit with the lens ID=L04, since the focal length is short, a wide range containing a part of the ceiling or wall can be shot. Therefore, it is supposed that there may be captured an unnatural image containing a part of the ceiling or wall irradiated with light from the flash device 300 due to bounce light emission shooting. Accordingly, in the case of the lens ID=L04, the compatibility with automatic bounce light emission shooting is set to "incompatible". In a case where the compatibility with automatic bounce light emission shooting is set based on the above-mentioned condition, a lens unit with the focal length shorter than a first threshold value can be set to the compatibility with automatic bounce light emission shooting=incompatible. The first threshold value is not particularly limiting.

In the case of the lens ID=L06, the camera microcomputer 101 determines that the focal length=400 mm, the full-aperture F-number=2.8, the classification=super-telephoto, and the compatibility with automatic bounce light emission shooting=incompatible. In the case of a lens unit with the lens ID=L06, a sufficiently distant subject is set as the shooting target. Therefore, it is supposed that, even when a part of the ceiling or wall is irradiated with light from the flash device 300, the reflected light from the part of the ceiling or wall does not reach a subject. Accordingly, in the case of the lens ID=L06, the compatibility with automatic bounce light emission shooting is set to "incompatible". In a case where the compatibility with automatic bounce light emission shooting is set based on the above-mentioned condition, a lens unit with the focal length equal to or longer than a second threshold value can be set to the compatibility with automatic bounce light emission shooting=incompatible. The second threshold value is not particularly limiting as long as it is greater than the first threshold value.

In the case of the lens ID=L07, the camera microcomputer 101 determines that the focal length=24 mm, the full-aperture F-number=3.5, the classification=shift-tilt lens, and the compatibility with automatic bounce light emission shooting=incompatible. In the case of a lens unit with the lens ID=L07, when a lens is shifted or tilted, a wide range containing a part of the ceiling or wall can be shot. Therefore, it is supposed that there may be captured an unnatural image containing a part of the ceiling or wall irradiated with light from the flash device 300 due to bounce light emission shooting. Accordingly, in the case of the lens ID=L07, the compatibility with automatic bounce light emission shooting is set to "incompatible". Furthermore, besides a shift-tilt lens, a lens unit used for special shooting may be set to the compatibility with automatic bounce light emission shooting=incompatible.

In the case of a lens unit with no lens ID, in other words, in the case of the lens ID=N/A, the classification of the lens unit cannot be specified. Therefore, since it is not guaranteed that the lens unit is suited for bounce light emission shooting, the compatibility with automatic bounce light emission shooting is set to "incompatible". In the other lens units with the lens ID=L02 (standard zoom), the lens ID=L03 (wide-angle), and the lens ID=L05 (telephoto), the compatibility with automatic bounce light emission shooting is set to "compatible" as in the lens ID=L01 (standard lens).

In the above-described way, the camera microcomputer 101 determines whether to perform automatic bounce light emission shooting, based on information classifying the attached lens unit.

In step S13, the camera microcomputer 101 determines whether to perform an operation for automatically determining the radiation direction for bounce light emission shooting (hereinafter referred to as an "automatic bounce operation"). Whether to perform the automatic bounce operation is determined based on the state of an automatic bounce switch, which is used to switch whether to perform the automatic bounce operation, included in the input unit 112 or the input unit 312 or the other state of the camera body 100. If the camera microcomputer 101 determines to perform the automatic bounce operation (YES in step S13), the processing proceeds to step S14. If the camera microcomputer 101 determines not to perform the automatic bounce operation (NO in step S13), the processing proceeds to step S18.

In step S14, the camera microcomputer 101 performs processing about the automatic bounce operation (hereinafter referred to as "bounce processing"). The details of the bounce processing are described below with reference to FIG. 9. Upon completion of the bounce processing, the processing proceeds to step S15. In step S15, the camera microcomputer 101 determines whether an error has occurred in the bounce processing. If the camera microcomputer 101 determines that an error has occurred in the bounce processing (YES in step S15), the processing proceeds to step S16. If the camera microcomputer 101 determines that no error has occurred in the bounce processing (NO in step S15), the processing proceeds to step S18. In a case where an error has occurred in the bounce processing, information indicating that an error has occurred in the bounce processing is transmitted from the flash-device microcomputer 310 to the camera microcomputer 101 during the bounce processing in step S14.

In step S16, the camera microcomputer 101 causes the display unit 113 to display the information indicating that an error has occurred in the bounce processing. Furthermore, the camera microcomputer 101 may perform communication with the flash-device microcomputer 310 and, then, the flash-device microcomputer 310 may cause the display unit 313 of the flash device 300 to display the information indicating that an error has occurred in the bounce processing.

In step S17, the camera microcomputer 101 switches over to a setting for not allowing light emission shooting (non-light-emission setting). Then, the processing proceeds to step S18.

If, in step S5, the camera microcomputer 101 determines that the flash device 300 is not attached to the camera body 100 (NO in step S5), the processing proceeds to step S9b. In step S9b, the camera microcomputer 101 determines whether the focus adjustment mode currently set is the AF mode, as in step S9a. If the camera microcomputer 101 determines that the focus adjustment mode currently set is the AF mode (YES in step S9b), the processing proceeds to step S10b. If the camera microcomputer 101 determines that the focus adjustment mode currently set is the MF mode (NO in step S9b), the processing proceeds to step S18.

In step S10b, the camera microcomputer 101 performs the same processing as in step S10a, and then in step S11b, performs the same processing as in step S11a. Then, the processing proceeds to step S18.

In step S18, the camera microcomputer 101 causes the light metering circuit 106 to perform a light metering operation and acquires a result of light metering from the light metering circuit 106. For example, in a case where the light metering sensor of the light metering circuit 106 performs light metering at each of six divisional areas, the camera microcomputer 101 stores the luminance value of each area, which is the acquired result of light metering, as $EVb(i)(i=0-5)$, into the RAM.

In step S19, the camera microcomputer 101 causes the gain switching circuit 108 to switch the gain according to a gain setting input via the input unit 112. The gain setting is, for example, a setting for ISO sensitivity. Furthermore, in step S19, the camera microcomputer 101 performs communication with the flash-device microcomputer 310 via the communication line SC and transmits, for example, gain setting information indicating the switched gain to the flash-device microcomputer 310.

In step S20, the camera microcomputer 101 performs an exposure calculation using a known algorithm based on the result of light metering acquired in step S18 (the luminance value of each area stored in the RAM), thus determining an exposure value (EVs).

In step S21, the camera microcomputer 101 determines whether a charging completion signal has been received from the flash-device microcomputer 310. If the camera microcomputer 101 determines that the charging completion signal has been received (YES in step S21), the processing proceeds to step S22. If the camera microcomputer 101 determines that the charging completion signal has not been received (NO in step S21), the processing proceeds to step S23.

In step S22, the camera microcomputer 101 determines exposure control values (shutter speed (Tv) and aperture value (Av)) suitable for light emission shooting based on the exposure value calculated in step S20.

On the other hand, in step S23, the camera microcomputer 101 determines exposure control values suitable for non-light-emission shooting, in which the flash device 300 is not allowed to emit light, based on the exposure value calculated in step S20.

After the exposure control values are determined in step S22 or S23, the processing proceeds to step S24. In step S24, the camera microcomputer 101 determines whether the SW2 switch is turned on with the release switch included in the input unit 112 being operated. If the camera microcomputer 101 determines that the SW2 switch is turned on (YES in step S24), the processing proceeds to step S25 illustrated in FIG. 4. If the camera microcomputer 101 determines that the SW2 switch is off (NO in step S24), the processing returns to step S2.

Processing in step S25 and subsequent steps is processing associated with light emission shooting, and processing associated with non-light-emission shooting is processing obtained by omitting processing for performing main light emission from the processing in step S25 and subsequent steps.

In step S25, the camera microcomputer 101 causes the light metering circuit 106 to perform light metering without the flash device 300 performing light emission, and acquires a result of light metering during non-light-emission (the luminance value during non-light-emission) from the light metering circuit 106. At this time, the camera microcomputer 101 stores the luminance value during non-light-emission of each area, which is the acquired result of light metering, as $EVa(i)(i=0-5)$, into the RAM.

In step S26, the camera microcomputer 101 issues an instruction to the flash-device microcomputer 310 via the communication line SC to perform preliminary light emission. The flash-device microcomputer 310 controls the trigger circuit 303 and the light emission control circuit 304 according to the instruction from the camera microcomputer 101, thus performing preliminary light emission with a predetermined amount of light.

In step S27, the camera microcomputer 101 causes the light metering circuit 106 to perform light metering with the flash device 300 performing preliminary light emission, and acquires a result of light metering during preliminary light emission (the luminance value during preliminary light emission) from the light metering circuit 106. At this time, the camera microcomputer 101 stores the luminance value during preliminary light emission of each area, which is the acquired result of light metering, as $EVf(i)(i=0-5)$, into the RAM.

In step S28, the camera microcomputer 101 moves up the main mirror 104 prior to exposure, thus retracting the main mirror 104 from within a shooting optical path.

In step S29, the camera microcomputer 101 extracts a luminance value EVdf(i) of only a reflected light component during preliminary light emission based on the luminance value during non-light-emission and the luminance value during preliminary light emission, as expressed in the following formula. This extraction is performed for each of six areas.

$EVdf(i) \leftarrow LN_2(2^{EVf(i)} - 2^{EVa(i)})(i=0-5)$

In step S30, the camera microcomputer 101 acquires, from the flash-device microcomputer 310 via the communication line SC, preliminary light emission information (Qpre) indicating the amount of light emission during preliminary light emission.

In step S31, the camera microcomputer 101 selects an area a subject in which is to be subjected to an appropriate amount of light emission from among the six areas, based on the distance measuring point, the focal length information, the preliminary light emission information (Qpre), and the bounce communication content, and calculates the amount of main light emission.

In calculating the amount of main light emission, the camera microcomputer 101 obtains, for the subject in the selected area (P), the relative ratio (r) of the appropriate amount of main light emission to the amount of preliminary light emission based on the exposure value (EVs), the subject luminance (EVb(p)), and the luminance value EVdf (p) of only a reflected light component during preliminary light emission, as expressed in the following formula.

$r \leftarrow LN_2(2^{EVs} - 2^{EVb(p)}) - EVdf(p)$

The reason why a difference is obtained between the exposure value (EVs) as expanded and the subject luminance (EVb(p)) as expanded is to perform control such that the exposure with radiated flash light becomes appropriate in view of the addition of flash light to ambient light.

Furthermore, in order to prevent the amount of main light emission from being calculated smaller than necessary due to the increase of a reflected light component of preliminary light emission in a case where a high reflective subject (for example, a gilded folding screen) is present within a shooting image plane, there is known processing for performing such corrections as to increase the calculated amount of main light emission if a high reflective object is detected within a shooting image plane.

However, in the case of performing bounce light emission shooting, the camera microcomputer 101 does not detect any high reflective object and does not perform the above-mentioned corrections. This is because, in the case of bounce light emission shooting, even when a high reflective object is present within a shooting image plane, the object is not directly irradiated with flash light and, therefore, the influence of a high reflective object in a reflected light component of preliminary light emission is small.

Besides, in the case of bounce light emission shooting, the camera microcomputer 101 does not perform corrections of the amount of main light emission according to the position of a subject present within a shooting image plane.

As described above, in the case of performing bounce light emission shooting, the camera microcomputer 101 does not perform corrections of the amount of main light emission according to the reflectance of a subject present within a shooting image plane or the position of a subject within a shooting image plane, which would be performed at the time of ordinary light emission shooting, and thus can calculate the amount of main light emission suitable for bounce light emission shooting.

The ordinary light emission shooting as mentioned herein is light emission shooting that is performed with the movable portion 300b located in the reference position illustrated in FIGS. 6A and 6B.

In step S32, the camera microcomputer 101 has correction for the relative ratio (r) using the shutter speed (Tv) during light emission shooting, the time period of preliminary light emission (t_pre), and a correction coefficient (c) previously set via the input unit 112, thus calculating a new relative ratio (r), as expressed in the following formula.

$$r \leftarrow r + Tv - t\_pre + c$$

The reason why the shutter speed (Tv) and the time period of preliminary light emission (t_pre) are used for correction is to correctly compare a light metering integration value during preliminary light emission (INTp) with a light metering integration value during main light emission (INTm).

In step S33, the camera microcomputer 101 transmits, to the flash-device microcomputer 310 via the communication line SC, information about the relative ratio (r) used to determine the amount of main light emission.

In step S34, the camera microcomputer 101 issues a command to the lens microcomputer 201 to set the aperture value (Av) as determined in step S22, and controls the shutter 103 to be set to the determined shutter speed (Tv).

In step S35, the camera microcomputer 101 issues an instruction to the flash-device microcomputer 310 via the communication line SC to perform main light emission. Then, the flash-device microcomputer 310 performs main light emission based on the relative ratio (r) transmitted from the camera microcomputer 101.

Upon completion of a series of exposure operations in the above-described way, in step S36, the camera microcomputer 101 moves down the main mirror 104, which has been so far retracted from within the shooting optical path, thus inclining the main mirror 104 within the shooting optical path again.

In step S37, the camera microcomputer 101 amplifies the signal output from the image sensor 102 at the gain set by the gain switching circuit 108, and then causes the A/D converter 109 to convert the amplified signal into a digital signal. Then, the signal processing circuit 111 performs predetermined signal processing, such as white balance processing, on image data, which is the digital signal output from the A/D converter 109.

In step S38, the camera microcomputer 101 records the image data subjected to the signal processing on a memory (not illustrated), and terminates a series of processing operations associated with shooting. Then, in step S39, the camera microcomputer 101 determines whether the SW1 switch is on. If the camera microcomputer 101 determines that the SW1 switch is on (YES in step S39), the processing returns to step S24. If the camera microcomputer 101 determines that the SW1 switch is off (NO in step S39), the processing returns to step S2.

Next, the details of step S14 are described with reference to FIG. 9. FIG. 9 is a flowchart illustrating the bounce processing, which is performed by the camera microcomputer 101 and the flash-device microcomputer 310.

In step S901, the camera microcomputer 101 receives automatic bounce data from the flash-device microcomputer 310. Then, the processing proceeds to step S902. The automatic bounce data includes information indicating whether the flash device 300 is available for automatic bounce. Furthermore, in a case where the flash device 300 is available for automatic bounce, the automatic bounce data further includes information indicating a range within which the movable portion 300b is able to swivel.

In step S902, the camera microcomputer 101 determines whether the automatic bounce operation is able to be performed. Here, whether the automatic bounce operation is able to be performed is determined based on the setting of the automatic bounce operation in the camera body 100 and the information indicating whether the flash device 300 is available for automatic bounce, which is included in the received automatic bounce data. If the camera microcomputer 101 determines that the automatic bounce operation is able to be performed (YES in step S902), the processing proceeds to step S903. If the camera microcomputer 101 determines that the automatic bounce operation is not able to be performed (NO in step S902), the processing exits the bounce processing and then proceeds to step S15.

In step S903, the camera microcomputer 101 makes preparations to transmit a bounce operation execution instruction, and then in step S904, transmits the bounce operation execution instruction to the flash-device microcomputer 310.

In step S905, the camera microcomputer 101 calculates the distance to a subject to determine a radiation direction most appropriate for bounce light emission shooting. The method for calculating the distance to the subject is not particularly limiting, and the flash-device microcomputer 310 may calculate the subject distance using the distance measuring unit 308, or the camera microcomputer 101 may calculate the subject distance based on information about the position of a lens in the lens unit 200, which is received from the lens microcomputer 201. Alternatively, the flash-device microcomputer 310 may calculate the subject distance using information about the position of a lens in the lens unit 200, which is received from the camera microcomputer 101.

Similarly, in step S906, the camera microcomputer 101 calculates the distance to a ceiling (wall) to determine a radiation direction most appropriate for bounce light emission shooting. The method for calculating the distance to the ceiling (wall) is not particularly limiting, and the flash-device microcomputer 310 may calculate the ceiling (wall) distance using the distance measuring unit 308.

In step S907, the camera microcomputer 101 determines a radiation direction most appropriate for bounce light emission shooting. The method for determining the radiation direction is not particularly limiting, and the camera microcomputer 101 or the flash-device microcomputer 310 determines the radiation direction based on the distance to the subject calculated in step S905 and the distance to the ceiling (wall) calculated in step S906. For example, the camera microcomputer 101 calculates the radiation direction using the distance to the subject and the distance to the ceiling (wall) in such a way that the subject is irradiated at a predetermined angle with light reflected from the ceiling (wall).

In step S908, the flash-device microcomputer 310 performs bounce drive control using the bounce drive circuit 340b and the bounce drive circuit 340d in such a way as to attain the most appropriate radiation direction.

In step S909, the camera microcomputer 101 transmits a bounce operation end instruction to the flash-device microcomputer 310. Then, the processing proceeds to step S15.

As mentioned in the foregoing, in the case of not performing automatic bounce, since an operation for automatically determining a radiation direction for bounce light emission shooting is not performed, the camera microcomputer 101 determines whether to calculate the radiation direction based on information classifying a lens unit attached to the camera body 100.

As described above, according to the present exemplary embodiment, the radiation direction of an illumination device is automatically changed according to lens ID information of a lens unit attached to an imaging apparatus, so that bounce light emission shooting can be appropriately performed.

Furthermore, while, in the above-described exemplary embodiment, the camera microcomputer 101 determines whether to automatically change the radiation direction of the flash device 300 based on the lens ID information, the flash-device microcomputer 310 may make such a determination.

Figure 10:
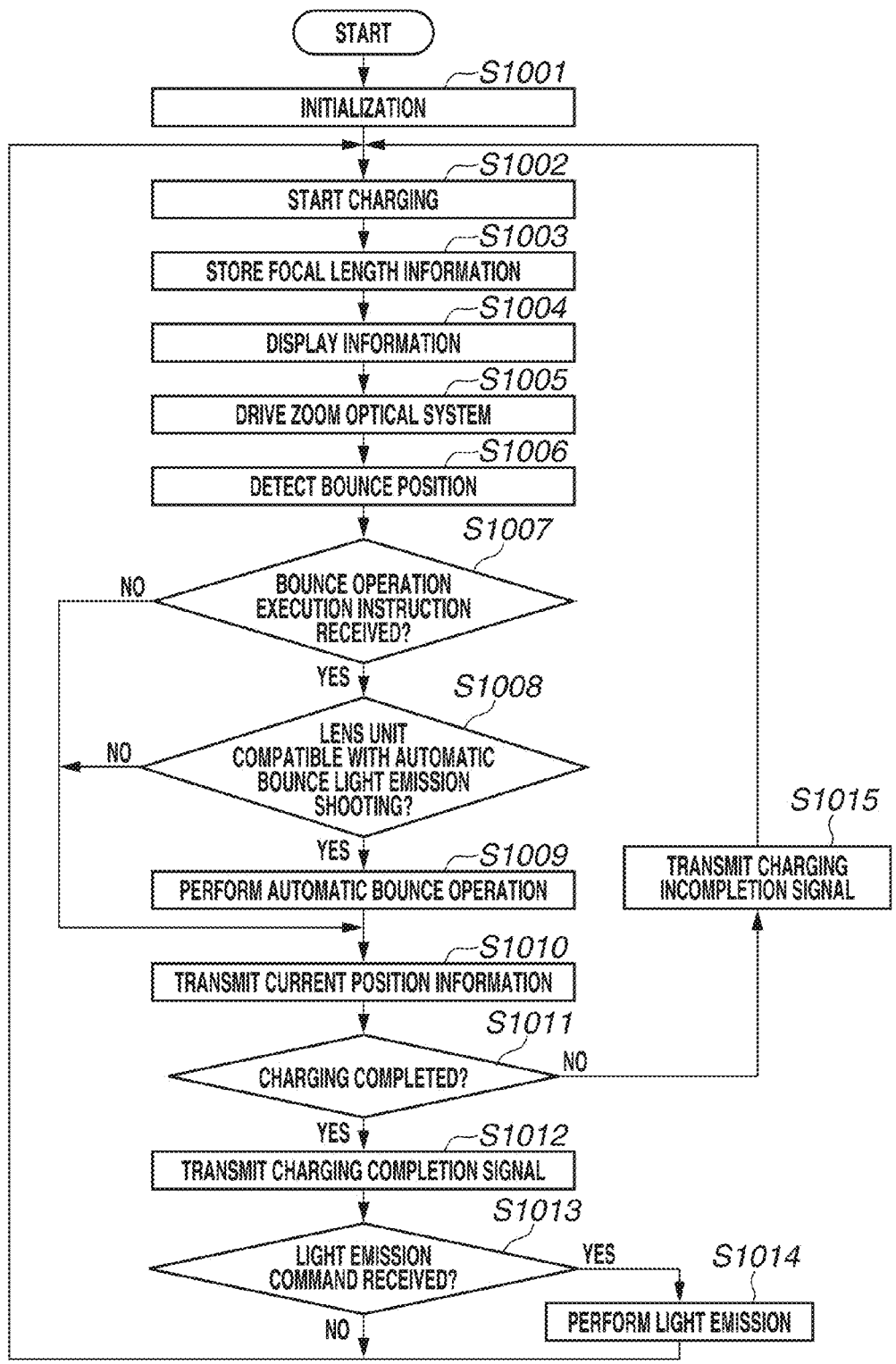
FIG. 10 is a flowchart illustrating various processing operations accompanied by a light emitting operation of a flash device including a bounce operation according to the first exemplary embodiment.

The processing for determining whether to automatically change the radiation direction of the flash device 300 and the processing associated with light emission of the flash device 300 including the bounce operation are described with reference to FIG. 10. When the flash-device microcomputer 310 of the flash device 300 is activated with the power switch included in the input unit 312 being turned on, the flash-device microcomputer 310 starts the flowchart of FIG. 10.

In step S1001, the flash-device microcomputer 310 performs initialization of its memories and ports. Furthermore, the flash-device microcomputer 310 reads the states of switches included in the input unit 312 and previously set pieces of input information, and performs setting of various light emission modes, such as the method of determining the amount of light emission and the timing of light emission.

In step S1002, the flash-device microcomputer 310 charges the main capacitor 302d by activating the booster circuit block 302.

In step S1003, the flash-device microcomputer 310 stores, into a memory built in the flash-device microcomputer 310, focal length information acquired from the camera microcomputer 101 via the communication line SC.

Furthermore, in a case where focal length information has previously been stored in the memory, the flash-device microcomputer 310 updates the stored focal length information with new focal length information.

In step S1004, the flash-device microcomputer 310 displays, on the display unit 313, an image relating to the light emission mode set via the input unit 312 and an image relating to the acquired focal length information.

In step S1005, the flash-device microcomputer 310 causes the zoom drive circuit 330 to move the zoom optical system 307 in such a way that the radiation range of flash light reaches a range corresponding to the acquired focal length information.

In step S1006, the flash-device microcomputer 310 causes the bounce position detection circuits 340a and 340c to detect the swiveling angle of the movable portion 300b relative to the body portion 300a.

In step S1007, the flash-device microcomputer 310 determines whether a bounce operation execution instruction has been received. If the flash-device microcomputer 310 determines that the bounce operation execution instruction has been received (YES in step S1007), the processing proceeds to step S1008. If the flash-device microcomputer 310 determines that the bounce operation execution instruction has not been received (NO in step S1007), the processing proceeds to step S1010.

In step S1008, the flash-device microcomputer 310 determines whether a lens unit attached to the camera body 100 is a lens unit suitable for bounce light emission shooting, based on the lens ID information acquired from the camera microcomputer 101 via the communication line SC. The lens ID information can be transmitted from the camera microcomputer 101 to the flash-device microcomputer 310 in step S6 illustrated in FIG. 3. Whether the attached lens unit is suitable for bounce light emission shooting is determined based on the compatibility with automatic bounce light emission shooting, which is shown in the list illustrated in FIG. 5, and the list illustrated in FIG. 5 is stored in a memory included in the flash-device microcomputer 310. Furthermore, since the flash-device microcomputer 310 only needs to determine whether the attached lens unit 200 is compatible with automatic bounce light emission shooting, at least information indicating the compatibility with automatic bounce light emission shooting in the list illustrated in FIG. 5 only needs to be stored in the memory. If the flash-device microcomputer 310 determines that the attached lens unit 200 is compatible with automatic bounce light emission shooting (YES in step S1008), the processing proceeds to step S1009. If the flash-device microcomputer 310 determines that the attached lens unit 200 is not compatible with automatic bounce light emission shooting (NO in step S1008), the processing proceeds to step S1010.

In other words, the flash-device microcomputer 310 determines whether to perform automatic bounce based on information classifying a lens unit attached to an imaging apparatus. In a case where the flash-device microcomputer 310 determines not to perform automatic bounce, automatic bounce is not performed even if a bounce operation execution instruction is issued from the camera microcomputer 101.

In step S1009, the flash-device microcomputer 310 performs the above-described automatic bounce operation. In a case where the automatic bounce operation is not performed, since an operation for automatically determining the radiation direction during bounce light emission shooting is not performed, the flash-device microcomputer 310 determines whether to calculate a radiation direction, based on information classifying the attached lens unit.

In step S1010, the flash-device microcomputer 310 transmits, to the camera microcomputer 101, current position information indicating a swiveling angle of the movable portion 300b relative to the body portion 300a after bounce driving.

In step S1011, the flash-device microcomputer 310 determines whether the charging voltage of the main capacitor 302d is equal to or higher than a predetermined value (charging completed). If the flash-device microcomputer 310 determines that the charging voltage is equal to or higher than the predetermined value (YES in step S1011), the processing proceeds to step S1012. If the flash-device microcomputer 310 determines that the charging voltage is lower than the predetermined value (NO in step S1011), the processing proceeds to step S1015.

In step S1012, the flash-device microcomputer 310 transmits a charging completion signal to the camera microcomputer 101. Then, the processing proceeds to step S1013.

In step S1013, the flash-device microcomputer 310 determines whether a light emission start signal has been received as a light emission command. If the flash-device microcomputer 310 determines that the light emission start signal has been received (YES in step S1013), the processing proceeds to step S1014. If the flash-device microcomputer 310 determines that the light emission start signal has not been received (NO in step S1013), the processing returns to step S1002.

In step S1014, in response to the received light emission start signal, the flash-device microcomputer 310 instructs the light emission control circuit 304 to perform light emission. The light emission control circuit 304 causes the discharge tube 305 to emit light according to the light emission instruction. After completion of the light emission, the processing returns to step S1002. Furthermore, in step S1014, with respect to a series of light emission, such as preliminary light emission for flash control or main light emission, the processing does not return to step S1002 even after each light emission ends, so that the processing does not return to step S1002 until a series of light emission ends.

In a case where the charging voltage is lower than the predetermined value (NO in step S1011), then in step S1015, the flash-device microcomputer 310 transmits a charging incompletion signal to the camera microcomputer 101. Then, the processing returns to step S1002.

In the above-described way, the flash-device microcomputer 310 performs processing for determining whether to automatically change the radiation direction of the flash device 300 based on the lens ID information and processing associated with light emission of the flash device 300 including the automatic bounce operation.

As described above, according to the present exemplary embodiment, the radiation direction of the flash device 300 is controlled based on the classification of a lens unit attached to an imaging apparatus, so that light emission shooting can be performed according to the condition of the imaging apparatus. Furthermore, the method for performing light emission shooting according to the condition of the imaging apparatus can be conceived in various ways besides a method for determining whether to automatically change the radiation direction of the flash device 300 based on the lens ID information. For example, in the case of a lens unit with a predetermined lens ID, there may be adopted a method for automatically setting the radiation direction to a predetermined radiation direction, such as a frontal direction, to drive the movable portion 300b. In the case of this method, although, since the radiation direction is set to a predetermined radiation direction, the desired bounce light emission shooting cannot be performed, light emission shooting corresponding to the condition of the imaging apparatus can be performed. Moreover, in the case of the method for automatically setting the radiation direction to a predetermined radiation direction, such as a frontal direction, to drive the movable portion 300b, if the radiation direction taken before shooting is other than the frontal direction, it is necessary to drive the movable portion 300b in such a way as to set the radiation direction to the frontal direction. Therefore, in the case of the method for automatically setting the radiation direction to a predetermined radiation direction, such as a frontal direction, to drive the movable portion 300b, the flash-device microcomputer 310 drives the movable portion 300b in between step S1008 and step S1010 illustrated in FIG. 10.

Next, a second exemplary embodiment of the present invention is described with reference to FIG. 11. An imaging system according to the present exemplary embodiment is basically the same as that in the first exemplary embodiment, but differs in that the flash device 300 is configured to allow the user to set both an automatic bounce mode for performing the automatic bounce operation and a semi-automatic bounce mode for performing a semi-automatic bounce operation. The semi-automatic bounce operation is to, while storing a radiation direction of the flash device 300 set by the user, automatically swivel the movable portion 300b in such a way as to attain the stored radiation direction even when the orientation of the flash device varies. A mode switch that is operable to switch between the automatic bounce mode and the semi-automatic bounce mode is contained in the input unit 312. Furthermore, as for the radiation direction used in the semi-automatic bounce operation, a radiation direction specified by the user operating a radiation direction storing button, which is contained in the input unit 312, is stored in the memory of the flash-device microcomputer 310.

Figure 3:
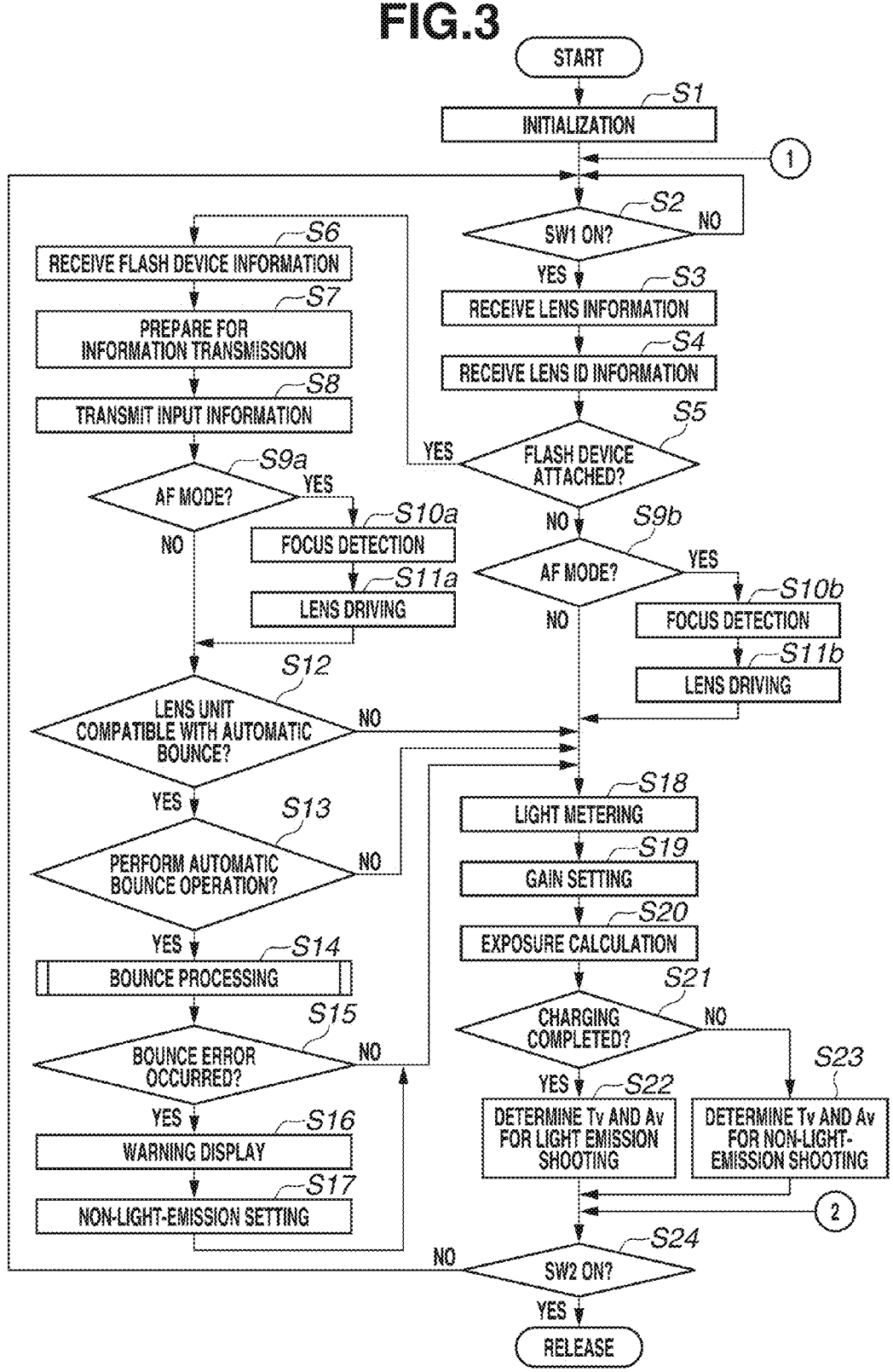
FIG. 3 is a flowchart illustrate various processing operations performed by a camera body relating to automatic bounce light emission shooting according to the first exemplary embodiment.
Figure 11:
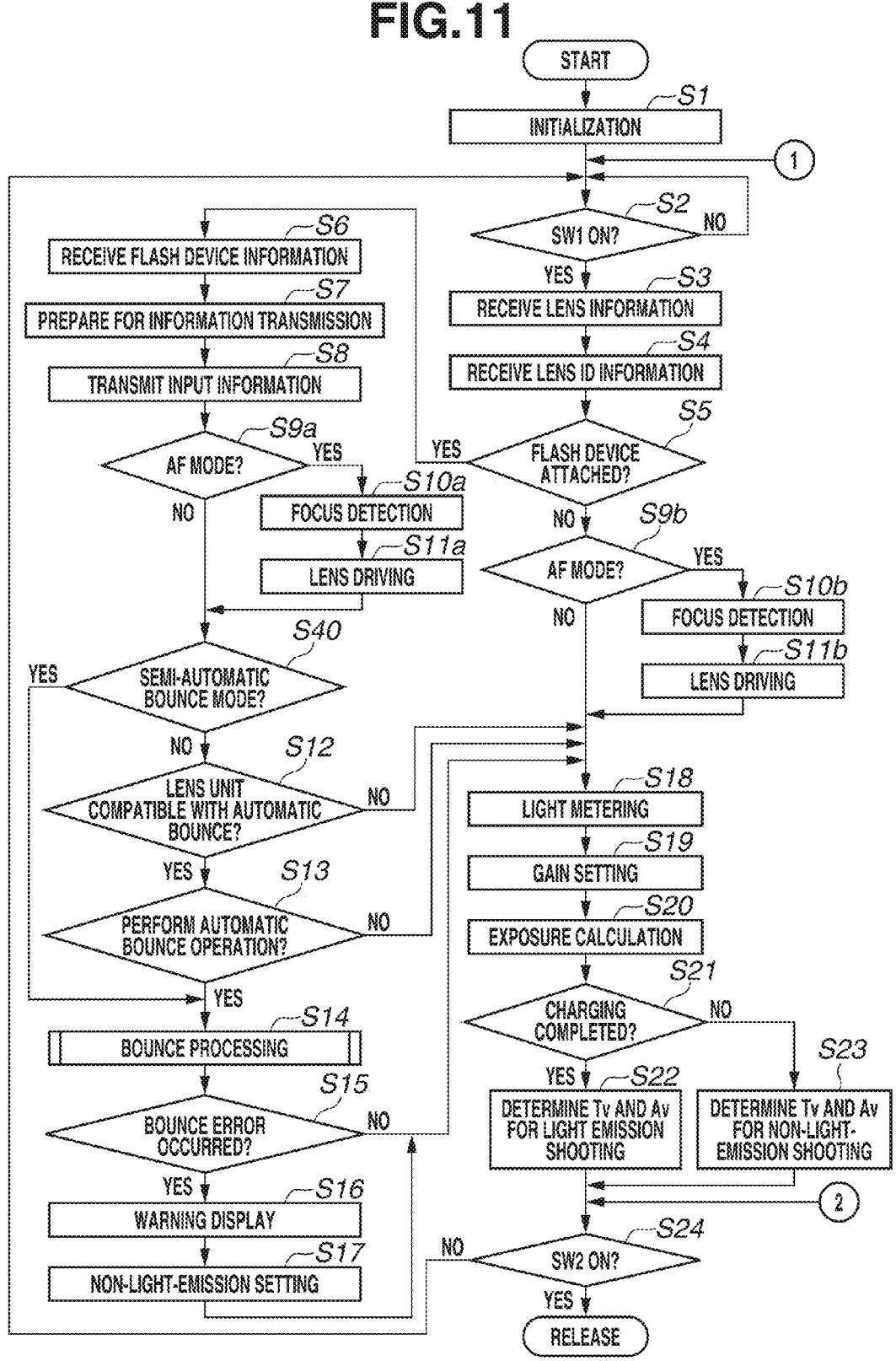
FIG. 11 is a flowchart illustrating various processing operations performed by the camera body relating to automatic bounce light emission shooting according to a second exemplary embodiment of the present invention.

The flowchart illustrated in FIG. 11 differs from the flowchart illustrated in FIG. 3 in that step S40 is inserted between step S9a and step S12. Therefore, only differences between the flowcharts of FIGS. 3 and 11 are described in detail below.

Following step S9a or step S11a, the processing proceeds to step S40. In step S40, the camera microcomputer 101 determines whether the flash device 300 is in the semi-automatic bounce mode. Information indicating whether the flash device 300 is in the semi-automatic bounce mode is included in the flash device information acquired in step S6.

If the camera microcomputer 101 determines that the flash device 300 is in the semi-automatic bounce mode (YES in step S40), the processing proceeds to step S14, in which the camera microcomputer 101 performs the semi-automatic bounce processing. The above-mentioned automatic bounce operation and the semi-automatic bounce operation differ in whether the radiation direction of the flash device 300 is automatically determined or is determined by the user. Therefore, in the semi-automatic bounce operation, the processing is performed according to a flowchart illustrated in FIG. 12, in which the operation for determining the radiation direction of the flash device 300 is not performed.

Figure 12:
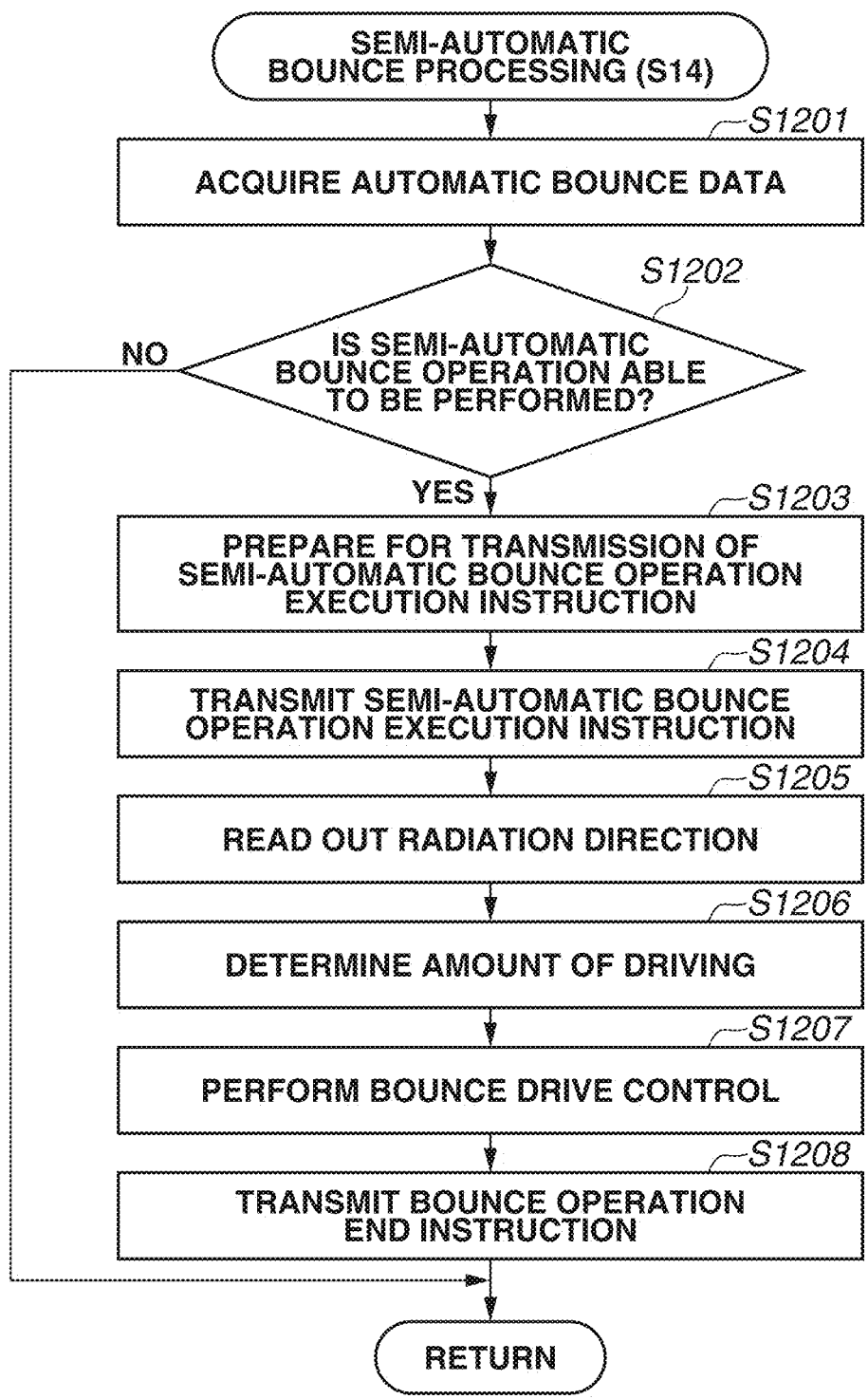
FIG. 12 is a flowchart illustrating semiautomatic bounce processing according to the second exemplary embodiment.

FIG. 12 is a flowchart illustrating the semi-automatic bounce processing, which is performed by the camera microcomputer 101 and the flash-device microcomputer 310.

In step S1201, the camera microcomputer 101 receives automatic bounce data from the flash-device microcomputer 310. Then, the processing proceeds to step S1202. The automatic bounce data includes information indicating whether the flash device 300 is available for semi-automatic bounce. Furthermore, in a case where the flash device 300 is available for semi-automatic bounce, the automatic bounce data further includes information indicating a range within which the movable portion 300b is able to swivel.

In step S1202, the camera microcomputer 101 determines whether the semi-automatic bounce operation is able to be performed. Here, whether the semi-automatic bounce operation is able to be performed is determined based on the information indicating whether the flash device 300 is available for semi-automatic bounce, which is included in the received automatic bounce data. If the camera microcomputer 101 determines that the semi-automatic bounce operation is able to be performed (YES in step S1202), the processing proceeds to step S1203. If the camera microcomputer 101 determines that the semi-automatic bounce operation is not able to be performed (NO in step S1202), the processing exits the semi-automatic bounce processing and then proceeds to step S15.

In step S1203, the camera microcomputer 101 makes preparations to transmit a semi-automatic bounce operation execution instruction, and then in step S1204, transmits the semi-automatic bounce operation execution instruction to the flash-device microcomputer 310.

The semi-automatic bounce operation execution instruction is issued based on a user operation on a semi-automatic bounce switch for executing the semi-automatic bounce operation, which is contained in the input unit 112 or the input unit 312.

In step S1205, the flash-device microcomputer 310 reads out the radiation direction stored in the memory of the flash-device microcomputer 310.

In step S1206, the flash-device microcomputer 310 determines the amount of driving of the movable portion 300b based on the stored radiation direction, the orientation of the flash device 300 taken when the radiation direction was stored, and the current orientation of the flash device 300. The orientation of the flash device 300 can be obtained using the orientation detection circuit 140 or the orientation detection circuit 360. The orientation of the flash device 300 taken when the radiation direction was stored is previously stored together with the radiation direction in the memory of the flash-device microcomputer 310.

In step S1207, the flash-device microcomputer 310 performs bounce drive control using the bounce drive circuit 340b and the bounce drive circuit 340d based on the amount of driving determined in step S1206.

In step S1208, the camera microcomputer 101 transmits a bounce operation end instruction to the flash-device microcomputer 310. Then, the processing proceeds to step S15.

On the other hand, if, in step S40, the camera microcomputer 101 determines that the flash device 300 is not in the semi-automatic bounce mode (NO in step S40), the processing proceeds to step S12.

As described above, with regard to the semi-automatic bounce operation, the camera microcomputer 101 does not determine whether to automatically change the radiation direction of the flash device 300 based on the lens ID information. This is because, in the semi-automatic bounce operation, unlike the automatic bounce operation, the radiation direction of the flash device 300 is determined by the user. In a case where the user sets the radiation direction, such an effect that a ceiling irradiated with light from the flash device 300 during bounce light emission shooting is contained in a captured image or that a part of reflected light from a ceiling or wall does not reach the subject may be supposed to be an intention of the user. Therefore, the camera microcomputer 101 is configured not to take the classification of a lens unit into consideration.

As described above, according to the present exemplary embodiment, the radiation direction of the flash device 300 can also be controlled based on a radiation direction of the flash device 300 set by the user and stored in the memory, so that light emission shooting can also be performed according to the intention of the user.

Japanese Patent Application Laid-Open No. 4-340527 discusses a technique to acquire the distance to a subject and the distance to an object located above the camera and calculate the angle of a flash emission portion based on the acquired distances.

Figure 31A:
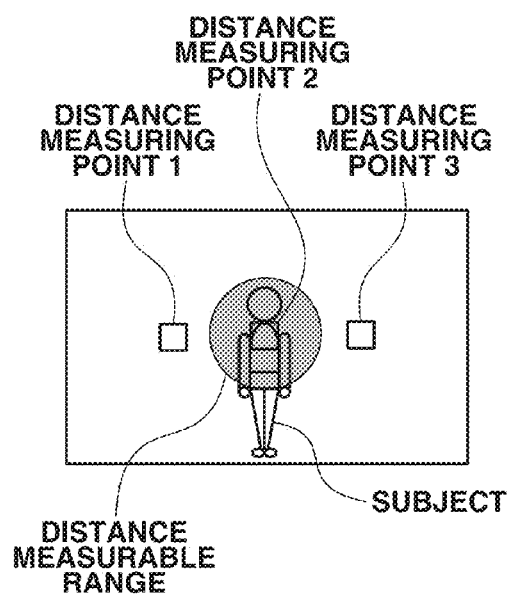
FIGS. 31A and 31B illustrate conventional positional relationships between a determined distance measuring point and a distance measurable range.
Figure 31B:
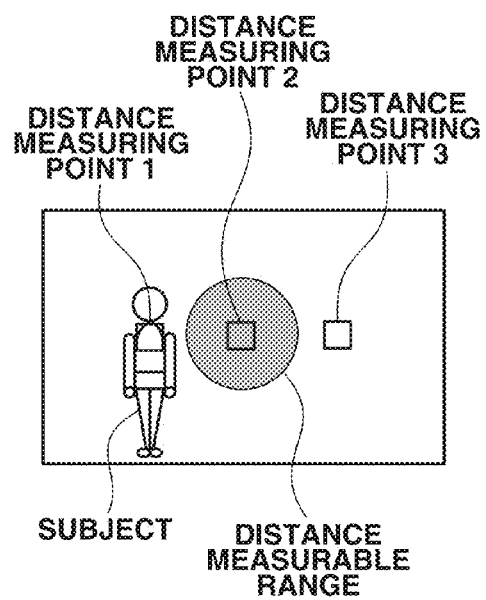

However, in the technique discussed in Japanese Patent Application Laid-Open No. 4-340527, the distance to a subject is acquired by projecting spot light from a light-emitting diode (LED) onto the subject and receiving reflected light from the subject with a position sensor device (PSD). Therefore, in a case where, for example, the light receiving range of the PSD is only near the center of the shooting image plane, as illustrated in FIGS. 31A and 31B, if the subject is located at the center as illustrated in FIG. 31A, the subject is within the light receiving range, but if the subject is located at other than the center as illustrated in FIG. 31B, the subject is outside the light receiving range.

In a case where the subject is located at other than the center, since the distance to an object (for example, a wall behind the subject) that is different from the subject, the distance to which is to be acquired, may be acquired, an optimum angle of the flash emission portion cannot be calculated.

Therefore, according to a third exemplary embodiment of the present invention, an imaging system is configured to accurately obtain a radiation direction appropriate for bounce light emission shooting in a manner described below.

Figures 25A, 25B:
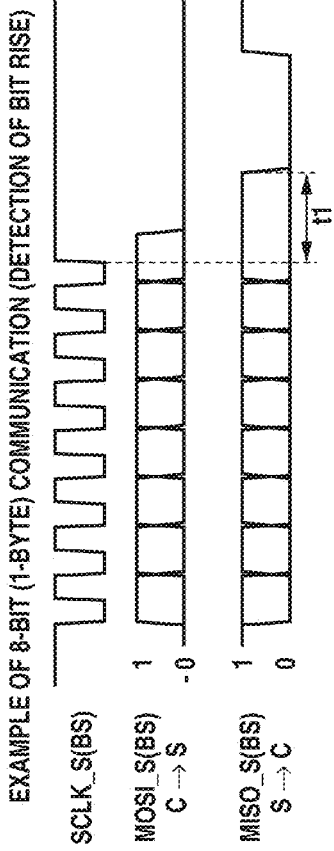
FIGS. 25A and 25B illustrate examples of data communication between the camera body and the flash device according to the third exemplary embodiment.

The imaging system according to the third exemplary embodiment is almost similar to that illustrated in FIGS. 1 and 2, and, therefore, the description of the same portions as those illustrated in FIGS. 1 and 2 is not repeated. Examples of data communications performed via the terminal group 130 in the present exemplary embodiment are illustrated in FIGS. 25A and 25B. FIG. 25A illustrates the timing of data communications. In the case of transmitting data from the camera microcomputer 101 to the flash-device microcomputer 310, data is serially transmitted with each bit set to 0 or 1 from the MOSI_S terminal in synchronization with clocks of 8 bits from the SCLK_S terminal. Furthermore, in the case of transmitting data from the flash-device microcomputer 310 to the camera microcomputer 101, data is serially received with each bit set to 0 or 1 from the MOSI_S terminal in synchronization with clocks of 8 bits from the SCLK_S terminal. In the example illustrated in FIG. 25A, while reading and writing of signals is performed at the rise of the SCLK_S signal during 8-bit (1-byte) communication, this 8-bit communication is sequentially performed a plurality of times in the order of command, command data, and data. FIG. 25B illustrates a specific example of information to be communicated, which is transmitted from the camera microcomputer 101 to the flash-device microcomputer 310 according to command lists illustrated in FIG. 26A, which is composed of FIGS. 26A1 and 26A2, and FIG. 26B, which is composed of FIGS. 26B1, 26B2, and 26B3, which are described below.

For example, as for "automatic bounce setting/canceling from camera body to flash device", "80H" of CS communication at the first byte, "011 (0BH)" of command number at the second byte, and "01 (setting)" of data (content) at the third byte are transmitted after being converted from hexadecimal to binary.

Then, at the first byte, a command CS: 80H in the case of the camera body 100 transmitting information to the flash device 300 or a command SC: 01H in the case of the camera body 100 acquiring information from the flash device 300 is transmitted from the camera body 100 to the flash device 300.

Then, at the second byte, a command number: number following the SC or CS (converted into hexadecimal at the time of transmission) and, at the third byte or the fourth byte, setting item data are transmitted from one of the camera body 100 and the flash device 300 to the other. The communication of other information is described below as appropriate with reference to the command lists illustrated in FIGS. 26A and 26B.

Next, various processing operations of the camera body 100 relating to automatic bounce light emission shooting are described with reference to FIGS. 13 and 14. When the camera microcomputer 101 of the camera body 100 is activated in response to the power switch included in the input unit 112 being turned on, the camera microcomputer 101 starts the flowchart illustrated in FIG. 13.

In step S2001, the camera microcomputer 101 performs initialization of its memories and ports. Furthermore, the camera microcomputer 101 reads the states of switches included in the input unit 112 and previously set pieces of input information, and performs setting of various shooting modes, such as the method of determining a shutter speed and the method of determining an aperture value. In step S2002, the camera microcomputer 101 determines whether the SW1 switch is turned on with the release switch included in the input unit 112 being operated. If the camera microcomputer 101 determines that the SW1 switch is turned on (YES in step S2002), the processing proceeds to step S2003. If the camera microcomputer 101 determines that the SW1 switch is off (NO in step S2002), the processing repeats step S2002.

In step S2003, the camera microcomputer 101 performs communication with the lens microcomputer 201 included in the lens unit 200 via the communication line SC. Then, the camera microcomputer 101 acquires focal length information and optical information required for focus adjustment and light metering about the lens unit 200. In step S2004, the camera microcomputer 101 determines whether the flash device 300 is attached to the camera body 100. If the camera microcomputer 101 determines that the flash device 300 is attached to the camera body 100 (YES in step S2004), the processing proceeds to step S2005. If the camera microcomputer 101 determines that the flash device 300 is not attached to the camera body 100 (NO in step S2004), the processing proceeds to step S2008b.

In step S2005, the camera microcomputer 101 performs communication with the flash-device microcomputer 310 included in the flash device 300 via the communication line SC and acquires flash device information, such as a flash device ID and charging information indicating the charging status of the main capacitor 302d, from the flash-device microcomputer 310. Furthermore, the camera microcomputer 101 performs communication with the flash-device microcomputer 310 via the communication line SC and transmits the focal length information acquired in step S2003 to the flash-device microcomputer 310. Accordingly, the flash-device microcomputer 310 calculates the amount of driving of the zoom optical system 307 based on the received focal length information and moves the zoom optical system 307 based on the calculated amount of driving to change the radiation range of the flash device 300 to a range matched with the focal length.

In step S2006, the camera microcomputer 101 makes preparations to transmit the information about the flash device 300 input via the input unit 112 to the flash-device microcomputer 310 included in the flash device 300.

Here, the camera microcomputer 101 assesses the information about the flash device 300 input via the input unit 112 and converts the information into commands to be transmitted. The details of step S2006 are described below with reference to FIG. 15.

In step S2007, the camera microcomputer 101 transmits, to the flash device 300, the input information about the flash device 300 prepared for transmission in step S2006. The details of step S2007 are described below with reference to FIG. 16.

In step S2008a, the camera microcomputer 101 determines whether the focus adjustment mode currently set is an automatic focusing (AF) mode. If the camera microcomputer 101 determines that the focus adjustment mode currently set is the AF mode (YES in step S2008a), the processing proceeds to step S2009a. If the camera microcomputer 101 determines that the focus adjustment mode currently set is a manual focusing (MF) mode (NO in step S2008a), the processing proceeds to step S2011. In the flowchart of FIG. 13, steps for performing the same processing are assigned with the same numeral, such as step S2008a and step S2008b. In step S2009a, the camera microcomputer 101 drives the focus detection circuit 107 to perform a focus detecting operation using a known phase-difference detection method. Furthermore, in step S2009a, the camera microcomputer 101 determines (selects) a distance measuring point (also referred to as a "target area for focus adjustment"), which is to be focused on, from among a plurality of distance measuring points during focus adjustment, according to a known automatic selection algorithm basically based on near-point priority or a user operation on the input unit 112.

In step S2010a, the camera microcomputer 101 stores information about the distance measuring point determined in step S2009a (distance measuring point information) into a RAM included in the camera microcomputer 101. Furthermore, in step S2010a, the camera microcomputer 101 calculates the amount of driving of the lens group 202 based on focus information output from the focus detection circuit 107. Then, the camera microcomputer 101 performs communication with the lens microcomputer 201 included in the lens unit 200 via the communication line SC and moves the lens group 202 based on the calculated amount of driving.

In step S2011, the camera microcomputer 101 determines whether to perform an operation for automatically determining the radiation direction for bounce light emission shooting (hereinafter referred to as an "automatic bounce operation"). Whether to perform the automatic bounce operation is determined based on the state of an automatic bounce switch, which is used to switch whether to perform the automatic bounce operation, included in the input unit 112 or the input unit 312 or based on the other state of the camera body 100. If the camera microcomputer 101 determines to perform the automatic bounce operation (YES in step S2011), the processing proceeds to step S2012. If the camera microcomputer 101 determines not to perform the automatic bounce operation (NO in step S2011), the processing proceeds to step S2016.

In step S2012, the camera microcomputer 101 performs processing about the automatic bounce operation (hereinafter referred to as "bounce processing"). The details of the bounce processing are described below with reference to FIG. 17.

Upon completion of the bounce processing, the processing proceeds to step S2013. In step S2013, the camera microcomputer 101 determines whether an error has occurred in the bounce processing. If the camera microcomputer 101 determines that an error has occurred in the bounce processing (YES in step S2013), the processing proceeds to step S2014. If the camera microcomputer 101 determines that no error has occurred in the bounce processing (NO in step S2013), the processing proceeds to step S2016.

In a case where an error has occurred in the bounce processing, information indicating that an error has occurred in the bounce processing is transmitted from the flash-device microcomputer 310 to the camera microcomputer 101 during the bounce processing in step S2012.

In step S2014, the camera microcomputer 101 causes the display unit 113 to display the information indicating that an error has occurred in the bounce processing. Furthermore, the camera microcomputer 101 may perform communication with the flash-device microcomputer 310 and, then, the flash-device microcomputer 310 may cause the display unit 313 of the flash device 300 to display the information indicating that an error has occurred in the bounce processing.

In step S2015, the camera microcomputer 101 switches over to a setting for not allowing light emission shooting (non-light-emission setting). Then, the processing proceeds to step S2016.

If, in step S2004, the camera microcomputer 101 determines that the flash device 300 is not attached to the camera body 100 (NO in step S2004), the processing proceeds to step S2008b. In step S2008b, the camera microcomputer 101 determines whether the focus adjustment mode currently set is the AF mode, as in step S2008a. If the camera microcomputer 101 determines that the focus adjustment mode currently set is the AF mode (YES in step S2008b), the processing proceeds to step S2009b. If the camera microcomputer 101 determines that the focus adjustment mode currently set is the MF mode (NO in step S2008b), the processing proceeds to step S2016.

In step S2009b, the camera microcomputer 101 performs the same processing as in step S2009a, and then in step S2010b, performs the same processing as in step S2010a. Then, the processing proceeds to step S2016.

In step S2016, the camera microcomputer 101 causes the light metering circuit 106 to perform a light metering operation and acquires a result of light metering from the light metering circuit 106. For example, in a case where the light metering sensor of the light metering circuit 106 performs light metering at each of six divisional areas, the camera microcomputer 101 stores the luminance value of each area, which is the acquired result of light metering, as $EVb(i)(i=0-5)$, into the RAM.

In step S2017, the camera microcomputer 101 causes the gain switching circuit 108 to switch the gain according to a gain setting input via the input unit 112. The gain setting is, for example, a setting for ISO sensitivity. Furthermore, in step S2017, the camera microcomputer 101 performs communication with the flash-device microcomputer 310 via the communication line SC and transmits, for example, gain setting information indicating the switched gain to the flash-device microcomputer 310.

In step S2018, the camera microcomputer 101 performs an exposure calculation using a known algorithm based on the result of light metering acquired in step S2016 (the luminance value of each area stored in the RAM), thus determining an exposure value (EVs).

In step S2019, the camera microcomputer 101 determines whether a charging completion signal has been received from the flash-device microcomputer 310. If the camera microcomputer 101 determines that the charging completion signal has been received (YES in step S2019), the processing proceeds to step S2020. If the camera microcomputer 101 determines that the charging completion signal has not been received (NO in step S2019), the processing proceeds to step S2021.

In step S2020, the camera microcomputer 101 determines exposure control values (shutter speed (Tv) and aperture value (Av)) suitable for light emission shooting based on the exposure value calculated in step S2018.

On the other hand, in step S2021, the camera microcomputer 101 determines exposure control values suitable for non-light-emission shooting, in which the flash device 300 is not allowed to emit light, based on the exposure value calculated in step S2018.

After the exposure control values are determined in step S2020 or S2021, the processing proceeds to step S2022. In step S2022, the camera microcomputer 101 determines whether the SW2 switch is turned on with the release switch included in the input unit 112 being operated. If the camera microcomputer 101 determines that the SW2 switch is turned on (YES in step S2022), the processing proceeds to step S2023 illustrated in FIG. 14. If the camera microcomputer 101 determines that the SW2 switch is off (NO in step S2022), the processing returns to step S2002.

Figure 14:
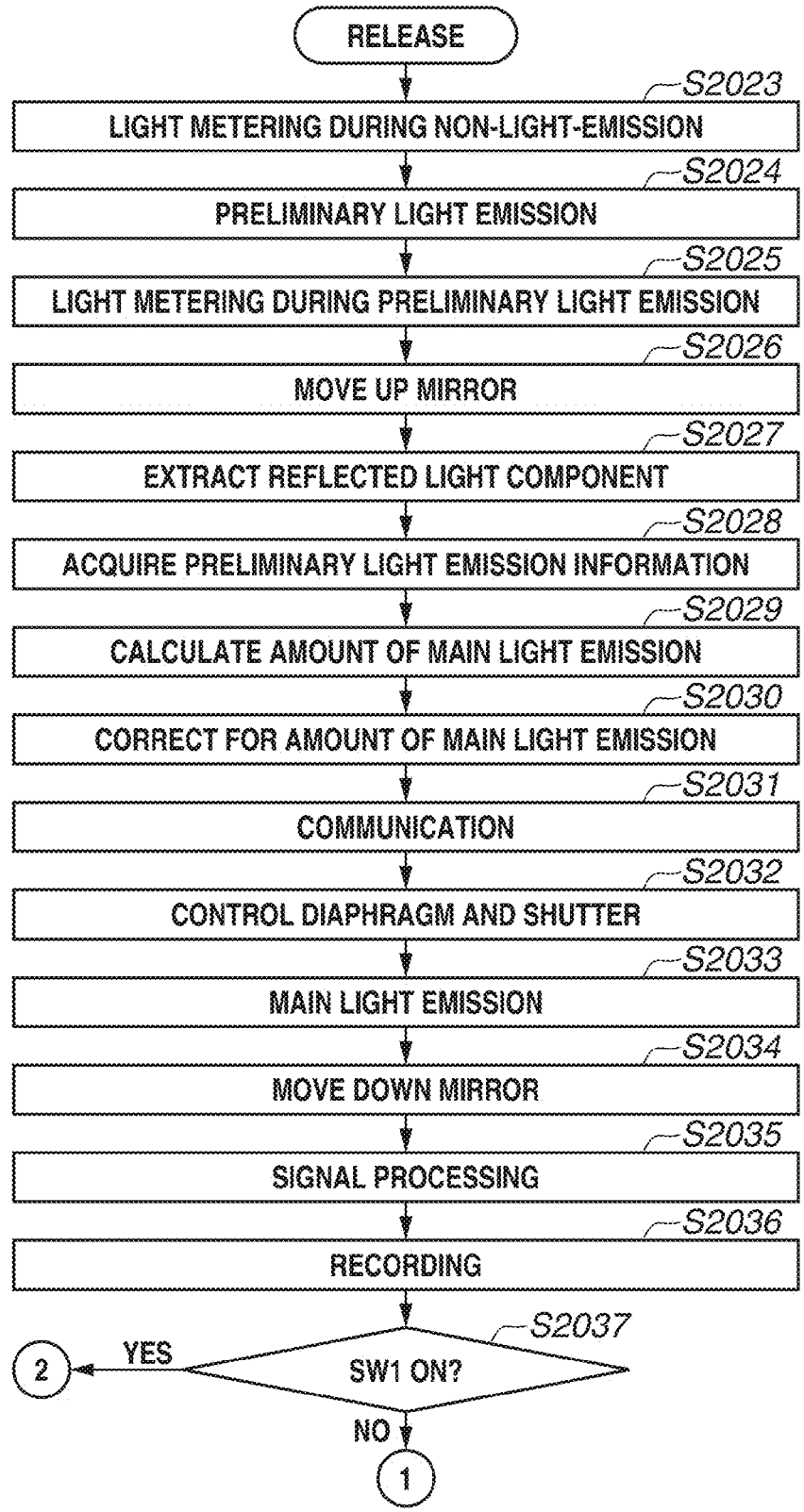
FIG. 14 is a flowchart illustrating various processing operations performed by the camera body relating to the automatic bounce light emission shooting according to the third exemplary embodiment.

Processing in step S2023 and subsequent steps illustrated in FIG. 14 is processing associated with light emission shooting, and processing associated with non-light-emission shooting is processing obtained by omitting processing for performing main light emission from the processing in step S2023 and subsequent steps. Furthermore, processing in steps S2023 to S2037 is the same as processing in steps S25 to S39 illustrated in FIG. 4, respectively, and the description thereof is, therefore, omitted.

Figure 15:
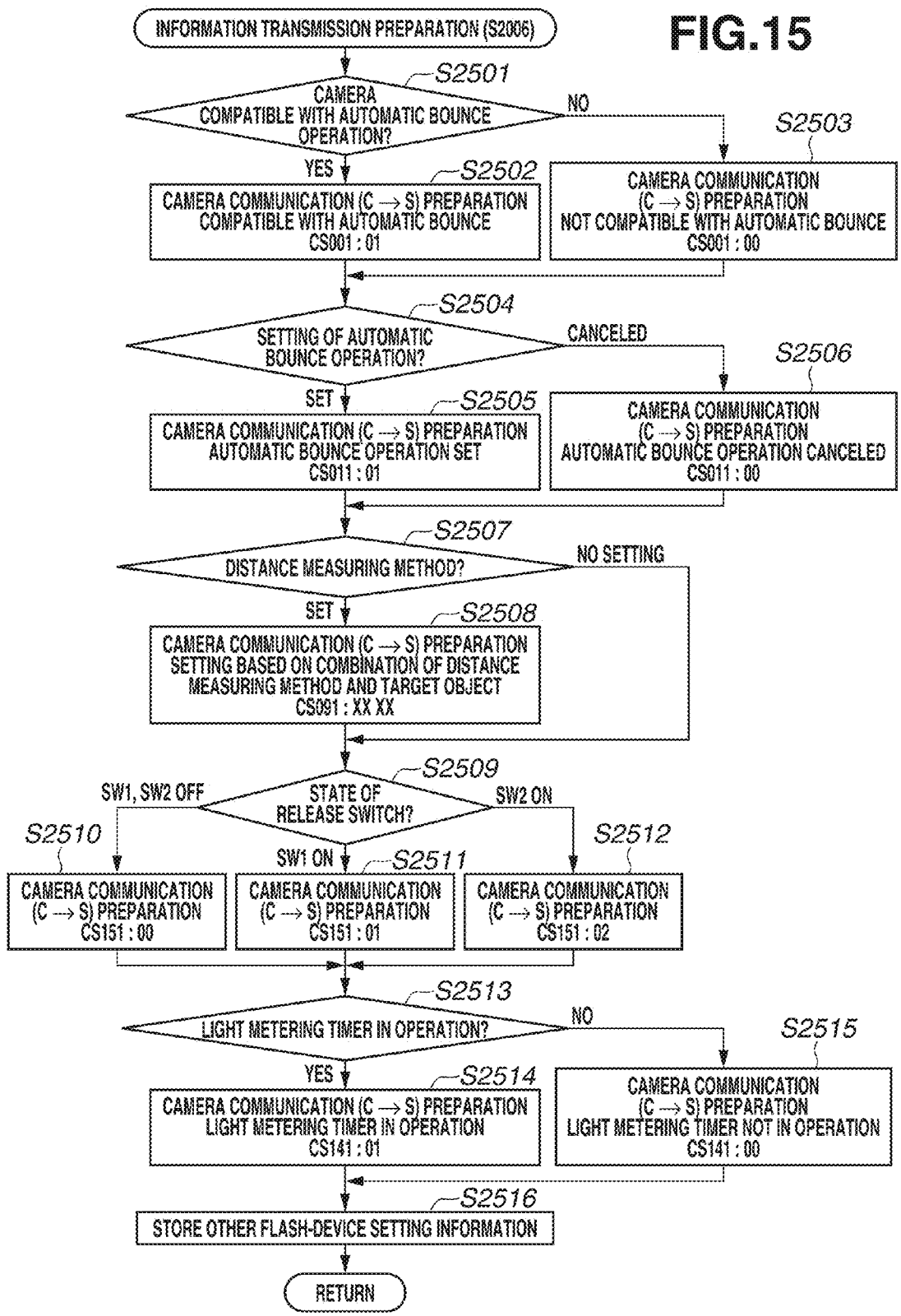
FIG. 15 is a flowchart illustrating information transmission preparatory processing performed by the camera body according to the third exemplary embodiment.

Next, the details of step S2006 are described with reference to FIG. 15. FIG. 15 is a flowchart illustrating information transmission preparation processing performed by the camera body 100. In step S2006, the camera microcomputer 101 performs the processing according to the flowchart of FIG. 15. The details of the setting commands as used herein are illustrated in FIGS. 26A and 26B.

In step S2501, the camera microcomputer 101 determines whether the camera body 100 is a camera capable of performing the automatic bounce operation (a compatible camera). If the camera microcomputer 101 determines that the camera body 100 is the compatible camera (YES in step S2501), the processing proceeds to step S2502. If the camera microcomputer 101 determines that the camera body 100 is not the compatible camera (NO in step S2501), the processing proceeds to step S2503.

In step S2502, the camera microcomputer 101 stores a "CS001 command: 01" into a built-in memory (not illustrated) of the camera microcomputer 101 as a preparation for camera body to flash device communication (C→S). Then, the processing proceeds to step S2504. On the other hand, in step S2503, the camera microcomputer 101 stores a "CS001 command: 00" into the built-in memory (not illustrated) of the camera microcomputer 101 as a preparation for camera body to flash device communication (C→S). Then, the processing proceeds to step S2504.

In step S2504, the camera microcomputer 101 determines whether the execution of the automatic bounce operation is set or canceled. If the camera microcomputer 101 determines that the execution of the automatic bounce operation is set (SET in step S2504), the processing proceeds to step S2505. If the camera microcomputer 101 determines that the execution of the automatic bounce operation is canceled (CANCELED in step S2504), the processing proceeds to step S2506.

In step S2505, the camera microcomputer 101 stores a "CS011 command: 01" into the built-in memory (not illustrated) of the camera microcomputer 101 as a preparation for camera body to flash device communication (C→S). Then, the processing proceeds to step S2507. On the other hand, in step S2506, the camera microcomputer 101 stores a "CS011 command: 00" into the built-in memory (not illustrated) of the camera microcomputer 101 as a preparation for camera body to flash device communication (C→S). Then, the processing proceeds to step S2507.

In step S2507, the camera microcomputer 101 determines a method (distance measuring method) for obtaining the distance to a target object which is information that the camera body 100 uses to determine a radiation direction most appropriate for bounce light emission shooting. The target object as used herein includes a subject targeted for shooting and a reflective object (for example, a ceiling or wall) that reflects flash light during bounce light emission shooting. Examples of the distance measuring method include a "flash-device preliminary light emission distance measuring method" of measuring the distance to a target object based on the amount of reflected light from the target object caused by the preliminary light emission of a flash device (hereinafter referred to as a "preliminary light emission method").

Besides, examples of the distance measuring method include a "flash-device non-light-emission distance measuring method" of measuring the distance to a target object, without flash light emission, using the distance measuring unit 308 included in the flash device 300 (hereinafter referred to as a "flash-device distance measuring method"). Furthermore, examples of the distance measuring method further include a "camera distance measuring method" of measuring the distance to a target object using a result of focus adjustment performed by the camera body 100 and the lens unit 200, and are not particularly limiting. If a distance measuring method is set (SET in step S2507), the processing proceeds to step S2508. If no distance measuring method is set (NO SETTING in step S2507), the processing proceeds to step S2509.

In step S2508, the camera microcomputer 101 stores a CS091 command into the built-in memory (not illustrated) of the camera microcomputer 101 according to the setting content of the distance measuring method as a preparation for camera body to flash device communication (C→S). Then, the processing proceeds to step S2509.

For example, the distinction between "subject" and "ceiling" is assigned to high 4 bits, and "subject" and "ceiling" are represented as "0" and "1", respectively. The distinction between "preliminary light emission method", "flash-device distance measuring method", and "camera distance measuring method" is assigned to low 4 bits, and "preliminary light emission method", "flash-device distance measuring method", and "camera distance measuring method" are represented as "0", "1", and "2", respectively. Then, the high 4 bits and the low 4 bits are combined. If the "preliminary light emission method" is set for both of the subject and the ceiling, the camera microcomputer 101 stores a "CS091 command: data 00 10" into the built-in memory (not illustrated) of the camera microcomputer 101. Similarly, if the "flash-device distance measuring method" is set for both of the subject and the ceiling, the camera microcomputer 101 stores a "CS091 command: data 01 11" into the built-in memory (not illustrated) of the camera microcomputer 101, and if the "camera distance measuring method" is set for the subject and the "preliminary light emission method" is set for the ceiling, the camera microcomputer 101 stores a "CS091 command: data 02 10" into the built-in memory (not illustrated) of the camera microcomputer 101.

In step S2509, the camera microcomputer 101 determines the state of the release switch. If both the SW1 switch and the SW2 switch are off (SW1, SW2 OFF in step S2509), the processing proceeds to step S2510. If the SW1 switch is on (SW1 ON in step S2509), the processing proceeds to step S2511. If the SW2 switch is on (SW2 ON in step S2509), the processing proceeds to step S2512.

In step S2510, the camera microcomputer 101 stores a "CS151 command: data 00" into the built-in memory (not illustrated) of the camera microcomputer 101. Then, the processing proceeds to step S2513. In step S2511, the camera microcomputer 101 stores a "CS151 command: data 01" into the built-in memory (not illustrated) of the camera microcomputer 101. Then, the processing proceeds to step S2513. In step S2512, the camera microcomputer 101 stores a "CS151 command: data 02" into the built-in memory (not illustrated) of the camera microcomputer 101. Then, the processing proceeds to step S2513.

In step S2513, the camera microcomputer 101 determines whether a light metering timer is in operation. The light metering timer is a timer that sets a period for light metering, which is used to switch the camera microcomputer 101 into a power saving mode after light metering is performed for a predetermined time. During the time when light metering is performed for the predetermined time, the light metering timer is in operation. The light metering timer is contained in the camera microcomputer 101, and starts time measurement in synchronization with turning-on of the SW1 switch. If the camera microcomputer 101 determines that the light metering timer is in operation (YES in step S2513), the processing proceeds to step S2514. If the camera microcomputer 101 determines that the light metering timer is not in operation (NO in step S2513), the processing proceeds to step S2515.

In step S2514, the camera microcomputer 101 stores a "CS141 command: data 01" into the built-in memory (not illustrated) of the camera microcomputer 101 as a preparation for camera body to flash device communication (C→S). Then, the processing proceeds to step S2516. On the other hand, in step S2515, the camera microcomputer 101 stores a "CS141 command: data 00" into the built-in memory (not illustrated) of the camera microcomputer 101 as a preparation for camera body to flash device communication (C→S). Then, the processing proceeds to step S2516. In step S2516, the camera microcomputer 101 stores other flash-device setting information into the built-in memory (not illustrated) of the camera microcomputer 101. Then, the processing proceeds to step S2007.

Figure 16:
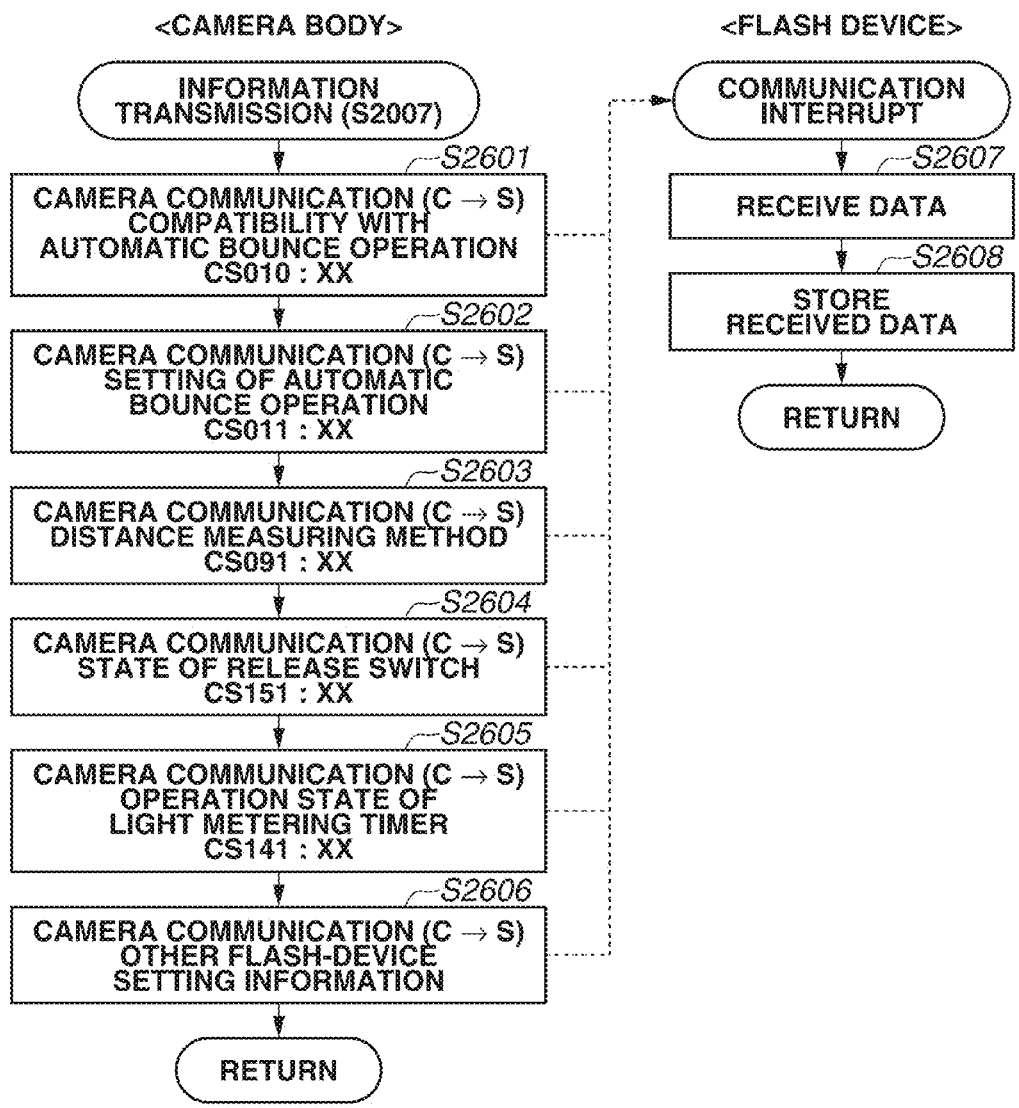
FIG. 16 is a flowchart illustrating information transmission processing performed by the camera body according to the third exemplary embodiment.

Next, the details of step S2007 are described with reference to FIG. 16. FIG. 16 is a flowchart illustrating information transmission processing performed by the camera body 100. In step S2007, the camera microcomputer 101 performs the processing according to the flowchart of FIG. 16. The details of the setting commands as used herein are illustrated in FIGS. 26A and 26B. Furthermore, in each processing in the flowchart of FIG. 16, a serial communication between the camera body 100 and the flash device 300 illustrated in FIGS. 25A and 25B is used. Moreover, in FIG. 16, processing performed by the camera body 100 is indicated with steps S2601 to S2606 and the corresponding processing performed by the flash device 300 is indicated with steps S2607 and S2608.

First, processing performed by the camera body 100 is described. In step S2601, the camera microcomputer 101 transmits, to the flash-device microcomputer 310, data corresponding to a result of determination made in step S2501. Then, the processing proceeds to step S2602. In step S2602, the camera microcomputer 101 transmits, to the flash-device microcomputer 310, data corresponding to a result of determination made in step S2504. Then, the processing proceeds to step S2603. In step S2603, the camera microcomputer 101 transmits, to the flash-device microcomputer 310, data corresponding to a result of determination made in step S2507. Then, the processing proceeds to step S2604.

In step S2604, the camera microcomputer 101 transmits, to the flash-device microcomputer 310, data corresponding to a result of determination made in step S2509. Then, the processing proceeds to step S2605. In step S2605, the camera microcomputer 101 transmits, to the flash-device microcomputer 310, data corresponding to a result of determination made in step S2513. Then, the processing proceeds to step S2606. In step S2606, the camera microcomputer 101 transmits, to the flash-device microcomputer 310, the data stored in step S2516. Then, the processing proceeds to step S2008.

Next, processing performed by the flash device 300 is described. In step S2607, after a communication interrupt occurs, the flash-device microcomputer 310 receives data transmitted from the camera microcomputer 101. Then, the processing proceeds to step S2608. In step S2608, the flash-device microcomputer 310 stores the received data into a built-in memory of the flash-device microcomputer 310. Then, the processing ends.

Figure 17:
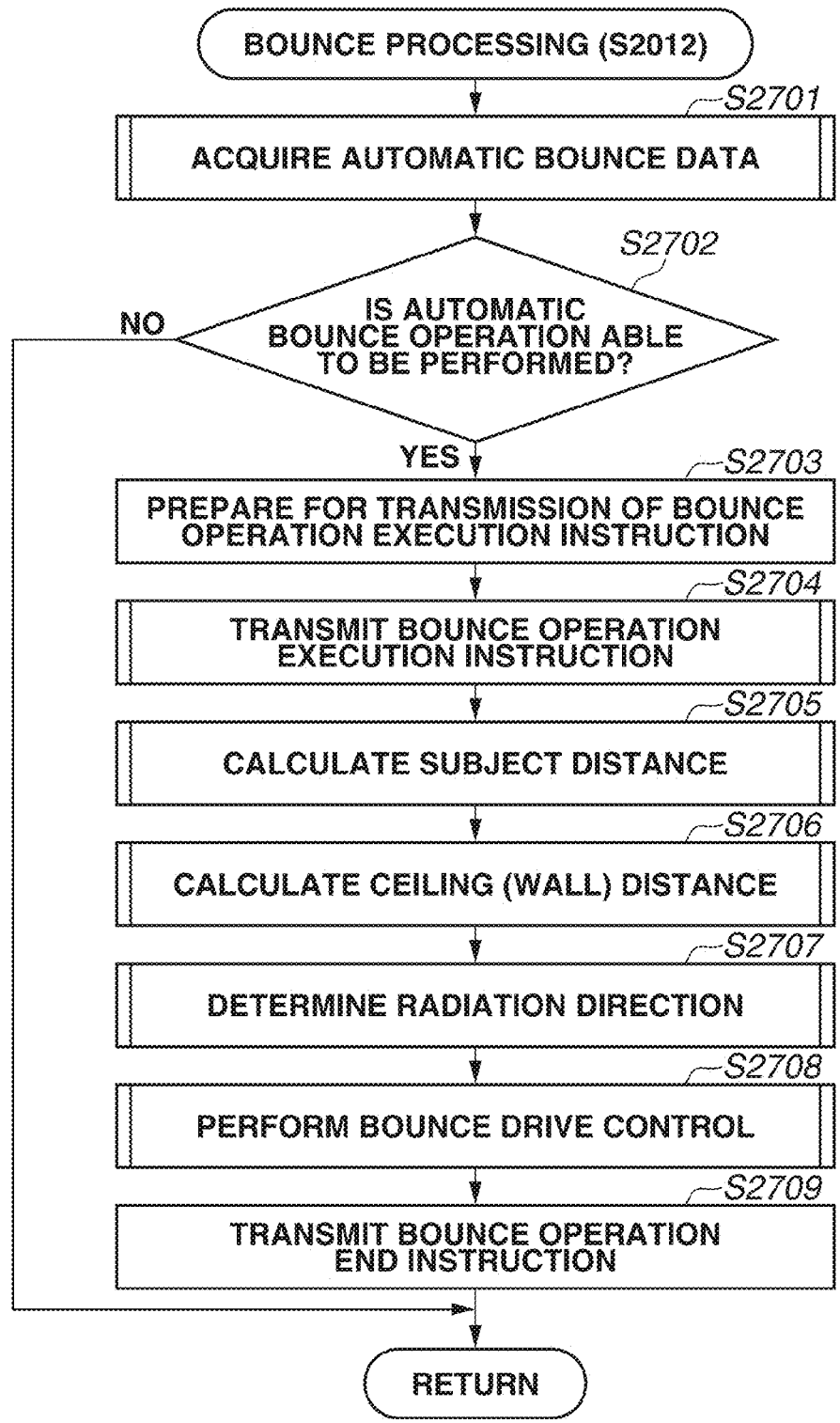
FIG. 17 is a flowchart illustrating bounce processing according to the third exemplary embodiment.

Next, the details of step S2012 are described with reference to FIG. 17. FIG. 17 is a flowchart illustrating bounce processing, in which processing performed by the camera microcomputer 101 and processing performed by the flash-device microcomputer 310 are included.

In step S2701, the camera microcomputer 101 receives automatic bounce data from the flash-device microcomputer 310. Then, the processing proceeds to step S2702.

The details of step S2701 are described below with reference to FIGS. 18A and 18B.

In step S2702, the camera microcomputer 101 determines whether the automatic bounce operation is able to be performed. Here, whether the automatic bounce operation is able to be performed is determined based on the setting of the automatic bounce operation in the camera body 100 and the information indicating whether the flash device 300 is available for automatic bounce, which is included in the received automatic bounce data. If the camera microcomputer 101 determines that the automatic bounce operation is able to be performed (YES in step S2702), the processing proceeds to step S2703. If the camera microcomputer 101 determines that the automatic bounce operation is not able to be performed (NO in step S2702), the processing exits the bounce processing and then proceeds to step S2013. In step S2703, the camera microcomputer 101 makes preparations to transmit a bounce operation execution instruction, and then in step S2704, transmits the bounce operation execution instruction to the flash-device microcomputer 310. The details of step S2704 are described below.

In step S2705, the camera microcomputer 101 or the flash-device microcomputer 310 calculates the distance to a subject to determine a radiation direction most appropriate for bounce light emission shooting. The details of step S2705 are described below. Similarly, in step S2706, the camera microcomputer 101 or the flash-device microcomputer 310 calculates the distance to a ceiling (wall) to determine a radiation direction most appropriate for bounce light emission shooting. The details of step S2706 are described below. Furthermore, which of the camera microcomputer 101 and the flash-device microcomputer 310 calculates the distance to a subject and the distance to a ceiling (wall) is determined based on the distance measuring method set by the user.

In step S2707, the camera microcomputer 101 determines a radiation direction most appropriate for bounce light emission shooting. The details of step S2707 are described below. In step S2708, the camera microcomputer 101 or the flash-device microcomputer 310 performs bounce drive control in such a way as to attain the most appropriate radiation direction. The details of step S2708 are described below.

In step S2709, the camera microcomputer 101 or the flash-device microcomputer 310 transmits a bounce operation end instruction to the flash-device microcomputer 310. Then, the processing proceeds to step S2013.

Next, each processing in the bounce processing is described in detail.

First, the automatic bounce data acquisition processing in step S2701 is described with reference to FIGS. 18A and 18B.

Figure 18B:
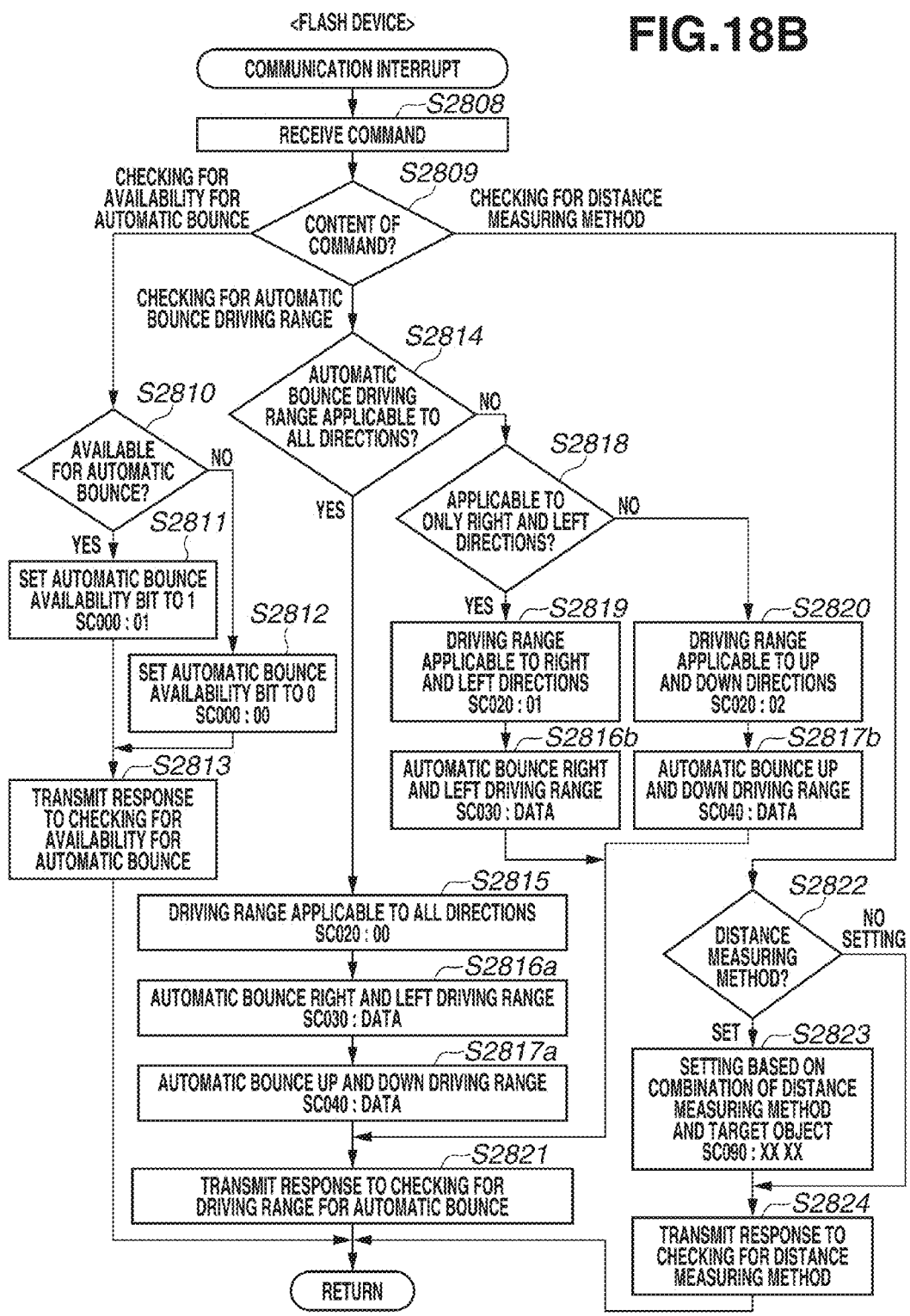

In FIGS. 18A and 18B, processing performed by the camera body 100 is indicated with steps S2801 to S2807 and the corresponding processing performed by the flash device 300 is indicated with steps S2808 to S2824.

First, processing performed by the camera body 100 is described. In step S2801, the camera microcomputer 101 transmits, to the flash-device microcomputer 310, a command for checking whether the flash device 300 is available for automatic bounce. Then, in step S2802, the camera microcomputer 101 receives a response to checking for availability for automatic bounce, which is transmitted from the flash-device microcomputer 310.

In step S2803, the camera microcomputer 101 transmits, to the flash-device microcomputer 310, a command for checking for a driving range for automatic bounce. Then, in step S2804, the camera microcomputer 101 receives a response to checking for a driving range for automatic bounce, which is transmitted from the flash-device microcomputer 310.

In step S2805, the camera microcomputer 101 transmits, to the flash-device microcomputer 310, a command for checking for a distance measuring method for calculating the distance to an object targeted for automatic bounce. Then, in step S2806, the camera microcomputer 101 receives a response to checking for a distance measuring method, which is transmitted from the flash-device microcomputer 310.

Finally, in step S2807, the camera microcomputer 101 stores the data acquired in steps S2802, S2804, and S2806 into the built-in memory of the camera microcomputer 101. Then, the processing ends.

Next, processing performed by the flash device 300 is described. In step S2808, after a communication interrupt occurs, the flash-device microcomputer 310 receives a command transmitted from the camera microcomputer 101. Then, the processing proceeds to step S2809. In step S2809, the flash-device microcomputer 310 determines the content of the received command. If the flash-device microcomputer 310 determines that the content is "checking for availability for automatic bounce" (CHECKING FOR AVAILABILITY FOR AUTOMATIC BOUNCE in step S2809), the processing proceeds to step S2810. If the flash-device microcomputer 310 determines that the content is "checking for a driving range for automatic bounce" (CHECKING FOR AUTOMATIC BOUNCE DRIVING RANGE in step S2809), the processing proceeds to step S2814. If the flash-device microcomputer 310 determines that the content is "checking for a distance measuring method" (CHECKING FOR DISTANCE MEASURING METHOD in step S2809), the processing proceeds to step S2822.

In step S2810, the flash-device microcomputer 310 determines whether the flash device 300 is available for automatic bounce. If the flash-device microcomputer 310 determines that the flash device 300 is available for automatic bounce (YES in step S2810), the processing proceeds to step S2811. If the flash-device microcomputer 310 determines that the flash device 300 is not available for automatic bounce (NO in step S2810), the processing proceeds to step S2812.

In step S2811, the flash-device microcomputer 310 stores an "SC000 command: 01" for flash device to camera body communication (S→C) into the built-in memory of the flash-device microcomputer 310. Then, the processing proceeds to step S2813. On the other hand, in step S2812, the flash-device microcomputer 310 stores an "SC000 command: 00" for flash device to camera body communication (S→C) into the built-in memory of the flash-device microcomputer 310. Then, the processing proceeds to step S2813.

In step S2813, the flash-device microcomputer 310 transmits, to the camera microcomputer 101, the data stored in step S2811 or S2812 as a response to checking for availability for automatic bounce. Then, the processing ends.

In step S2814, the flash-device microcomputer 310 determines whether the driving range for automatic bounce is applicable to both the up and down directions and the right and left directions. If the flash-device microcomputer 310 determines that it is applicable to both the up and down directions and the right and left directions (YES in step S2814), the processing proceeds to step S2815. If the flash-device microcomputer 310 determines that it is applicable to only the up and down directions or the right and left directions (NO in step S2814), the processing proceeds to step S2818. In step S2818, the flash-device microcomputer 310 determines whether the driving range for automatic bounce is applicable to only the right and left directions. If the flash-device microcomputer 310 determines that it is applicable to only the right and left directions (YES in step S2818), the processing proceeds to step S2819. If the flash-device microcomputer 310 determines that it is applicable to only the up and down directions (NO in step S2818), the processing proceeds to step S2820.

In a case where the flash-device microcomputer 310 determines that the driving range for automatic bounce is applicable to both the up and down directions and the right and left directions, then in step S2815, the flash-device microcomputer 310 stores an "SC020 command: data 00" for flash device to camera body communication (S→C) into the built-in memory of the flash-device microcomputer 310. Then, the processing proceeds to step S2816a.

In step S2816a, the flash-device microcomputer 310 stores an "SC030 command: data XX(start) XX(end)" for flash device to camera body communication (S→C) as the driving range in the right and left directions into the built-in memory of the flash-device microcomputer 310. Then, the processing proceeds to step S2817a.

In step S2817a, the flash-device microcomputer 310 stores an "SC040 command: data XX(start) XX(end)" for flash device to camera body communication (S→C) as the driving range in the up and down directions into the built-in memory of the flash-device microcomputer 310. Then, the processing proceeds to step S2821.

On the other hand, in a case where the flash-device microcomputer 310 determines that the driving range for automatic bounce is applicable to only the right and left directions, then in step S2819, the flash-device microcomputer 310 stores an "SC020 command: data 01" for flash device to camera body communication (S→C) into the built-in memory of the flash-device microcomputer 310. Then, the processing proceeds to step S2816b.

In step S2816b, the flash-device microcomputer 310 stores an "SC030 command: data XX(start) XX(end)" for flash device to camera body communication (S→C) as the driving range in the right and left directions into the built-in memory of the flash-device microcomputer 310. Then, the processing proceeds to step S2821.

Furthermore, in a case where the flash-device microcomputer 310 determines that the driving range for automatic bounce is applicable to only the up and down directions, then in step S2820, the flash-device microcomputer 310 stores an "SC020 command: data 02" for flash device to camera body communication (S→C) into the built-in memory of the flash-device microcomputer 310. Then, the processing proceeds to step S2817b.

In step S2817b, the flash-device microcomputer 310 stores an "SC030 command: data XX(start) XX(end)" for flash device to camera body communication (S→C) as the driving range in the up and down directions into the built-in memory of the flash-device microcomputer 310. Then, the processing proceeds to step S2821.

In step S2821, the flash-device microcomputer 310 transmits, to the camera microcomputer 101, the data stored in steps S2815, S2816a, and S2817a, the data stored in steps S2819 and S2816b, or the data stored in steps S2820 and S2817b, as a response to checking for the driving range for automatic bounce. Then, the processing ends.

In step S2822, the flash-device microcomputer 310 determines whether a distance measuring method for calculating the distance to an object targeted for automatic bounce is set in the flash-device microcomputer 310.

If the flash-device microcomputer 310 determines that a distance measuring method is set (SET in step S2822), the processing proceeds to step S2823. In step S2823, the flash-device microcomputer 310 stores an "SC090 command: XX XX" corresponding to the setting contents of the distance measuring method and the target object in the built-in memory of the flash-device microcomputer 310. Then, the processing proceeds to step S2824. In step S2824, the flash-device microcomputer 310 transmits, to the camera microcomputer 101, the data stored in step S2823 as a response to checking for a distance measuring method. Then, the processing ends. If the flash-device microcomputer 310 determines that no distance measuring method is set (NO SETTING in step S2822), then in step S2824, the flash-device microcomputer 310 transmits, to the camera microcomputer 101, data indicating that no distance measuring method is set. Then, the processing ends.

In the above-described way, the camera microcomputer 101 acquires the automatic bounce data.

Next, the processing for transmitting the bounce operation execution instruction in step S2704 in the bounce processing is described with reference to FIG. 19. The details of the setting commands as used herein are illustrated in FIGS. 26A and 26B.

Figure 19:
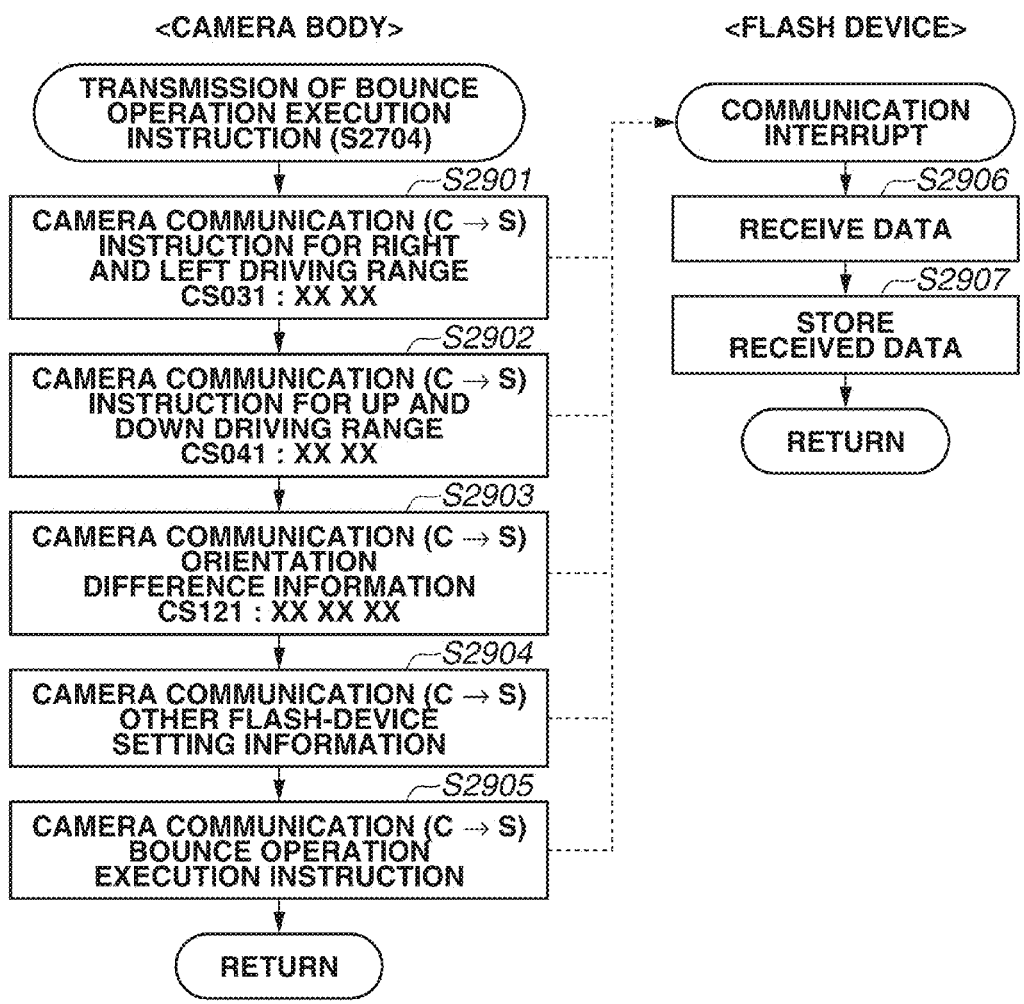
FIG. 19 is a flowchart illustrating bounce operation execution instruction transmission processing according to the third exemplary embodiment.

Moreover, in FIG. 19, processing performed by the camera body 100 is indicated with steps S2901 to S2905 and the corresponding processing performed by the flash device 300 is indicated with steps S2906 and S2907.

First, processing performed by the camera body 100 is described. In step S2901, the camera microcomputer 101 transmits, to the flash-device microcomputer 310, a "CS031 command: data XX XX" for setting the driving range in the right and left directions during the bounce operation. Then, the processing proceeds to step S2902. In a case where no driving range in the right and left directions is set, step S2901 is omitted. In step S2902, the camera microcomputer 101 transmits, to the flash-device microcomputer 310, a "CS041 command: data XX XX" for setting the driving range in the up and down directions during the bounce operation. Then, the processing proceeds to step S2903. In a case where no driving range in the up and down directions is set, step S2902 is omitted. In step S2903, the camera microcomputer 101 transmits, to the flash-device microcomputer 310, a "CS121 command: data XX XX XX" as orientation difference information indicating results of detection by the orientation V detection unit 140*a*, the orientation H detection unit 140*b*, and the orientation Z detection unit 140*c*. In step S2904, the camera microcomputer 101 transmits, to the flash-device microcomputer 310, other flash-device setting information. Then, the processing proceeds to step S2905. In step S2905, the camera microcomputer 101 transmits a bounce operation execution instruction to the flash-device microcomputer 310. Then, the processing proceeds to step S2705.

Next, processing performed by the flash device 300 is described.

In step S2906, after a communication interrupt occurs, the flash-device microcomputer 310 receives data transmitted from the camera microcomputer 101. Then, the processing proceeds to step S2907. In step S2907, the flash-device microcomputer 310 stores the received data into the built-in memory of the flash-device microcomputer 310, and then starts the bounce operation.

In the above-described way, the camera microcomputer 101 transmits the bounce operation execution instruction to the flash-device microcomputer 310.

Figure 20A:
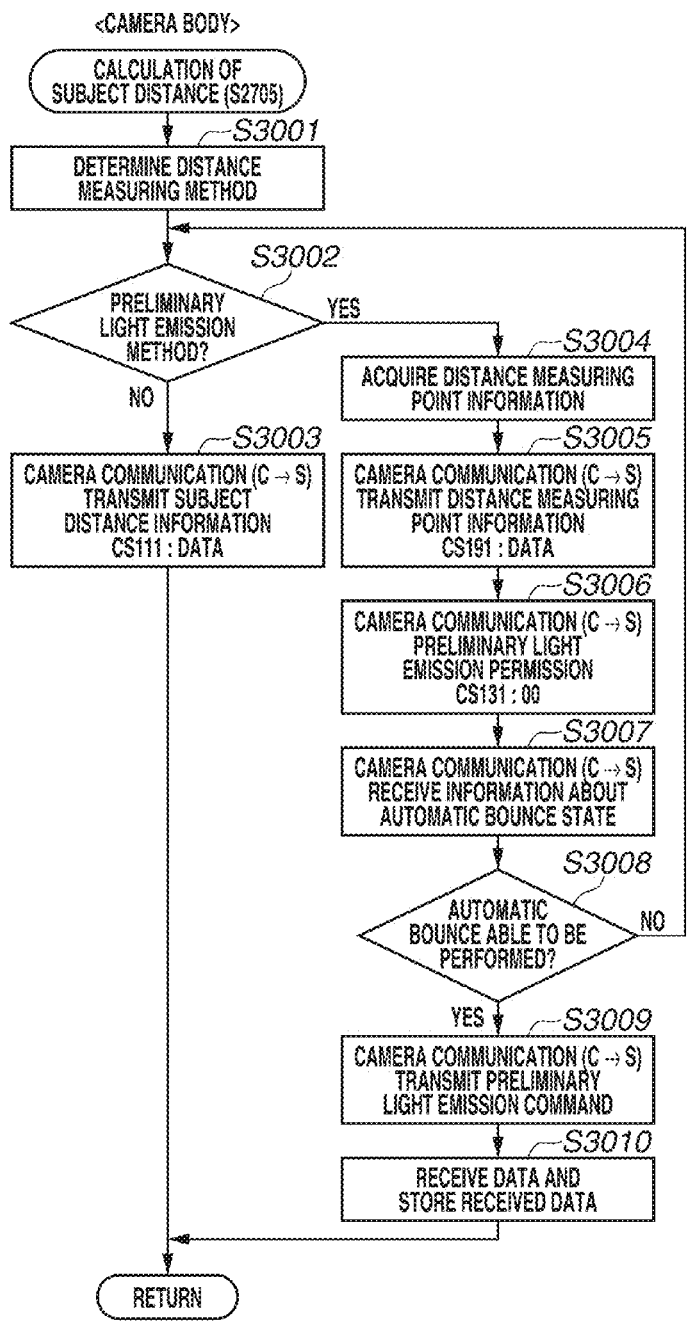
FIGS. 20A and 20B are flowcharts illustrating subject distance calculation processing according to the third exemplary embodiment.
Figure 20B:
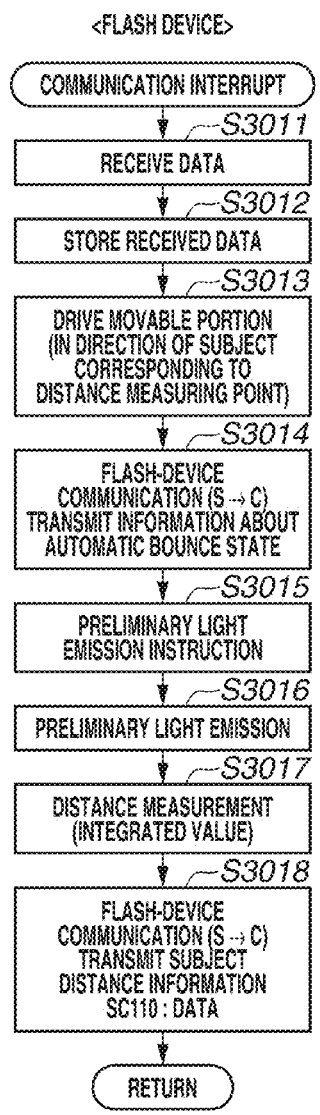

Next, the processing for calculating the distance to a subject in step S2705 in the bounce processing is described with reference to FIGS. 20A and 20B. The details of the setting commands as used herein are illustrated in FIGS. 26A and 26B. Moreover, in FIGS. 20A and 20B, processing performed by the camera body 100 is indicated with steps S3001 to S3010 and the corresponding processing performed by the flash device 300 is indicated with steps S3011 to S3018.

First, processing performed by the camera body 100 is described. In step S3001, the camera microcomputer 101 determines a distance measuring method for calculating the distance to a subject (subject distance). Then, the processing proceeds to step S3002.

In step S3002, the camera microcomputer 101 determines whether the distance measuring method is the preliminary light emission method. If the camera microcomputer 101 determines that the distance measuring method is other than the preliminary light emission method (NO in step S3002), the processing proceeds to step S3003. If the camera microcomputer 101 determines that the distance measuring method is the preliminary light emission method (YES in step S3002), the processing proceeds to step S3004.

In step S3003, since the distance measuring method is not the preliminary light emission method, the camera microcomputer 101 transmits, to the flash-device microcomputer 310, a "CS111 command: data XX" as subject distance information. Then, the processing proceeds to step S2706. In a case where information indicating that the distance measuring method is the flash-device distance measuring method is included in the automatic bounce data received by the camera microcomputer 101, step S3003 is omitted.

In step S3004, the camera microcomputer 101 reads out, from the RAM, and acquires information about the distance measuring point determined in step S2009*a*.

In step S3005, the camera microcomputer 101 transmits, to the flash-device microcomputer 310, a "CS191 command: data XX XX" as distance measuring point information. Then, the processing proceeds to step S3006.

Figure 28A:
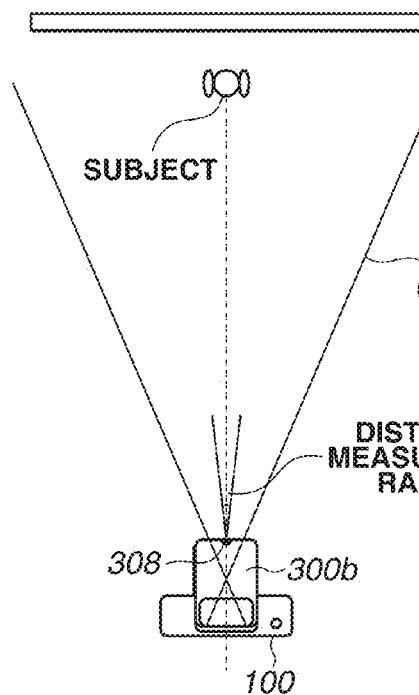
FIGS. 28A, 28B, 28C, and 28D illustrate the positional relationships between a determined distance measuring point and a distance measurable range according to the third exemplary embodiment.
Figure 28C:
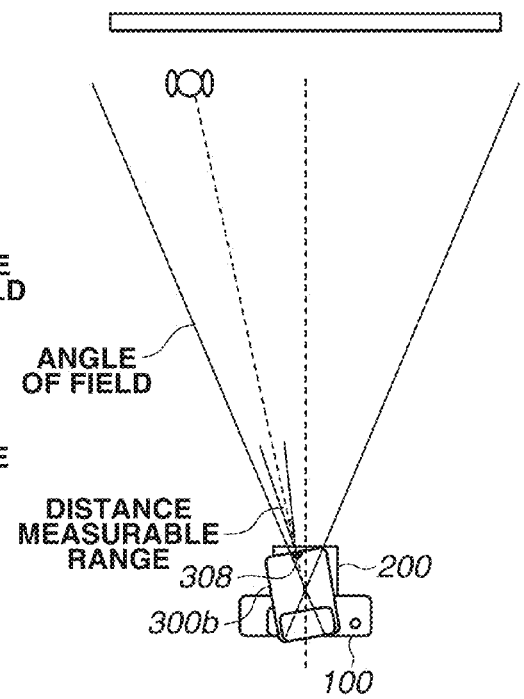

Now, the positional relationship between distance measuring points and a range within which the distance to a target object is able to be measured by the distance measuring unit 308 (a distance measurable range) is described with reference to FIGS. 28A, 28B, 28C, and 28D. FIGS. 28A and 28C illustrate, in overhead view, the positions of the camera body 100, the flash device 300, the movable portion 300*b*, and the distance measuring unit 308. Furthermore, straight lines spreading from the vicinity of the center of the movable portion 300*b* in the right and left directions indicate the angle of field determined by the focal length of the lens unit 200. Moreover, straight lines spreading from the vicinity of the center of the distance measuring unit 308 in the right and left directions indicate the distance measurable range of the distance measuring unit 308. In the present exemplary embodiment, the distance measurable range of the distance measuring unit 308 is a predetermined area in the vicinity of the center of the radiation range of the light emission unit.

Figure 28B:
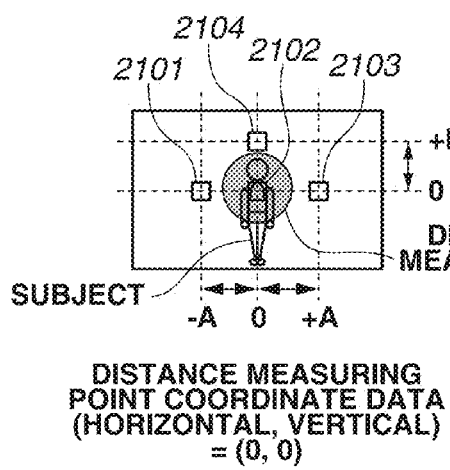
Figure 28D:
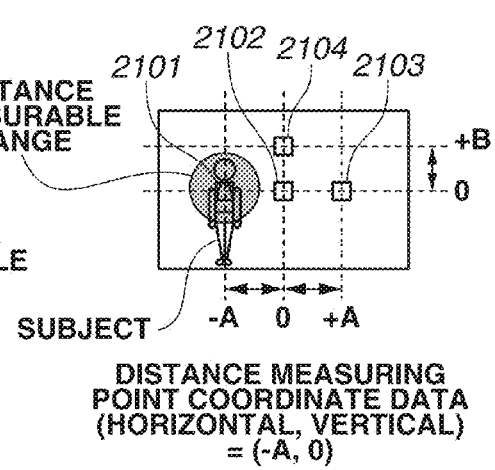

FIGS. 28B and 28D illustrate the relationship between the subject and the distance measuring points within the shooting image plane. While, in FIGS. 28B and 28D, the distance measuring points include four distance measuring points 2101, 2102, 2103, and 2104, the number of distance measuring points does not need to be four, or the positions of the distance measuring points do not need to be the illustrated ones. In the present exemplary embodiment, the distance measuring point information is data generated based on coordinate information with the center set to "0", right to "+", left to "−", up to "+", and down to "−".

FIGS. 28A and 28B illustrate a case where the subject is located in the center of the shooting image plane. FIGS. 28C and 28D illustrate a case where the subject is located near the left side of the shooting image plane. In the case of the position of the subject illustrated in FIGS. 28A and 28B, the distance measuring point information is the coordinates (0, 0) with the right-left position "0" and the up-down position "0", so that a "CS191 command: data 00 00" is produced. On the other hand, in the case of the position of the subject illustrated in FIGS. 28C and 28D, the distance measuring point information is the coordinates (−A, 0) with the right-left position "−A" and the up-down position "0", so that a "CS191 command: data (−A) 00" is produced. Furthermore, "(−A)" may be data expressed as the two's complement of a one-byte hexadecimal number (FxH).

In step S3006, the camera microcomputer 101 transmits, to the flash-device microcomputer 310, a "CS131 command: data 00" as preliminary light emission permission. Then, the processing proceeds to step S3007.

In step S3007, the camera microcomputer 101 receives information about the automatic bounce state from the flash-device microcomputer 310. Then, the processing proceeds to step S3008.

In step S3008, the camera microcomputer 101 determines whether the automatic bounce operation is able to be performed, based on the automatic bounce state received in step S3007. If the camera microcomputer 101 determines that the automatic bounce operation is able to be performed (YES in sep S3008), the processing proceeds to step S3009. If the camera microcomputer 101 determines that the automatic bounce operation is not able to be performed (NO in sep S3008), the processing returns to step S3002.

In step S3009, the camera microcomputer 101 transmits a preliminary light emission command to the flash-device microcomputer 310. Then, the processing proceeds to step S3010.

In step S3010, the camera microcomputer 101 receives subject distance information (data) from the flash-device microcomputer 310 and stores the received data into the built-in memory of the camera microcomputer 101. Then, the processing proceeds to step S2706.

Next, processing performed by the flash device 300 is described.

In step S3011, after a communication interrupt occurs, the flash-device microcomputer 310 receives data transmitted from the camera microcomputer 101. Then, the processing proceeds to step S3012. In step S3012, the flash-device microcomputer 310 stores the received data into the built-in memory of the flash-device microcomputer 310. Then, the processing proceeds to step S3013.

In step S3013, the flash-device microcomputer 310 instructs and causes the bounce circuit 340 to swivel the movable portion 300b in such a way that the distance measuring direction becomes a direction corresponding to the distance measuring point, based on the distance measuring point information and the lens focal length information.

Figure 29:
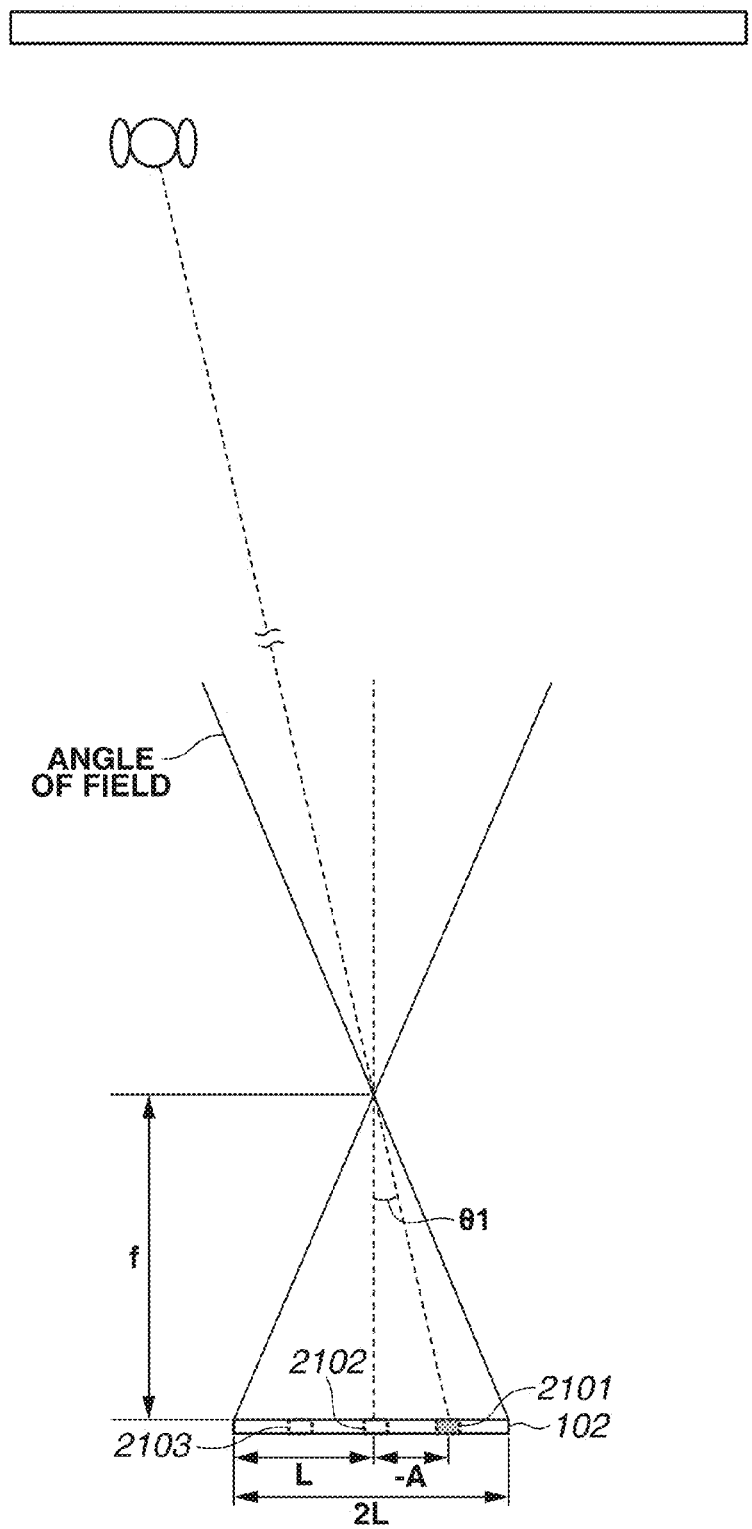
FIG. 29 illustrates a swiveling angle in the right and left directions of the movable portion corresponding to a determined distance measuring point according to the third exemplary embodiment.

The distance measuring point information and the lens focal length information as used herein are the distance measuring point information transmitted from the camera microcomputer 101 in step S3005 and the lens focal length information transmitted from the camera microcomputer 101 in step S2003. The swiveling angle in the right and left directions corresponding to the determined distance measuring point is described with reference to FIG. 29. FIG. 29 illustrates the swiveling angle in the right and left directions corresponding to the distance measuring point determined in a case where the subject is located in the same position as that illustrated in FIG. 28C. In FIG. 29, for ease of description, the position corresponding to each of the distance measuring points 2101, 2102, and 2103 on the image sensor 102 is indicated with a dotted square. Furthermore, the length of the imaging area in the horizontal direction of the image sensor 102 is denoted by 2L, the length from the center to the end of the imaging area in the horizontal direction of the image sensor 102 is denoted by L, and the focal length of the lens unit 200 is denoted by f.

For example, if the distance measuring point information transmitted in step S3005 is a "CS191 command: data 00 00" (in a case where the subject is located in the position corresponding to the distance measuring point 2102), the swiveling angle θ1 in the right and left directions of the movable portion 300b is calculated as 0 degrees (the frontal direction).

Furthermore, if the distance measuring point information is a "CS191 command: data (−A) 00" (in a case where the subject is located in the position corresponding to the distance measuring point 2101), it is necessary to swivel the movable portion 300b to the left to attain a distance measuring range corresponding to the determined distance measuring point. The swiveling angle θ1 in this instance is calculated as $$\theta1=\tan^{-1}(A/f).$$

After calculating the swiveling angle θ1 in the above-described manner, the flash-device microcomputer 310 selects a swiveling angle closest to the calculated swiveling angle θ1 from among the settable swiveling angles of the movable portion 300b, and determines the selected swiveling angle as the final swiveling angle of the movable portion 300b at the time of distance measurement. Then, the flash-device microcomputer 310 instructs and causes the bounce circuit 340 to swivel the movable portion 300b in such a way that the swiveling angle of the movable portion 300b reaches the determined swiveling angle.

Figure 30A:
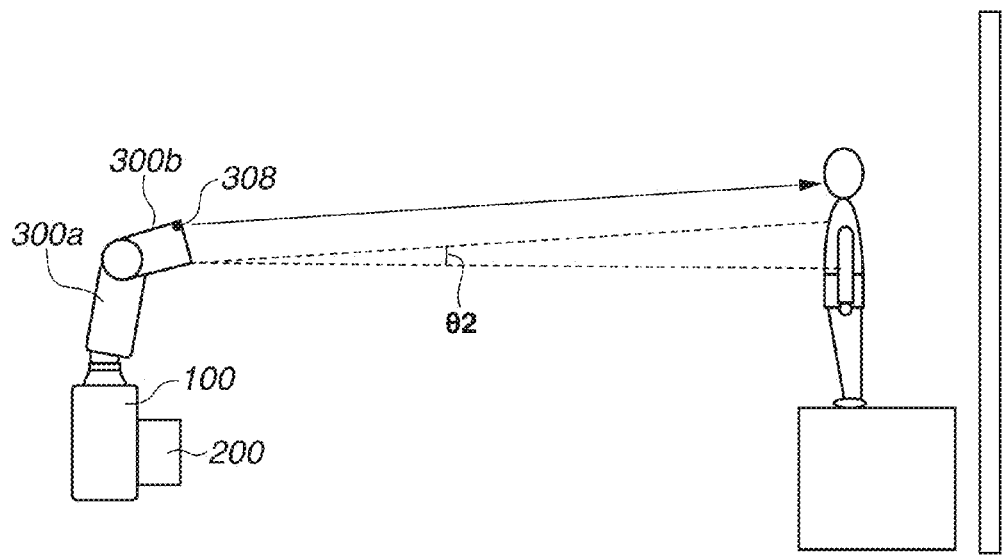
FIGS. 30A and 30B illustrate a swiveling angle in the up and down directions of the movable portion corresponding to a determined distance measuring point according to the third exemplary embodiment.
Figure 30B:
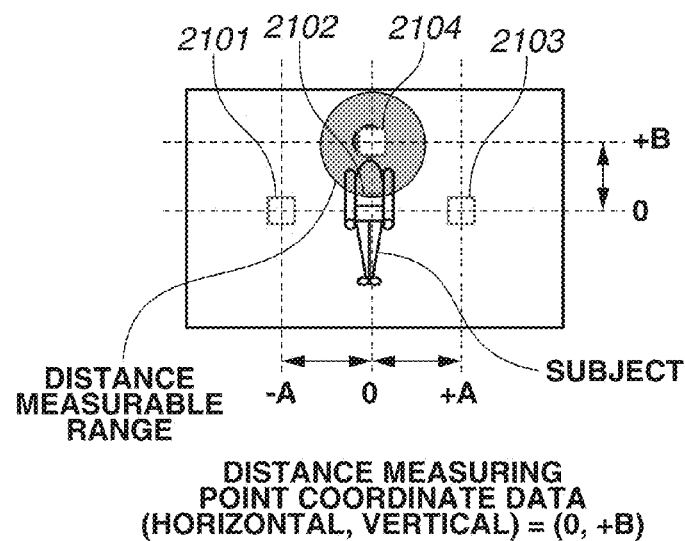

Moreover, as illustrated in FIGS. 30A and 30B, if the distance measuring point information transmitted in step S3005 is a "CS191 command: data 00 (+B)" (in a case where the subject is located in the position corresponding to the distance measuring point 2104), it is necessary to swivel the movable portion 300b upward. The swiveling angle θ2 in this instance is calculated as $$\theta2=\tan^{-1}(B/f).$$

After calculating the swiveling angle θ2 in the above-described manner, the flash-device microcomputer 310 selects a swiveling angle closest to the calculated swiveling angle θ2 from among the settable swiveling angles of the movable portion 300b, and determines the selected swiveling angle as the final swiveling angle of the movable portion 300b at the time of distance measurement. Then, the flash-device microcomputer 310 instructs and causes the bounce circuit 340 to swivel the movable portion 300b in such a way that the swiveling angle of the movable portion 300b reaches the determined swiveling angle.

Furthermore, to determine the swiveling angle of the movable portion 300b at the time of distance measurement, the above-described calculation may be performed, or a table, which is previously stored in the built-in memory of the flash-device microcomputer 310 and in which the distance measuring point information, the lens focal length information, and the swiveling angles are associated with one another, may be used. In addition, the camera microcomputer 101 may use the above-described methods to determine the swiveling angle θ1 or θ2 or determine the swiveling angle of the movable portion 300b at the time of distance measurement.

Although, as described above, the flash-device microcomputer 310 determines the swiveling angles of the movable portion 300b in the up and down directions and in the right and left directions at the time of measuring the subject distance according to the position of the determined distance measuring point, a case may be considered where the flash-device microcomputer 310 only needs to swivel the movable portion 300b in only one of the up and down directions and the right and left directions depending on the distance measurable range of the distance measuring unit 308. Therefore, the flash-device microcomputer 310 can determine the swiveling angle of the movable portion 300b in at least one of the up and down directions and the right and left directions at the time of measuring the subject distance according to the position of the determined distance measuring point. In step S3014, the flash-device microcomputer 310 transmits, to the camera microcomputer 101, information about the automatic bounce state, in this case, information indicating whether the flash device 300 is ready to perform the automatic bound operation.

In step S3015, the flash-device microcomputer 310 issues, according to the preliminary light emission command, a preliminary light emission instruction to the light emission control circuit 304.

In step S3016, the light emission control circuit 304 causes, according to the preliminary light emission instruction, the discharge tube 305 to perform preliminary light emission.

In step S3017, the distance measuring unit 308 receives, via the light receiving sensor, reflected light from the target object caused by the preliminary light emission, and calculates the subject distance based on the integrated value of the received reflected light.

In step S3018, the flash-device microcomputer 310 transmits, to the camera microcomputer 101, an "SC110 command: data XX" as subject distance information indicating the calculated subject distance. Then, the processing ends.

In the above-described way, the camera microcomputer 101 or the flash-device microcomputer 310 calculates the subject distance used to determine a radiation direction most appropriate for bounce light emission shooting.

Figure 13:
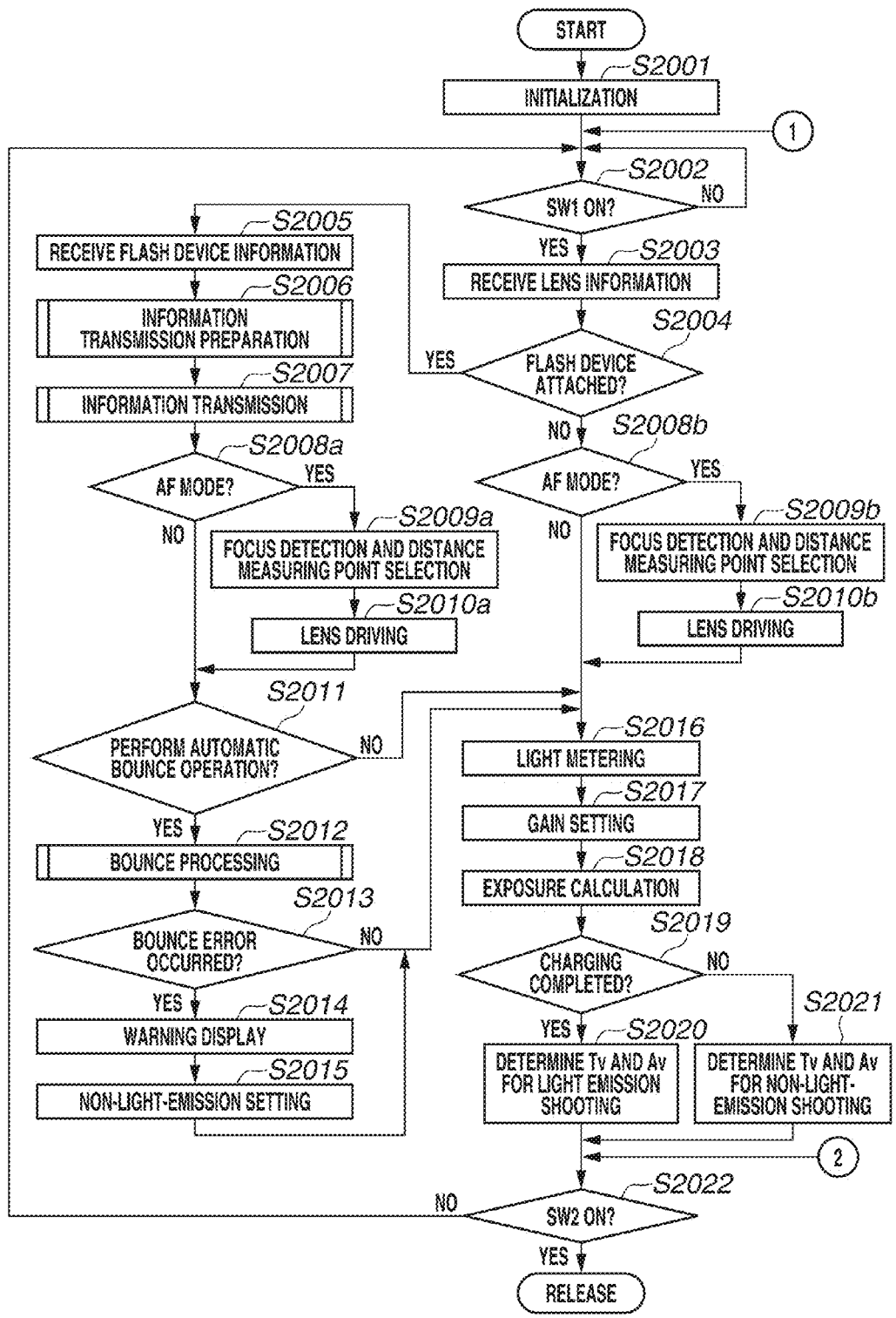
FIG. 13 is a flowchart illustrating various processing operations performed by the camera body relating to automatic bounce light emission shooting according to a third exemplary embodiment of the present invention.

In this calculation method, in a case where the SW1 switch is kept on without the SW2 switch turned on, if the distance measuring point determined in step S2009a illustrated in FIG. 13 has changed, the distance measuring point information to be transmitted in step S3005 changes, and, therefore, the flash-device microcomputer 310 changes the swiveling angle of the movable portion 300b to calculate the subject distance.

Figure 21A:
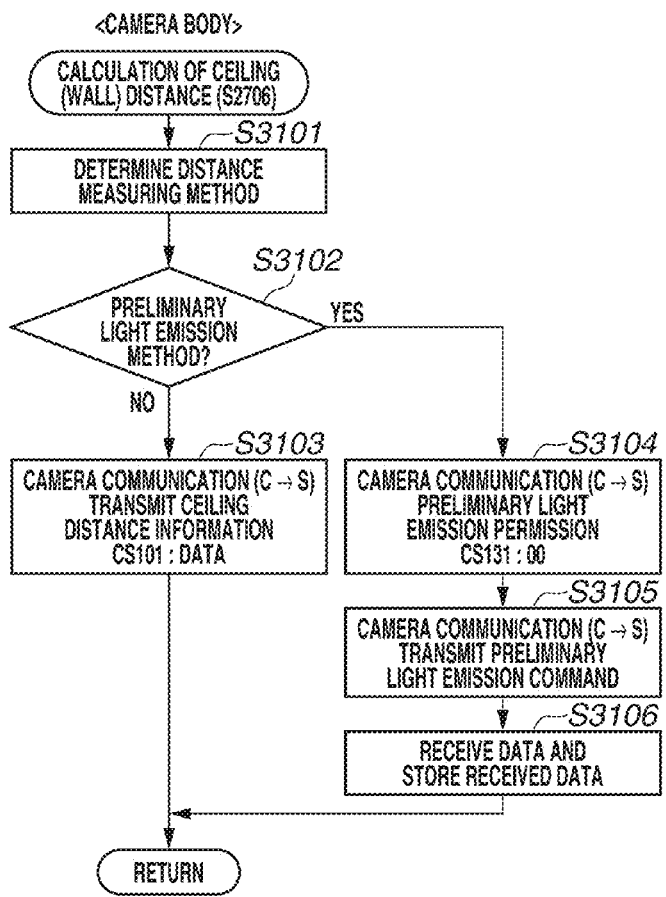
FIGS. 21A and 21B are flowcharts illustrating ceiling (wall) distance calculation processing according to the third exemplary embodiment.
Figure 21B:
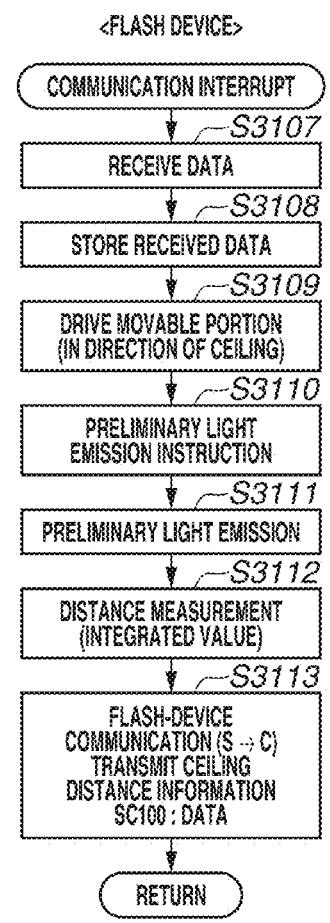

Next, the processing for calculating the distance to a ceiling (wall) in step S2706 in the bounce processing is described with reference to FIGS. 21A and 21B. The details of the setting commands as used herein are illustrated in FIGS. 26A and 26B. Moreover, in FIGS. 21A and 21B, processing performed by the camera body 100 is indicated with steps S3101 to S3106 and the corresponding processing performed by the flash device 300 is indicated with steps S3107 to S3113.

First, processing performed by the camera body 100 is described. In step S3101, the camera microcomputer 101 determines a distance measuring method for calculating the distance to a ceiling (wall) (ceiling distance). Then, the processing proceeds to step S3102.

In step S3102, the camera microcomputer 101 determines whether the distance measuring method is the preliminary light emission method. If the camera microcomputer 101 determines that the distance measuring method is other than the preliminary light emission method (NO in step S3102), the processing proceeds to step S3103. If the camera microcomputer 101 determines that the distance measuring method is the preliminary light emission method (YES in step S3102), the processing proceeds to step S3104.

In step S3103, since the distance measuring method is not the preliminary light emission method, the camera microcomputer 101 transmits, to the flash-device microcomputer 310, a "CS101 command: data XX" as ceiling distance information. Then, the processing proceeds to step S2707. In a case where information indicating that the distance measuring method is the flash-device distance measuring method is included in the automatic bounce data received by the camera microcomputer 101, step S3103 is omitted.

In step S3104, the camera microcomputer 101 transmits, to the flash-device microcomputer 310, a "CS131 command: data 00" as preliminary light emission permission. Then, the processing proceeds to step S3105.

In step S3105, the camera microcomputer 101 transmits a preliminary light emission command to the flash-device microcomputer 310. Then, the processing proceeds to step S3106.

In step S3106, the camera microcomputer 101 receives subject distance information (data) from the flash-device microcomputer 310 and stores the received data into the built-in memory of the camera microcomputer 101. Then, the processing proceeds to step S2707.

Next, processing performed by the flash device 300 is described. In step S3107, after a communication interrupt occurs, the flash-device microcomputer 310 receives data transmitted from the camera microcomputer 101. Then, the processing proceeds to step S3108. In step S3108, the flash-device microcomputer 310 stores the received data into the built-in memory of the flash-device microcomputer 310. Then, the processing proceeds to step S3109.

When receiving the preliminary light emission permission, then in step S3109, the flash-device microcomputer 310 instructs and causes the bounce circuit 340 to swivel the movable portion 300b in such a way that the radiation direction becomes a direction toward the ceiling. Upon completion of swiveling of the movable portion 300b, in step S3110, the flash-device microcomputer 310 issues, according to the preliminary light emission command, a preliminary light emission instruction to the light emission control circuit 304.

In step S3111, the light emission control circuit 304 causes, according to the preliminary light emission instruction, the discharge tube 305 to perform preliminary light emission.

In step S3112, the distance measuring unit 308 receives, via the light receiving sensor, reflected light from the target object caused by the preliminary light emission, and calculates the ceiling distance based on the integrated value of the received reflected light.

In step S3113, the flash-device microcomputer 310 transmits, to the camera microcomputer 101, an "SC100 command: data XX" as ceiling distance information indicating the calculated ceiling distance. Then, the processing ends.

In the above-described way, the camera microcomputer 101 or the flash-device microcomputer 310 calculates the ceiling (wall) distance used to determine a radiation direction most appropriate for bounce light emission shooting. Next, the processing for determining a radiation direction in step S2707 in the bounce processing is described with reference to FIGS. 22A and 22B. The details of the setting commands as used herein are illustrated in FIGS. 26A and 26B. Moreover, in FIGS. 22A and 22B, processing performed by the camera body 100 is indicated with steps S3201 to S3206 and the corresponding processing performed by the flash device 300 is indicated with steps S3207 to S3212.

In step S3201, the camera microcomputer 101 determines whether to perform the determination of a radiation direction at the camera body 100. In a case where the determination of a radiation direction can be performed at both the camera body 100 and the flash device 300, any one of the camera body 100 and the flash device 300 may perform the determination of a radiation direction. However, the user may be allowed to operate the input unit 112 to set which of the camera body 100 and the flash device 300 performs the determination of a radiation direction.

Furthermore, in a case where only one of the camera body 100 and the flash device 300 can perform the determination of a radiation direction, which of the camera body 100 and the flash device 300 performs the determination of a radiation direction may be automatically set. If the camera microcomputer 101 determines to perform the determination of a radiation direction at the camera body 100 (YES in step S3201), the processing proceeds to step S3202. If the camera microcomputer 101 determines to perform the determination of a radiation direction at the flash device 300 (NO in step S3201), the processing proceeds to step S3205.

In step S3202, the camera microcomputer 101 refers to the subject distance information indicating the subject distance calculated in step S2705 and the ceiling distance information indicating the ceiling (wall) distance calculated in step S2706, which are used to determine a radiation direction.

Figure 27:
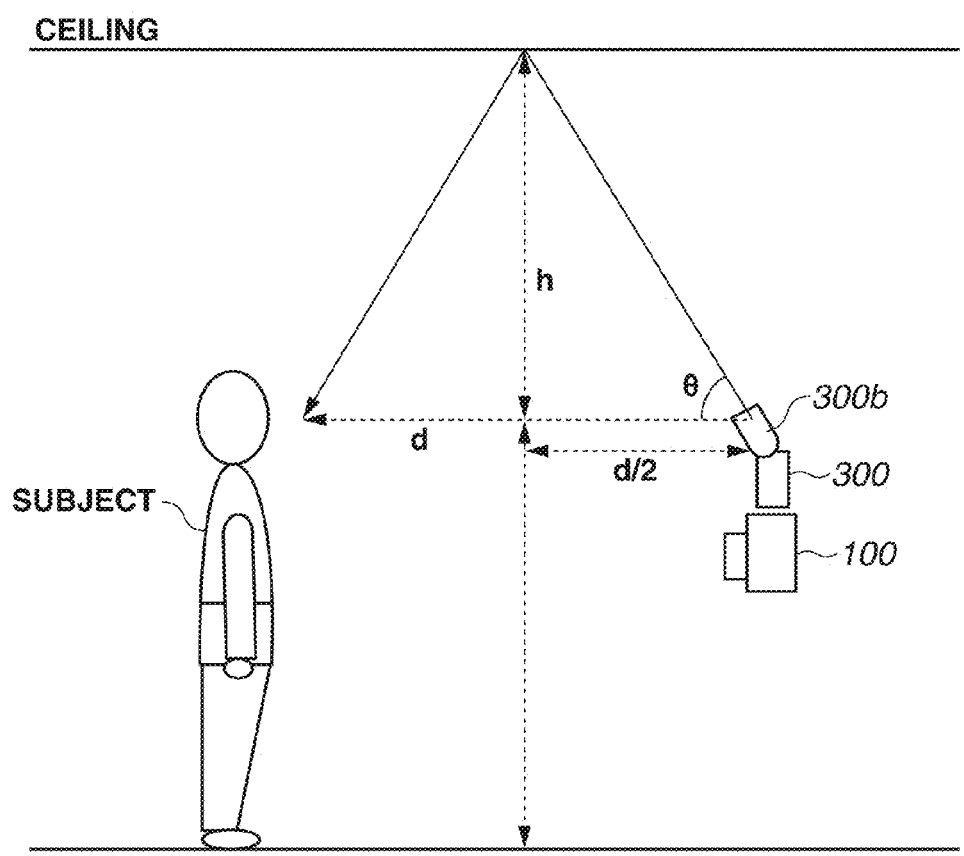
FIG. 27 illustrates an example of a bounce light emission shooting scene according to the third exemplary embodiment.

In step S3203, the camera microcomputer 101 determines a radiation direction most appropriate for bounce light emission shooting based on the subject distance information and the ceiling distance information referred to in step S3202. More specifically, the camera microcomputer 101 calculates a swiveling angle of the movable portion 300*b* in such a way as to attain the most appropriate radiation direction. The method for calculating the swiveling angle is not particularly limiting as long as it is a method of calculation performed based on the subject distance and the ceiling distance. Suppose that, in an example of a bounce light emission shooting scene illustrated in FIG. 27, when the distance to a subject with the emission surface for flash light of the flash device 300 set as the point of origin is "d", if flash light is reflected at a portion of the ceiling located at a distance of "d/2" toward the subject, the reflected light most appropriate for the subject can be obtained. In this case, when the distance to the ceiling is "h" and the angle of the most appropriate radiation direction relative to the horizontal direction is "θ", a relationship of $\theta = \tan^{-1}(2h/d)$ is obtained. Therefore, the camera microcomputer 101 can calculate the swiveling angle of the movable portion 300*b* relative to the camera body 300*a* in such a way that the angle of the radiation direction relative to the horizontal direction becomes "θ". Furthermore, in order to cope with a case where the movable portion 300*b* is not able to swivel up to the calculated swiveling angle, the camera microcomputer 101 may select a specified angle predetermined based on the calculated swiveling angle and may cause the movable portion 300*b* to swivel to the selected specified angle. In this case, the camera microcomputer 101 is configured to select a specified angle larger than the calculated swiveling angle. In other words, the camera microcomputer 101 shifts the position of reflection of flash light to a position more distant from the position of the subject than a position of reflection corresponding to the calculated swiveling angle. The reason for this is to increase the reflected light from the ceiling radiated on the frontal surface of the subject compared with the case where a specified angle smaller than the calculated swiveling angle is selected, and to prevent flash light from being directly radiated on the subject.

Upon completion of the angle calculation, the camera microcomputer 101 stores angular information indicating the calculated angle into the built-in memory of the camera microcomputer 101. Then, the processing proceeds to step S3204.

In step S3204, the camera microcomputer 101 transmits, to the flash-device microcomputer 310, a "CS071 command: up and down data XX" and a "CS081 command: right and left data XX" as the angular information indicating the calculated angles. Then, the processing proceeds to step S2708. In the above-described way, the camera microcomputer 101 controls the radiation direction.

On the other hand, if the camera microcomputer101 determines not to perform the determination of a radiation direction at the camera body 100 (NO in step S3201), then in step S3205, the camera microcomputer 101 transmits, to the flash-device microcomputer 310, a "CS171 command: 00" as an angle calculation instruction. Then, the processing proceeds to step S3206.

In step S3206, the camera microcomputer 101 receives angular information (data) from the flash-device microcomputer 310, and stores the received data into the built-in memory of the camera microcomputer 101. Then, the processing proceeds to step S2708.

Next, processing performed by the flash device 300 is described. In step S3207, after a communication interrupt occurs, the flash-device microcomputer 310 receives data transmitted from the camera microcomputer 101. Then, the processing proceeds to step S3208. In step S3208, the flash-device microcomputer 310 stores the received data into the built-in memory of the flash-device microcomputer 310. Then, the processing proceeds to step S3209.

In step S3209, the flash-device microcomputer 310 determines whether to perform the determination of a radiation direction at the flash device 300. If the flash-device microcomputer 310 determines to perform the determination of a radiation direction at the flash device 300 (YES in step S3209), the processing proceeds to step S3210. If the flash-device microcomputer 310 determines not to perform the determination of a radiation direction at the flash device 300 (NO in step S3209), the processing ends.

In step S3210, the flash-device microcomputer 310 refers to the subject distance information indicating the subject distance calculated in step S2705 and the ceiling distance information indicating the ceiling (wall) distance calculated in step S2706, which are used to determine a radiation direction.

In step S3211, the flash-device microcomputer 310 determines a radiation direction most appropriate for bounce light emission shooting based on the subject distance information and the ceiling distance information referred to in step S3210. The method for determining the radiation direction may be the same as that performed at the camera boy 100, and, therefore, the description thereof is omitted.

In step S3212, the flash-device microcomputer 310 transmits, to the camera microcomputer 101, an "SC070 command: up and down data XX" and an "SC080 command: right and left data XX" as the angular information indicating the calculated angles. Then, the processing ends. In the above-described way, the flash-device microcomputer 310 controls the radiation direction.

Next, the processing for bounce drive control in step S2708 in the bounce processing is described with reference to FIG. 23A and FIG. 23B, which is composed of FIGS. 23B1 and 23B2. The details of the setting commands as used herein are illustrated in FIGS. 26A and 26B.

Figure 23A:
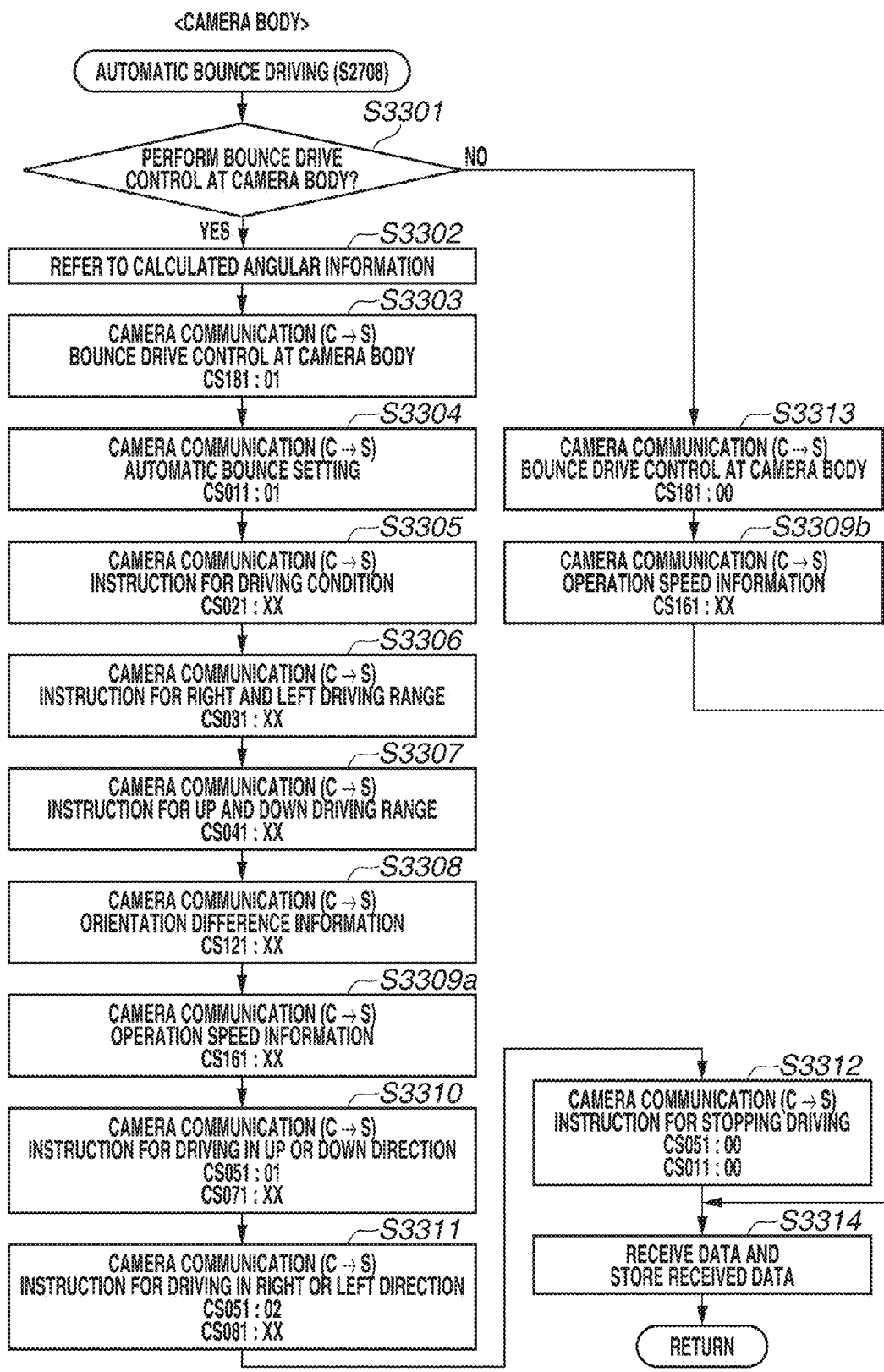

Moreover, in FIGS. 23A and 23, processing performed by the camera body 100 is indicated with steps S3301 to S3314 and the corresponding processing performed by the flash device 300 is indicated with steps S3315 to S3330.

In step S3301, the camera microcomputer 101 determines whether to perform bounce drive control at the camera body 100. If the camera microcomputer 101 determines to perform bounce drive control at the camera body 100 (YES in step S3301), the processing proceeds to step S3302. If the camera microcomputer 101 determines to perform bounce drive control at the flash device 300 (NO in step S3301), the processing proceeds to step S3313.

In step S3302, the camera microcomputer 101 refers to the angular information calculated in step S2707.

In step S3303, the camera microcomputer 101 transmits, to the flash-device microcomputer 310, a "CS181 command: data 01" to inform the flash-device microcomputer 310 that the camera microcomputer 101 performs bounce drive control. Then, the processing proceeds to step S3304.

In step S3304, the camera microcomputer 101 transmits, to the flash-device microcomputer 310, a "CS011 command: 01" as automatic bounce setting. Then, the processing proceeds to step S3305.

In step S3305, the camera microcomputer 101 transmits, to the flash-device microcomputer 310, a "CS021 command: data XX" as a drive condition for automatic bounce. Then, the processing proceeds to step S3306. The data in the CS021 command is set to "00 for both the right and left directions and the up and down directions", "01 for only the right and left directions", and "02 for only the up and down directions".

In step S3306, the camera microcomputer 101 transmits, to the flash-device microcomputer 310, a "CS031 command: data XX XX" as the driving range in the right and left directions. Then, the processing proceeds to step S3307. In step S3307, the camera microcomputer 101 transmits, to the flash-device microcomputer 310, a "CS041 command: data XX XX" as the driving range in the up and down directions. Then, the processing proceeds to step S3308.

In step S3308, the camera microcomputer 101 transmits, to the flash-device microcomputer 310, a "CS121 command: data XX XX XX" as orientation difference information. Then, the processing proceeds to step S3309a.

In step S3309a, the camera microcomputer 101 transmits, to the flash-device microcomputer 310, a "CS161 command: data XX" as operation speed information indicating the speed at which to swivel the movable portion 300b (the driving speed of a motor in the bounce drive circuit 340). The data in the CS161 command is set to "00 for normal (reference speed)", "01 for low speed (50% of reference speed)", and "02 for high speed (150% of reference speed)", but may be more finely set. Since the speed at which to swivel the movable portion 300b is set variable in the above-mentioned way, operation sound of the motor for swiveling the movable portion 300b can be set according to a shooting scene. The speed at which to swivel the movable portion 300b can be changed by the user operation on the input unit 112.

In step S3310, the camera microcomputer 101 transmits, to the flash-device microcomputer 310, a "CS051 command: data 01" and a "CS071 command: data XX" as a driving instruction in the up and down directions. Then, the processing proceeds to step S3311. In step S3311, the camera microcomputer 101 transmits, to the flash-device microcomputer 310, a "CS051 command: data 02" and a "CS081 command: data XX" as a driving instruction in the right and left directions. Then, the processing proceeds to step S3312.

Upon completion of the bounce driving, in step S3312, the camera microcomputer 101 transmits, to the flash-device microcomputer 310, a "CS051 command: data 00" and a "CS011 command: data 00" as a stop instruction for the bounce driving. Then, the processing proceeds to step S3314.

If the camera microcomputer 101 determines to perform bounce drive control at the flash device 300 (NO in step S3301), then in step S3313, the camera microcomputer 101 transmits, to the flash-device microcomputer 310, a "CS181 command: data 00" to inform the flash-device microcomputer 310 that the flash-device microcomputer 310 performs bounce drive control. Then, the processing proceeds to step S3309b.

In step S3309b, similar to step S3309a, the camera microcomputer 101 transmits, to the flash-device microcomputer 310, a "CS161 command: data XX" as the operation speed information. Then, the processing proceeds to step S3314.

In step S3314, the camera microcomputer 101 receives current position information (data) from the flash-device microcomputer 310, and stores the received data into the built-in memory of the camera microcomputer 101. Then, the processing proceeds to step S2709.

Next, processing performed by the flash device 300 is described. In step S3315, after a communication interrupt occurs, the flash-device microcomputer 310 receives data transmitted from the camera microcomputer 101. Then, the processing proceeds to step S3316. In step S3316, the flash-device microcomputer 310 stores the received data into the built-in memory of the flash-device microcomputer 310. Then, the processing proceeds to step S3317a.

In step S3317a, the flash-device microcomputer 310 determines whether a driving error, such as the collision of the movable portion 300b or the forcible manual pressing of the movable portion 300b, has occurred during the bounce driving. If the flash-device microcomputer 310 determines that no driving error has occurred (NO in step S3317a), the processing proceeds to step S3318. If the flash-device microcomputer 310 determines that a driving error has occurred (YES in step S3317a), the processing proceeds to step S3330.

In step S3318, the flash-device microcomputer 310 transmits, to the camera microcomputer 101, an "SC060 command: data 00" to inform the camera microcomputer 101 that no driving error has occurred. Then, the processing proceeds to step S3319.

In step S3319, the flash-device microcomputer 310 determines whether to perform bounce drive control at the camera body 100. If the flash-device microcomputer 310 determines to perform bounce drive control at the flash device 300 (NO in step S3319), the processing proceeds to step S3320. If the flash-device microcomputer 310 determines to perform bounce drive control at the camera body 100 (YES in step S3319), the processing proceeds to step S3327.

In step S3320, the flash-device microcomputer 310 makes preparations to perform bounce driving according to instructions from the flash device 300. Then, the processing proceeds to step S3321a.

In step S3321a, the flash-device microcomputer 310 refers to the angular information in the up and down directions calculated in step S2707. Then, the processing proceeds to step S3322a.

In step S3322a, the flash-device microcomputer 310 drives the motor of the bounce drive circuit 340d to swivel the movable portion 300b to the calculated angle in the up or down direction.

In step S3323a, the flash-device microcomputer 310 transmits, to the camera microcomputer 101, an "SC050 command: data 01" to inform the camera microcomputer 101 that the movable portion 300b is in the process of being driven in the up or down direction. Then, the processing proceeds to step S3317b.

In step S3317b, similar to step S3317a, the flash-device microcomputer 310 determines whether a driving error has occurred. If the flash-device microcomputer 310 determines that no driving error has occurred (NO in step S3317b), the processing proceeds to step S3324a. If the flash-device microcomputer 310 determines that a driving error has occurred (YES in step S3317b), the processing proceeds to step S3330.

In step S3324a, the flash-device microcomputer 310 refers to the angular information in the right and left directions calculated in step S2707. Then, the processing proceeds to step S3325a.

In step S3325a, the flash-device microcomputer 310 drives the motor of the bounce drive circuit 340b to swivel the movable portion 300b to the calculated angle in the right or left direction.

In step S3326a, the flash-device microcomputer 310 transmits, to the camera microcomputer 101, an "SC050 command: data 02" to inform the camera microcomputer 101 that the movable portion 300b is in the process of being driven in the right or left direction. Then, the processing proceeds to step S3317c.

In step S3317c, similar to step S3317a, the flash-device microcomputer 310 determines whether a driving error has occurred. If the flash-device microcomputer 310 determines that no driving error has occurred (NO in step S3317c), the processing proceeds to step S3328. If the flash-device microcomputer 310 determines that a driving error has occurred (YES in step S3317c), the processing proceeds to step S3330.

Upon completion of driving in the up or down direction and in the right or left direction, then in step S3328, the flash-device microcomputer 310 transmits, to the camera microcomputer 101, an "SC050 command: data 00" and an "SC010 command: data 00" as driving stop information. Then, the processing proceeds to step S3329.

In step S3329, the flash-device microcomputer 310 transmits, to the camera microcomputer 101, an "SC070 command: data XX" and an "SC080 command: data XX" as current position information indicating the swiveling angle of the movable portion 300b obtained after the bounce driving. Then, the processing ends.

On the other hand, if the flash-device microcomputer 310 determines to perform bounce drive control at the camera body 100 (YES in step S3319), then in step S3327, the flash-device microcomputer 310 makes preparations to perform bounce driving according to instructions from the camera body 100. Then, the processing proceeds to step S3321b.

Subsequently, in steps S3321b to S3317e, the flash-device microcomputer 310 performs processing similar to the processing performed in steps S3321a to S3317c.

In the above-described way, the flash-device microcomputer 310 automatically swivels the movable portion 300b in the up or down direction and in the right or left direction in such a way as to attain a radiation direction most appropriate for bounce light emission shooting.

Next, processing associated with the light emission of the flash device 300 including the bounce operation is described with reference to FIG. 24. When the flash-device microcomputer 310 of the flash device 300 is activated in response to the power switch included in the input unit 312 being turned on, the flash-device microcomputer 310 starts the flowchart illustrated in FIG. 24.

In step S3401, the flash-device microcomputer 310 performs initialization of its memories and ports. Furthermore, the flash-device microcomputer 310 reads the states of switches included in the input unit 312 and previously set pieces of input information, and performs setting of various light emission modes, such as the method of determining the amount of light emission and the timing of light emission.

In step S3402, the flash-device microcomputer 310 charges the main capacitor 302d by activating the booster circuit block 302.

In step S3403, the flash-device microcomputer 310 stores, into the built-in memory of the flash-device microcomputer 310, focal length information acquired from the camera microcomputer 101 via the communication line SC. Furthermore, in a case where focal length information has previously been stored in the memory, the flash-device microcomputer 310 updates the stored focal length information with new focal length information.

In step S3404, the flash-device microcomputer 310 displays, on the display unit 313, an image relating to the light emission mode set via the input unit 312 and an image relating to the acquired focal length information.

In step S3405, the flash-device microcomputer 310 causes the zoom drive circuit 330 to move the zoom optical system 307 in such a way that the radiation range of flash light reaches a range corresponding to the acquired focal length information.

In step S3406, the flash-device microcomputer 310 causes the bounce position detection circuits 340a and 340c to detect the swiveling angle of the movable portion 300b relative to the body portion 300a.

In step S3407, the flash-device microcomputer 310 determines whether a bounce operation execution instruction is issued. If the flash-device microcomputer 310 determines that the bounce operation execution instruction is issued (YES in step S3407), the processing proceeds to step S3408. In step S3408, the flash-device microcomputer 310 performs the above-described bounce driving. If the flash-device microcomputer 310 determines that the bounce operation execution instruction is not issued (NO in step S3407), the processing proceeds to step S3409.

In step S3409, the flash-device microcomputer 310 transmits, to the camera microcomputer 101, the current position information indicating the swiveling angle of the movable portion 300b relative to the body portion 300a obtained after the bounce driving, as described above.

In step S3410, the flash-device microcomputer 310 determines whether the charging voltage of the main capacitor 302d is equal to or higher than a predetermined value (charging completed). If the flash-device microcomputer 310 determines that the charging voltage is equal to or higher than the predetermined value (YES in step S3410), the processing proceeds to step S3411. If the flash-device microcomputer 310 determines that the charging voltage is lower than the predetermined value (NO in step S3410), the processing proceeds to step S3414.

In step S3411, the flash-device microcomputer 310 transmits a charging completion signal to the camera microcomputer 101. Then, the processing proceeds to step S3412.

In step S3412, the flash-device microcomputer 310 determines whether a light emission start signal has been received as a light emission command. If the flash-device microcomputer 310 determines that the light emission start signal has been received (YES in step S3412), the processing proceeds to step S3413. If the flash-device microcomputer 310 determines that the light emission start signal has not been received (NO in step S3412), the processing returns to step S3402.

In step S3413, in response to the received light emission start signal, the flash-device microcomputer 310 instructs the light emission control circuit 304 to perform light emission. The light emission control circuit 304 causes the discharge tube 305 to emit light according to the light emission instruction. After completion of the light emission, the processing returns to step S3402. Furthermore, in step S3413, with respect to a series of light emission, such as preliminary light emission for flash control or main light emission, the processing does not return to step S3402 even after each light emission ends, so that the processing does not return to step S3402 until a series of light emission ends.

In a case where the charging voltage is lower than the predetermined value (NO in step S3410), then in step S3414, the flash-device microcomputer 310 transmits a charging incompletion signal to the camera microcomputer 101. Then, the processing returns to step S3402.

In the above-described way, the flash-device microcomputer 310 performs processing associated with light emission of the flash device 300 including the bounce operation.

As described above, according to the present exemplary embodiment, the swiveling angle of the movable portion 300b at the time of measuring a subject distance in the frontal direction is determined according to the position of an area targeted for focus adjustment, which is determined as an area on which to focus. Accordingly, a radiation direction appropriate for bounce shooting can be accurately obtained regardless of the position of a subject within the shooting image plane.

Furthermore, while, in the above-described exemplary embodiment, a case where an area targeted for focus adjustment is determined as an area on which to focus has been described, a case may be assumed where an area targeted for focus adjustment cannot be determined due to a dark shooting scene or the like. In such a case, in step S3005, the camera microcomputer 101 can transmit, to the flash-device microcomputer 310, a "CS191 command: data FF FF" as distance measuring point information, and the flash-device microcomputer 310, having received such distance measuring point information, can set the swiveling angle of the movable portion 300b to 0 degrees both in the up and down directions and in the right and left directions.

Moreover, in the above-described exemplary embodiment, as an example of a measurement control method of controlling the distance measurable range, a configuration for moving the distance measurable range of the distance measuring unit 308 by swiveling the movable portion 300b has been described. However, the measurement control method may be other than the method used in above-described exemplary embodiment, and, for example, may be a configuration for moving the distance measurable range of the distance measuring unit 308 without swiveling the movable portion 300b. In such a case, similar to the above-described exemplary embodiment, the flash-device microcomputer 310 may determine the amount of movement of the distance measuring unit 308 causing the distance measurable range to be located in an appropriate position according to the position of the determined area targeted for focus adjustment. For example, in a case where the distance measuring unit 308 causes a light receiving sensor to receive light reflected from a target object irradiated by the discharge tube 305 and located in the radiation direction and detects the distance to the target object, the flash-device microcomputer 310 may determine the direction of the light receiving surface of the light receiving sensor.

In addition, the distance measurable range does not need to be moved in such a manner that a position corresponding to the position of the determined area targeted for focus adjustment becomes the center of the distance measurable range, but the flash-device microcomputer 310 may move the distance measurable range only in such a manner that the position corresponding to the position of the determined area targeted for focus adjustment is included in the distance measurable range.

Furthermore, the distance measuring unit 308 may have a plurality of distance measurable ranges, and the flash-device microcomputer 310 may select at which of the distance measurable ranges to perform the distance measurement according to the position of the determined area targeted for focus adjustment.

Moreover, in a case where the distance measuring unit 308 is capable of changing the size of the distance measurable range, the flash-device microcomputer 310 may determine the size of the distance measurable range in such a manner that the position corresponding to the position of the determined area targeted for focus adjustment is included in the distance measurable range, according to the position of the determined area targeted for focus adjustment.

Japanese Patent Application Laid-Open No. 2009-163179 discusses a technique to acquire the distances to a subject and a reflection surface, on which a photographic lens is focused, based on the lens positions of the photographic lens taken when the photographic lens is focused on the subject and on the reflection surface, and to obtain the most appropriate bounce angle based on the acquired distances.

However, depending on some setting of a mode for focusing the photographic lens on the subject (focus adjustment mode), the method for obtaining a bounce angle discussed in Japanese Patent Application Laid-Open No. 2009-163179 may not obtain the most appropriate bounce angle.

Therefore, according to a fourth exemplary embodiment of the present invention, an imaging system is configured to perform light emission shooting according to the focus adjustment mode in a manner described below.

The imaging system according to the fourth exemplary embodiment is almost similar to that illustrated in FIGS. 1 and 2, and, therefore, the description of the same portions as those illustrated in FIGS. 1 and 2 is not repeated. Data communications performed via the terminal group 130 in the present exemplary embodiment are almost the same as those in the third exemplary embodiment, and various pieces of information are transmitted from the camera microcomputer 101 to the flash-device microcomputer 310 according to command lists illustrated in FIG. 34A, which is composed of FIGS. 34A1 and 34A2, and FIG. 34B, which is composed of FIGS. 34B1, 34B2, and 34B3, which are described below. In the present exemplary embodiment, the user can operate a setting button or the like contained in the input unit 112 to perform various settings of the flash device 300 attached to the camera body 100, the setting of the focus adjustment mode, which is described below, and the setting of control modes in the AF mode.

Next, various processing operations performed by the camera body 100 relating to automatic bounce light emission shooting are described with reference to FIG. 32. The various processing operations performed by the camera body 100 relating to automatic bounce light emission shooting according to the present exemplary embodiment are almost similar to the various processing operations performed by the camera body 100 relating to automatic bounce light emission shooting according to the third exemplary embodiment.

Figure 32:
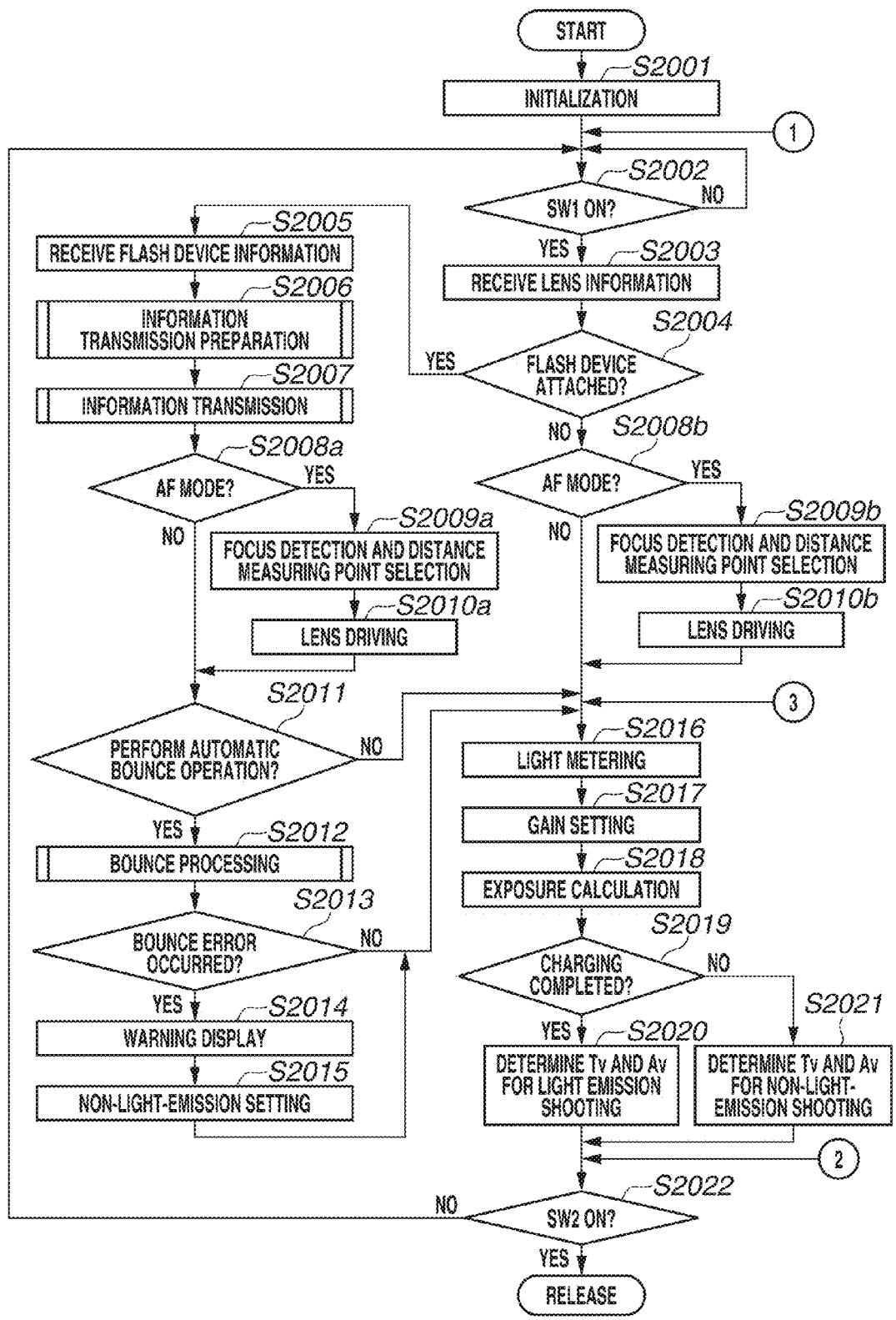
FIG. 32 is a flowchart illustrating various processing operations performed by the camera body relating to automatic bounce light emission shooting according to a fourth exemplary embodiment of the present invention.

In step S2006 illustrated in FIG. 32, the camera microcomputer 101 performs processing according to the flowchart of FIG. 15. The details of the setting commands used when the various processing operation are performed in the present exemplary embodiment are illustrated in FIGS. 34A and 34B.

Figure 33A:
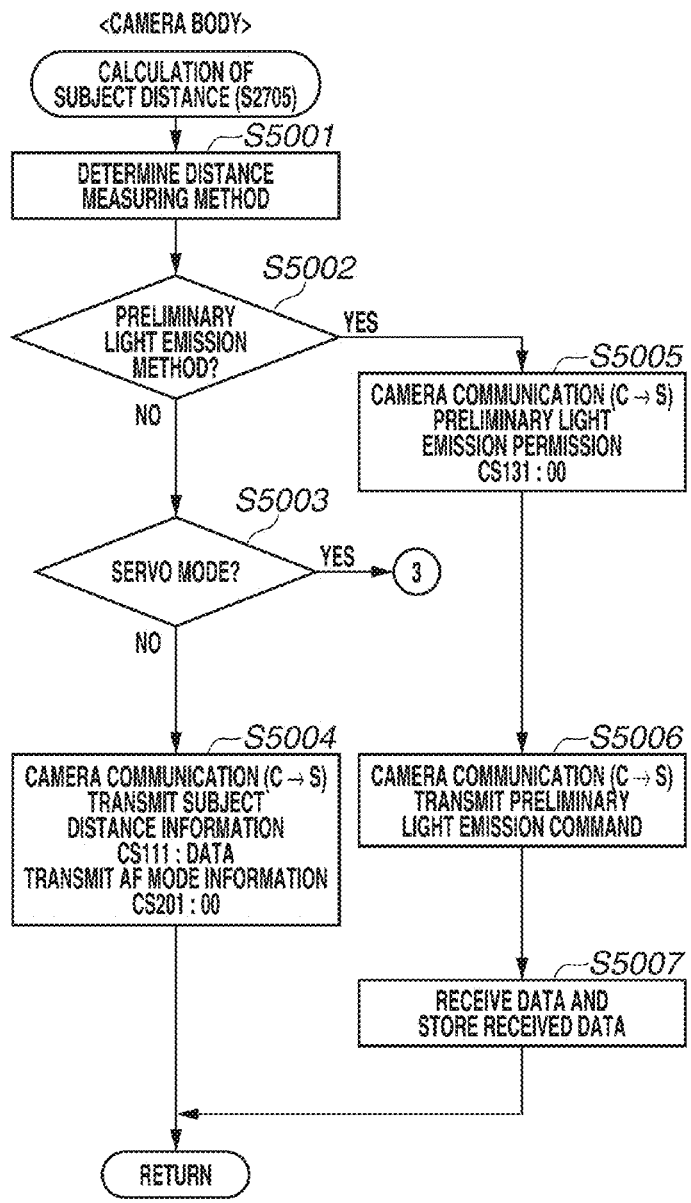
FIGS. 33A and 33B are flowcharts illustrating subject distance calculation processing according to the fourth exemplary embodiment.
Figure 33B:
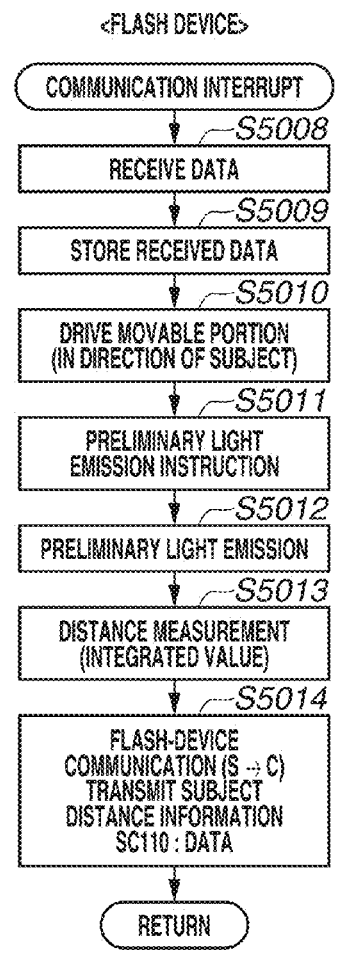

The processing for calculating the distance to a subject in step S2705 in the bounce processing (step S2012 illustrated in FIG. 32) according to the present exemplary embodiment is described with reference to FIGS. 33A and 33B. In FIGS.

33A and 33B, processing performed by the camera body 100 is indicated with steps S5001 to S5007 and the corresponding processing performed by the flash device 300 is indicated with steps S5008 to S5014.

First, processing performed by the camera body 100 is described. In step S5001, the camera microcomputer 101 determines a distance measuring method for calculating the distance to a subject (subject distance). Then, the processing proceeds to step S5002.

In step S5002, the camera microcomputer 101 determines whether the distance measuring method is the preliminary light emission method. If the camera microcomputer 101 determines that the distance measuring method is other than the preliminary light emission method (NO in step S5002), the processing proceeds to step S5003. If the camera microcomputer 101 determines that the distance measuring method is the preliminary light emission method (YES in step S5002), the processing proceeds to step S5005.

In step S5003, the camera microcomputer 101 determines one of control modes in the AF mode. The control modes in the AF mode (hereinafter referred to as "AF detailed modes") are modes for setting how to perform automatic focus adjustment. For example, the AF detailed modes include single mode and servo mode. The single mode is a mode to perform focus adjustment (focusing) only once when the release switch is half pressed, and the servo mode is a mode to repeatedly perform focus adjustment during the time the release switch is kept half pressed. If the camera microcomputer 101 determines that the AF detailed mode is the single mode (NO in step S5003), the processing proceeds to step S5004. If the camera microcomputer 101 determines that the AF detailed mode is the servo mode (YES in step S5003), the processing proceeds to step S2016 illustrated in FIG. 32, so that the camera microcomputer 101 does not perform the subsequent bounce processing.

In step S5004, since the distance measuring method is not the preliminary light emission method, the camera microcomputer 101 transmits, to the flash-device microcomputer 310, a "CS111 command: data XX" as subject distance information. Then, the processing proceeds to step S2706. The subject distance information to be transmitted in step S5004 is calculated by the camera microcomputer 101 based on the lens information, such as the position of the lens group 202 taken when the subject is in focus, detected by the encoder 204, and the focal length. Furthermore, in step S5004, the camera microcomputer 101 transmits, to the flash-device microcomputer 310, a "CS201 command: 00 (single mode)" as AF mode information. In a case where information indicating that the distance measuring method is the flash-device distance measuring method is included in the automatic bounce data received by the camera microcomputer 101, step S5004 is omitted.

In step S5005, the camera microcomputer 101 transmits, to the flash-device microcomputer 310, a "CS131 command: data 00" as preliminary light emission permission. Then, the processing proceeds to step S5006.

In step S5006, the camera microcomputer 101 transmits a preliminary light emission command to the flash-device microcomputer 310. Then, the processing proceeds to step S5007.

In step S5007, the camera microcomputer 101 receives subject distance information (data) from the flash-device microcomputer 310 and stores the received data into the built-in memory of the camera microcomputer 101. Then, the processing proceeds to step S2706.

Next, processing performed by the flash device 300 is described. In step S5008, after a communication interrupt occurs, the flash-device microcomputer 310 receives data transmitted from the camera microcomputer 101. Then, the processing proceeds to step S5009. In step S5009, the flash-device microcomputer 310 stores the received data into the built-in memory of the flash-device microcomputer 310. Then, the processing proceeds to step S5010.

After receiving the preliminary light emission permission, then in step S5010, the flash-device microcomputer 310 instructs and causes the bounce circuit 340 to swivel the movable portion 300b in such a way that the radiation direction is oriented in the direction of the subject.

Upon completion of swiveling of the movable portion 300b, in step S5011, the flash-device microcomputer 310 issues, according to the preliminary light emission command, a preliminary light emission instruction to the light emission control circuit 304.

In step S5012, the light emission control circuit 304 causes, according to the preliminary light emission instruction, the discharge tube 305 to perform preliminary light emission.

In step S5013, the distance measuring unit 308 receives, via the light receiving sensor, reflected light from the target object caused by the preliminary light emission, and calculates the subject distance based on the integrated value of the received reflected light (reflected light information).

In step S5014, the flash-device microcomputer 310 transmits, to the camera microcomputer 101, an "SC110 command: data XX" as subject distance information indicating the calculated subject distance. Then, the processing ends.

In the above-described way, the camera microcomputer 101 or the flash-device microcomputer 310 calculates the subject distance used to determine a radiation direction most appropriate for bounce light emission shooting.

As described above, according to the present exemplary embodiment, the radiation direction most appropriate for bounce light emission shooting can be automatically determined and a communication of information between the imaging apparatus and the illumination device for performing bounce light emission shooting can be appropriately performed. Furthermore, it is determined whether to automatically determine the radiation direction most appropriate for bounce light emission shooting, according to the focus adjustment mode. If the set focus adjustment mode is the servo mode, the radiation direction is not automatically determined. It is supposed that the servo mode, in which focus adjustment is repeatedly performed during the time the release switch is kept half pressed, is set to shoot a moving subject. Therefore, it is considered that, in a case where the servo mode is set, the subject distance information calculated based on the lens information, such as the position of the lens group 202 taken when the subject is in focus and the focal length, does not accurately correspond to the current subject distance. Accordingly, in a case where the set focus adjustment mode is the servo mode, the radiation direction is not automatically determined, so that an erroneous radiation direction can be prevented from being determined.

Furthermore, the method for preventing an erroneous radiation direction from being determined may be other than not automatically determining the radiation direction. For example, in a case where the set focus adjustment mode is the servo mode, there may be adopted a method of automatically setting the radiation direction to a predetermined radiation direction, such as the frontal direction, to drive the movable portion 300b. Although this method, in which the radiation direction is set to a predetermined radiation direction, does not enable intended bounce light emission shooting, bounce light emission shooting with flash light radiated in an erroneous radiation direction can be prevented. Furthermore, in the case of the method of automatically setting the radiation direction to a predetermined radiation direction, such as the frontal direction, to drive the movable portion 300b, if the radiation direction taken before shooting is other than the frontal direction, it is necessary to drive the movable portion 300b in such a way that the radiation direction is oriented in the frontal direction. Therefore, in the case of the method of automatically setting the radiation direction to a predetermined radiation direction, such as the frontal direction, to drive the movable portion 300b, the camera microcomputer 101 drives the movable portion 300b between the end of step S5003 illustrated in FIG. 33A and at least the start of processing in step S2024 illustrated in FIG. 14.

Next, a fifth exemplary embodiment of the present invention is described. An imaging system according to the present exemplary embodiment is similar to that in the fourth exemplary embodiment, but differs from that in the fourth exemplary embodiment only in the subject distance calculation processing.

Figure 35A:
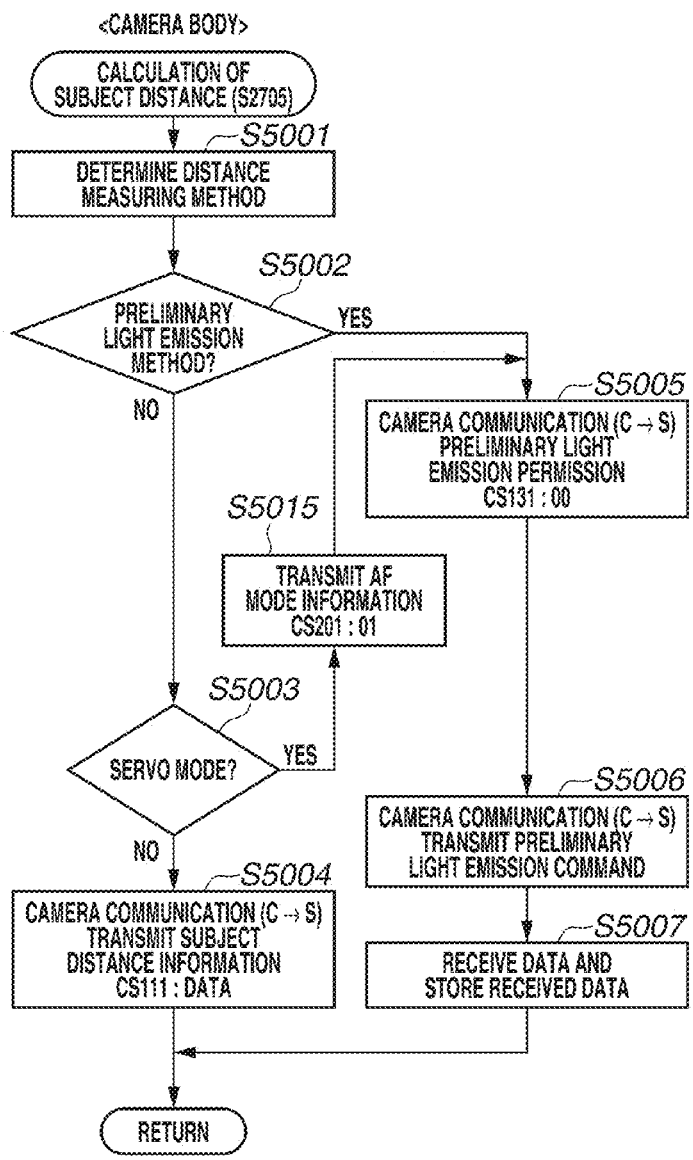
FIGS. 35A and 35B are flowcharts illustrating subject distance calculation processing according to a fifth exemplary embodiment of the present invention.
Figure 35B:
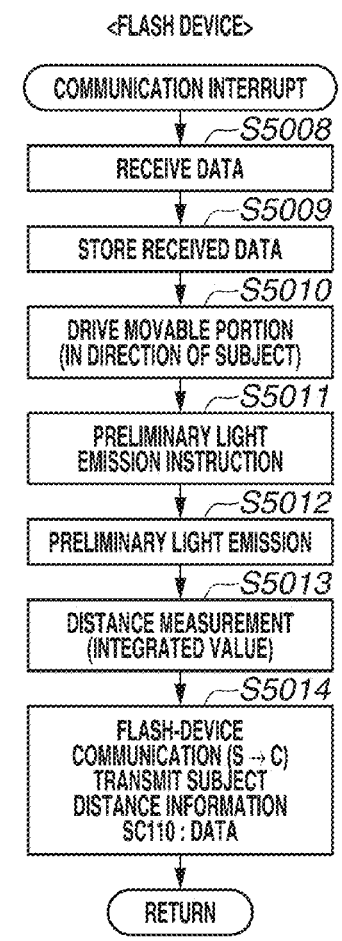

The subject distance calculation processing according to the present exemplary embodiment is described with reference to FIGS. 35A and 35B. In FIGS. 35A and 35B, processing performed by the camera body 100 is indicated with steps S5001 to S5007 and S5015 and the corresponding processing performed by the flash device 300 is indicated with steps S5008 to S5014. Furthermore, steps assigned with the respective same step numbers between FIGS. 33A and 33B and FIGS. 35A and 35B are provided to perform the respective same processing operations. Therefore, the detailed description of processing operations that have already been described with reference to FIGS. 33A and 33B is omitted.

In step S5003 illustrated in FIG. 35A, the camera microcomputer 101 determines an AF detailed mode. If the camera microcomputer 101 determines that the AF detailed mode is the single mode (NO in step S5003), the processing proceeds to step S5004. If the camera microcomputer 101 determines that the AF detailed mode is the servo mode (YES in step S5003), the processing proceeds to step S5015. In step S5015, the camera microcomputer 101 transmits, to the flash-device microcomputer 310, a "CS201 command: 00 (servo mode)" as AF mode information. Then, the processing proceeds to step S5005.

On the other hand, in the flash device 300, after receiving the "CS201 command: 00 (servo mode)", the flash-device microcomputer 310 changes the distance measuring method to the preliminary light emission method even if the preliminary light emission method is not selected by the user.

As described above, according to the present exemplary embodiment, in a case where the set focus adjustment mode is the servo mode, the subject distance to be used to automatically determine the radiation direction is calculated based on the preliminary light emission method.

As described in the fourth exemplary embodiment, it is considered that, in a case where the servo mode is set, the subject distance information calculated based on the lens information, such as the position of the lens group 202 taken when the subject is in focus and the focal length, does not accurately correspond to the current subject distance. Accordingly, in a case where the servo mode is set, the subject distance is calculated based on the preliminary light emission method, so that an erroneous radiation direction can be prevented from being determined.

Next, a sixth exemplary embodiment of the present invention is described. An imaging system according to the present exemplary embodiment is similar to that in the fourth exemplary embodiment, but differs from that in the fourth exemplary embodiment only in the subject distance calculation processing.

The subject distance calculation processing according to the present exemplary embodiment is described with reference to FIGS. 36A and 36B. In FIGS. 36A and 36B, processing performed by the camera body 100 is indicated with steps S5001 to S5007 and S5016 and the corresponding processing performed by the flash device 300 is indicated with steps S5008 to S5014. Furthermore, steps assigned with the respective same step numbers between FIGS. 33A and 33B and FIGS. 36A and 36B are provided to perform the respective same processing operations. Therefore, the detailed description of processing operations that have already been described with reference to FIGS. 33A and 33B is omitted.

In step S5003 illustrated in FIG. 36A, the camera microcomputer 101 determines an AF detailed mode. If the camera microcomputer 101 determines that the AF detailed mode is the single mode (NO in step S5003), the processing proceeds to step S5004. If the camera microcomputer 101 determines that the AF detailed mode is the servo mode (YES in step S5003), the processing proceeds to step S5016.

In step S5016, the camera microcomputer 101 determines a movement speed of the subject. If the camera microcomputer 101 determines that the movement speed of the subject is equal to or higher than a predetermined value (predetermined speed) (NO in step S5016), the processing proceeds to step S2016 illustrated in FIG. 32. If the camera microcomputer 101 determines that the movement speed of the subject is lower than the predetermined value (YES in step S5016), the processing proceeds to step S5004. As described above, according to the present exemplary embodiment, in a case where the set focus adjustment mode is the servo mode, it is determined whether to automatically determine the radiation direction, according the movement speed of the subject.

It is considered that, in a case where the movement speed of the subject is lower than the predetermined value, even if the servo mode is set, the subject distance information calculated based on the lens information, such as the position of the lens group 202 taken when the subject is in focus and the focal length, accurately corresponds to the current subject distance. On the other hand, in a case where the movement speed of the subject is equal to or higher than the predetermined value, the subject distance information calculated based on the lens information, such as the position of the lens group 202 taken when the subject is in focus and the focal length, does not accurately correspond to the current subject distance. Accordingly, in a case where the set focus adjustment mode is the servo mode, it is determined whether to automatically determine the radiation direction, according the movement speed of the subject, so that an erroneous radiation direction can be prevented from being determined. Furthermore, the method for obtaining the movement speed of the subject may be a known method. For example, the movement speed of the subject may be obtained based on a result of focus detection that is repeatedly performed, or, if the light metering sensor included in the light metering circuit 106 is an image sensor, may be obtained based on changes of an image signal that is sequentially output from the light metering sensor, which is an image sensor.

Furthermore, in all of the above-described exemplary embodiments, a part of the processing which the camera microcomputer 101 performs may be processed by the flash-device microcomputer 310, and a part of the processing which the flash-device microcomputer 310 performs may be processed by the camera microcomputer 101.

Moreover, in all of the above-described exemplary embodiments, besides a configuration in which the illumination device is detachably attachable to the imaging apparatus, the present invention can be applied to a configuration in which the illumination device is incorporated in the imaging apparatus as long as the radiation direction of the illumination device is able to be changed.

Additionally, the flowcharts described in all of the above-described exemplary embodiments are merely examples. Various processing operations may be performed in the order different from that in the flowcharts described above unless an adverse effect occurs.

Furthermore, the commands, command numbers, and data items described in all of the above-described exemplary embodiments are merely examples, and, therefore, may be set in any way as long as similar functions are attained.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-184404 filed Sep. 10, 2014, No. 2014-184405 filed Sep. 10, 2014, and No. 2014-184406 filed Sep. 10, 2014, which are hereby incorporated by reference herein in their entirety.

What is claimed is:

1. An imaging system, which includes an illumination device capable of automatically driving a movable portion including a light emission unit to change a radiation direction of the light emission unit and an imaging apparatus, the imaging system comprising:
a processor; and
a memory containing instructions that, when executed by the processor, cause the processor to perform operations comprising:
an acquisition operation to acquire information classifying a lens unit attached to the imaging apparatus; and
a control operation to determine whether to perform automatically driving the movable portion or not, based on the information classifying the lens unit,
wherein, if a focal length of the lens unit attached to the imaging apparatus is shorter than a first threshold value, the control operation does not allow the movable portion to be automatically driven.

2. The imaging system according to claim 1, wherein, if the focal length of the lens unit attached to the imaging apparatus is equal to or longer than a second threshold value greater than the first threshold value, the control operation does not allow the movable portion to be automatically driven.

3. An imaging system, which includes an illumination device capable of automatically driving a movable portion including a light emission unit to change a radiation direction of the light emission unit and an imaging apparatus, the imaging system comprising:
a processor; and
a memory containing instructions that, when executed by the processor, cause the processor to perform operations comprising:
an acquisition operation to acquire information classifying a lens unit attached to the imaging apparatus; and
a control operation to determine whether to perform automatically driving the movable portion or not, based on the information classifying the lens unit,
wherein, if the lens unit attached to the imaging apparatus is not able to be classified, the control operation does not allow the movable portion to be automatically driven.

4. An imaging system, which includes an illumination device capable of automatically driving a movable portion including a light emission unit to change a radiation direction of the light emission unit and an imaging apparatus, the imaging system comprising:
a processor; and
a memory containing instructions that, when executed by the processor, cause the processor to perform operations comprising:
an acquisition operation to acquire information classifying a lens unit attached to the imaging apparatus; and
a control operation to determine whether to perform automatically driving the movable portion or not, based on the information classifying the lens unit,
wherein, if the lens unit attached to the imaging apparatus is a lens unit used for special shooting, the control operation does not allow the movable portion to be automatically driven.

5. An imaging system, which includes an illumination device capable of automatically driving a movable portion including a light emission unit to change a radiation direction of the light emission unit and an imaging apparatus, the imaging system comprising:
a processor; and
a memory containing instructions that, when executed by the processor, cause the processor to perform operations comprising:
an acquisition operation to acquire information classifying a lens unit attached to the imaging apparatus;
a calculation operation to calculate the radiation direction of the light emission unit; and a determination operation to determine whether to cause the calculation operation to calculate the radiation direction of the light emission unit or not, based on the information classifying the lens unit, wherein, if a focal length of the lens unit attached to the imaging apparatus is shorter than a first threshold value, the determination operation determines not to cause the calculation operation to calculate the radiation direction of the light emission unit.

6. The imaging system according to claim 5, wherein, if the focal length of the lens unit attached to the imaging apparatus is equal to or longer than a second threshold value greater than the first threshold value, the determination operation determines not to cause the calculation operation to calculate the radiation direction of the light emission unit.

7. An imaging system, which includes an illumination device capable of automatically driving a movable portion including a light emission unit to change a radiation direction of the light emission unit and an imaging apparatus, the imaging system comprising:
   a processor; and
   a memory containing instructions that, when executed by the processor, cause the processor to perform operations comprising:
      an acquisition operation to acquire information classifying a lens unit attached to the imaging apparatus;
      a calculation operation to calculate the radiation direction of the light emission unit; and
      a determination operation to determine whether to cause the calculation operation to calculate the radiation direction of the light emission unit or not, based on the information classifying the lens unit,
   wherein, if the lens unit attached to the imaging apparatus is not able to be classified, the determination operation determines not to cause the calculation operation to calculate the radiation direction of the light emission unit.

8. An imaging system, which includes an illumination device capable of automatically driving a movable portion including a light emission unit to change a radiation direction of the light emission unit and an imaging apparatus, the imaging system comprising:
   a processor; and
   a memory containing instructions that, when executed by the processor, cause the processor to perform operations comprising:
      an acquisition operation to acquire information classifying a lens unit attached to the imaging apparatus;
      a calculation operation to calculate the radiation direction of the light emission unit; and
   a determination operation to determine whether to cause the calculation operation to calculate the radiation direction of the light emission unit or not, based on the information classifying the lens unit,
   wherein, if the lens unit attached to the imaging apparatus is a lens unit used for special shooting, the determination operation determines not to cause the calculation operation to calculate the radiation direction of the light emission unit.

9. An illumination device comprising:
   a body portion that is detachably attached to an imaging apparatus;
   a movable portion that is able to be rotated relative to the body portion;
   a light emission unit mounted on the movable portion;
   a drive unit configured to rotate the movable portion;
   a processor; and
   a memory containing instructions that, when executed by the processor, cause the processor to perform operations comprising:
      an acquisition operation configured to acquire information classifying a lens unit attached to the imaging apparatus attached to the body portion; and
      a control operation configured to determine whether to perform automatically driving the movable portion or not, based on the information classifying the lens unit,
   wherein, if a focal length of the lens unit attached to the imaging apparatus is shorter than a first threshold value, the control operation does not allow the movable portion to be automatically driven.

10. An illumination device comprising:
    a body portion that is detachably attached to an imaging apparatus;
    a movable portion that is able to be rotated relative to the body portion;
    a light emission unit mounted on the movable portion;
    a drive unit configured to rotate the movable portion;
    a processor; and
    a memory containing instructions that, when executed by the processor, cause the processor to perform operations comprising:
       a calculation operation configured to calculate a radiation direction of the light emission unit;
       an acquisition operation configured to acquire information classifying a lens unit attached to the imaging apparatus attached to the body portion; and
       a determination operation configured to determine whether to cause the calculation operation to calculate the radiation direction of the light emission unit or not, based on the information classifying the lens unit,
    wherein, if a focal length of the lens unit attached to the imaging apparatus is shorter than a first threshold value, the determination operation determines not to cause the calculation operation to calculate the radiation direction of the light emission unit.

11. A control method for an illumination device including a body portion that is detachably attached to an imaging apparatus, a movable portion that is able to be rotated relative to the body portion, a light emission unit mounted on the movable portion, and a drive unit configured to rotate the movable portion, the control method comprising:
    acquiring information classifying a lens unit attached to the imaging apparatus attached to the body portion; and
    determining not to allow the movable portion to be automatically driven, if a focal length of the lens unit attached to the imaging apparatus is shorter than a first threshold value.

12. A control method for an illumination device including a body portion that is detachably attached to an imaging apparatus, a movable portion that is able to be rotated relative to the body portion, a light emission unit mounted on the movable portion, a drive unit configured to rotate the movable portion, and a calculation unit configured to calculate a radiation direction of the light emission unit, the control method comprising:
    acquiring information classifying a lens unit attached to the imaging apparatus attached to the body portion; and
    determining not to cause the calculation unit to calculate the radiation direction of the light emission unit, if a focal length of the lens unit attached to the imaging apparatus is shorter than a first threshold value.

13. An imaging apparatus which is detachably attached to an illumination device capable of automatically driving a movable portion including a light emission unit to change a radiation direction of the light emission unit, the imaging apparatus comprising:
- a processor; and
- a memory containing instructions that, when executed by the processor, cause the processor to perform operations comprising:
  - an acquisition operation to acquire information classifying a lens unit attached to the imaging apparatus; and
  - a control operation to determine whether to perform automatically driving the movable portion or not, based on the information classifying the lens unit acquired by the acquisition unit,
- wherein, if a focal length of the lens unit attached to the imaging apparatus is shorter than a first threshold value, the control operation does not allow the movable portion to be automatically driven.

14. An imaging apparatus which is detachably attached to an illumination device capable of automatically driving a movable portion including a light emission unit to change a radiation direction of the light emission unit, the imaging apparatus comprising:
- a processor; and
- a memory containing instructions that, when executed by the processor, cause the processor to perform operations comprising:
  - an acquisition operation to acquire information classifying a lens unit attached to the imaging apparatus;
  - a calculation operation to calculate the radiation direction of the light emission unit; and
    - a determination operation to determine whether to cause the calculation unit to calculate the radiation direction of the light emission unit or not, based on the information classifying the lens unit acquired by the acquisition unit,
- wherein, if a focal length of the lens unit attached to the imaging apparatus is shorter than a first threshold value, the determination operation determines not to cause the calculation operation to calculate the radiation direction of the light emission unit.

15. An illumination device comprising:
- a body portion that is detachably attached to an imaging apparatus;
- a movable portion that is able to be rotated relative to the body portion;
- a light emission unit mounted on the movable portion;
- a drive unit configured to rotate the movable portion;
- a processor; and
- a memory containing instructions that, when executed by the processor, cause the processor to perform operations comprising:
  - an acquisition operation configured to acquire information classifying a lens unit attached to the imaging apparatus attached to the body portion; and
  - a control operation configured to determine whether to perform automatically driving the movable portion or not, based on the information classifying the lens unit,
- wherein, if the lens unit attached to the imaging apparatus is not able to be classified, the control operation does not allow the movable portion to be automatically driven.

16. An illumination device comprising:
- a body portion that is detachably attached to an imaging apparatus;
- a movable portion that is able to be rotated relative to the body portion;
- a light emission unit mounted on the movable portion;
- a drive unit configured to rotate the movable portion;
- a processor; and
- a memory containing instructions that, when executed by the processor, cause the processor to perform operations comprising:
  - an acquisition operation configured to acquire information classifying a lens unit attached to the imaging apparatus attached to the body portion; and
  - a control operation configured to determine whether to perform automatically driving the movable portion or not, based on the information classifying the lens unit,
- wherein, if the lens unit attached to the imaging apparatus is a lens unit used for special shooting, the control operation does not allow the movable portion to be automatically driven.

17. An illumination device comprising:
- a body portion that is detachably attached to an imaging apparatus;
- a movable portion that is able to be rotated relative to the body portion;
- a light emission unit mounted on the movable portion;
- a drive unit configured to rotate the movable portion;
- a processor; and
- a memory containing instructions that, when executed by the processor, cause the processor to perform operations comprising:
  - a calculation operation configured to calculate a radiation direction of the light emission unit;
  - an acquisition operation configured to acquire information classifying a lens unit attached to the imaging apparatus attached to the body portion; and
  - a determination operation configured to determine whether to cause the calculation operation to calculate the radiation direction of the light emission unit or not, based on the information classifying the lens unit,
- wherein, if the lens unit attached to the imaging apparatus is not able to be classified, the determination operation determines not to cause the calculation operation to calculate the radiation direction of the light emission unit.

18. An illumination device comprising:
- a body portion that is detachably attached to an imaging apparatus;
- a movable portion that is able to be rotated relative to the body portion;
- a light emission unit mounted on the movable portion;
- a drive unit configured to rotate the movable portion;
- a processor; and
- a memory containing instructions that, when executed by the processor, cause the processor to perform operations comprising:
  - a calculation operation configured to calculate a radiation direction of the light emission unit;
  - an acquisition operation configured to acquire information classifying a lens unit attached to the imaging apparatus attached to the body portion; and a determination operation configured to determine whether to cause the calculation operation to calculate the radiation direction of the light emission unit or not, based on the information classifying the lens unit, wherein, if the lens unit attached to the imaging apparatus is a lens unit used for special shooting, the determination operation determines not to cause the calculation operation to calculate the radiation direction of the light emission unit.

19. A control method for an illumination device including a body portion that is detachably attached to an imaging apparatus, a movable portion that is able to be rotated relative to the body portion, a light emission unit mounted on the movable portion, and a drive unit configured to rotate the movable portion, the control method comprising:

acquiring information classifying a lens unit attached to the imaging apparatus attached to the body portion; and determining not to allow the movable portion to be automatically driven, if the lens unit attached to the imaging apparatus is not able to be classified.

20. A control method for an illumination device including a body portion that is detachably attached to an imaging apparatus, a movable portion that is able to be rotated relative to the body portion, a light emission unit mounted on the movable portion, and a drive unit configured to rotate the movable portion, the control method comprising:

acquiring information classifying a lens unit attached to the imaging apparatus attached to the body portion; and determining not to allow the movable portion to be automatically driven, if the lens unit attached to the imaging apparatus is a lens unit used for special shooting.

21. A control method for an illumination device including a body portion that is detachably attached to an imaging apparatus, a movable portion that is able to be rotated relative to the body portion, a light emission unit mounted on the movable portion, a drive unit configured to rotate the movable portion, and a calculation unit configured to calculate a radiation direction of the light emission unit, the control method comprising:

acquiring information classifying a lens unit attached to the imaging apparatus attached to the body portion; and determining not to cause the calculation unit to calculate the radiation direction of the light emission unit, if the lens unit attached to the imaging apparatus is not able to be classified.

22. A control method for an illumination device including a body portion that is detachably attached to an imaging apparatus, a movable portion that is able to be rotated relative to the body portion, a light emission unit mounted on the movable portion, a drive unit configured to rotate the movable portion, and a calculation unit configured to calculate a radiation direction of the light emission unit, the control method comprising:

acquiring information classifying a lens unit attached to the imaging apparatus attached to the body portion; and determining not to cause the calculation unit to calculate the radiation direction of the light emission unit, if the lens unit attached to the imaging apparatus is a lens unit used for special shooting.

23. An imaging apparatus which is detachably attached to an illumination device capable of automatically driving a movable portion including a light emission unit to change a radiation direction of the light emission unit, the imaging apparatus comprising:

a processor; and a memory containing instructions that, when executed by the processor, cause the processor to perform operations comprising:

an acquisition operation to acquire information classifying a lens unit attached to the imaging apparatus; and a control operation to determine whether to perform automatically driving the movable portion or not, based on the information classifying the lens unit acquired by the acquisition unit, wherein, if the lens unit attached to the imaging apparatus is not able to be classified, the control operation does not allow the movable portion to be automatically driven.

24. An imaging apparatus which is detachably attached to an illumination device capable of automatically driving a movable portion including a light emission unit to change a radiation direction of the light emission unit, the imaging apparatus comprising:

a processor; and a memory containing instructions that, when executed by the processor, cause the processor to perform operations comprising:

an acquisition operation to acquire information classifying a lens unit attached to the imaging apparatus; and a control operation to determine whether to perform automatically driving the movable portion or not, based on the information classifying the lens unit acquired by the acquisition unit, wherein, if the lens unit attached to the imaging apparatus is a lens unit used for special shooting, the control operation does not allow the movable portion to be automatically driven.

25. An imaging apparatus which is detachably attached to an illumination device capable of automatically driving a movable portion including a light emission unit to change a radiation direction of the light emission unit, the imaging apparatus comprising:

a processor; and a memory containing instructions that, when executed by the processor, cause the processor to perform operations comprising:

an acquisition operation to acquire information classifying a lens unit attached to the imaging apparatus;

a calculation operation to calculate the radiation direction of the light emission unit; and a determination operation to determine whether to cause the calculation unit to calculate the radiation direction of the light emission unit or not, based on the information classifying the lens unit acquired by the acquisition unit, wherein, if the lens unit attached to the imaging apparatus is not able to be classified, the determination operation determines not to cause the calculation operation to calculate the radiation direction of the light emission unit.

26. An imaging apparatus which is detachably attached to an illumination device capable of automatically driving a movable portion including a light emission unit to change a radiation direction of the light emission unit, the imaging apparatus comprising:

a processor; and a memory containing instructions that, when executed by the processor, cause the processor to perform operations comprising:

an acquisition operation to acquire information classifying a lens unit attached to the imaging apparatus;

a calculation operation to calculate the radiation direction of the light emission unit; and a determination operation to determine whether to cause the calculation unit to calculate the radiation direction of the light emission unit or not, based on the information classifying the lens unit acquired by the acquisition unit, wherein, if the lens unit attached to the imaging apparatus is a lens unit used for special shooting, the determination operation determines not to cause the calculation operation to calculate the radiation direction of the light emission unit.

* * * * *